US012015772B2

(12) United States Patent
Deng et al.

(10) Patent No.: US 12,015,772 B2
(45) Date of Patent: Jun. 18, 2024

(54) PREDICTION REFINEMENT FOR AFFINE MERGE AND AFFINE MOTION VECTOR PREDICTION MODE

(71) Applicants: Beijing Bytedance Network Technology Co., Ltd., Beijing (CN); Bytedance Inc., Los Angeles, CA (US)

(72) Inventors: Zhipin Deng, Beijing (CN); Li Zhang, San Diego, CA (US); Ye-Kui Wang, San Diego, CA (US); Kai Zhang, San Diego, CA (US); Jizheng Xu, San Diego, CA (US)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/950,443

(22) Filed: Sep. 22, 2022

(65) Prior Publication Data
US 2023/0042746 A1    Feb. 9, 2023

Related U.S. Application Data

(63) Continuation of application No. PCT/CN2021/082243, filed on Mar. 23, 2021.

(30) Foreign Application Priority Data

Mar. 23, 2020  (WO) ................ PCT/CN2020/080602

(51) Int. Cl.
H04N 19/105    (2014.01)
H04N 19/117    (2014.01)
(Continued)

(52) U.S. Cl.
CPC ......... *H04N 19/117* (2014.11); *H04N 19/105* (2014.11); *H04N 19/132* (2014.11);
(Continued)

(58) Field of Classification Search
CPC ... H04N 19/105; H04N 19/139; H04N 19/159
See application file for complete search history.

(56) References Cited

U.S. PATENT DOCUMENTS 6,047,112 A    4/2000  Wise
8,988,531 B2   3/2015  Zhou
(Continued)

FOREIGN PATENT DOCUMENTS

AU    2016273973 A1    7/2018
CN       1593065 A     3/2005
(Continued)

OTHER PUBLICATIONS

Prediction refinement with optical flow for affine mode; Luo; et al. Mar. 2019. (Year: 2019).*
(Continued)

*Primary Examiner* — Luis Perez-Fuentes
(74) *Attorney, Agent, or Firm* — Conley Rose, P.C.

(57) ABSTRACT

A method includes determining, for a conversion between a video block of a video and a bitstream of the video, a size of prediction block corresponding to the video block according to a rule. The method also includes performing the conversion based on the determining. The rule specifies that a first size of the prediction block is determined responsive to whether a prediction refinement using optical flow technique is used for coding the video block. The video block has a second size and is coded using an affine merge mode or an affine advanced motion vector prediction mode.

19 Claims, 19 Drawing Sheets

(51) Int. Cl.
    *H04N 19/132* (2014.01)
    *H04N 19/139* (2014.01)
    *H04N 19/159* (2014.01)
    *H04N 19/174* (2014.01)
    *H04N 19/176* (2014.01)
    *H04N 19/186* (2014.01)
    *H04N 19/463* (2014.01)
    *H04N 19/52* (2014.01)
    *H04N 19/70* (2014.01)
    *H04N 19/80* (2014.01)

(52) U.S. Cl.
    CPC ......... *H04N 19/139* (2014.11); *H04N 19/159* (2014.11); *H04N 19/174* (2014.11); *H04N 19/176* (2014.11); *H04N 19/186* (2014.11); *H04N 19/463* (2014.11); *H04N 19/52* (2014.11); *H04N 19/70* (2014.11); *H04N 19/80* (2014.11)

(56) References Cited

U.S. PATENT DOCUMENTS

| | | |
|---|---|---|
| 9,525,861 B2 | 12/2016 | Zhang |
| 9,743,066 B2 | 8/2017 | Zhang |
| 9,912,966 B2 | 3/2018 | Hannuksela |
| 9,924,168 B2 | 3/2018 | Zhang |
| 9,998,757 B2 | 6/2018 | Chen |
| 10,057,594 B2 | 8/2018 | Xiu |
| 10,097,846 B2 | 10/2018 | Deshpande |
| 10,165,252 B2 | 12/2018 | An |
| 10,200,709 B2 | 2/2019 | Chen |
| 10,205,968 B2 | 2/2019 | Liu |
| 10,455,231 B2 | 10/2019 | Xu |
| 10,483,493 B2 | 11/2019 | Sargent |
| 10,523,964 B2 | 12/2019 | Chuang |
| 10,523,967 B2 * | 12/2019 | Lee ............... H04N 19/136 |
| 10,567,804 B2 | 2/2020 | Chen |
| 10,587,859 B2 | 3/2020 | An |
| 10,757,417 B2 | 8/2020 | Zhang |
| 10,798,385 B2 * | 10/2020 | Lee ............... H04N 19/105 |
| 10,805,639 B2 * | 10/2020 | Lee ............... H04N 19/61 |
| 10,819,891 B2 | 10/2020 | Wang |
| 10,841,609 B1 | 11/2020 | Liu |
| 10,880,547 B2 | 12/2020 | Xu |
| 10,904,565 B2 | 1/2021 | Chuang |
| 11,095,898 B2 * | 8/2021 | Lim ............... H04N 19/137 |
| 11,095,917 B2 | 8/2021 | Zhang |
| 11,109,061 B2 * | 8/2021 | Chen ............... H04N 19/577 |
| 11,128,884 B2 | 9/2021 | Liu |
| 11,146,810 B2 * | 10/2021 | Chen ............... H04N 19/80 |
| 11,212,523 B2 * | 12/2021 | Chiu ............... H04N 19/105 |
| 11,343,529 B2 * | 5/2022 | Zhang ............... H04N 19/52 |
| 11,470,309 B2 | 10/2022 | Zhang et al. |
| 11,496,733 B2 * | 11/2022 | Zhang ............... H04N 19/139 |
| 11,523,108 B2 * | 12/2022 | Zhang ............... H04N 19/186 |
| 11,523,109 B2 * | 12/2022 | Li ............... H04N 19/196 |
| 11,533,513 B2 | 12/2022 | Zhang et al. |
| 11,539,950 B2 | 12/2022 | Zhang |
| 11,546,593 B2 | 1/2023 | Zhang |
| 11,553,177 B2 | 1/2023 | Zhang |
| 2004/0008766 A1 | 1/2004 | Wang |
| 2004/0177383 A1 | 9/2004 | Martinolich |
| 2005/0019006 A1 | 1/2005 | Suh |
| 2007/0086521 A1 | 4/2007 | Wang |
| 2008/0204472 A1 | 8/2008 | Maertens |
| 2008/0267297 A1 | 10/2008 | Sampedro |
| 2008/0273597 A1 | 11/2008 | Kovalenko |
| 2010/0086052 A1 | 4/2010 | Park |
| 2012/0294353 A1 | 11/2012 | Fu |
| 2013/0089145 A1 | 4/2013 | Guo et al. |
| 2013/0101018 A1 | 4/2013 | Chong |
| 2013/0101035 A1 | 4/2013 | Wang |
| 2013/0182755 A1 | 7/2013 | Chen |
| 2013/0202051 A1 | 8/2013 | Zhou |
| 2013/0266075 A1 | 10/2013 | Wang |
| 2013/0294524 A1 | 11/2013 | Van Der Auwera et al. |
| 2013/0322531 A1 | 12/2013 | Chen |
| 2013/0336406 A1 | 12/2013 | Zhang |
| 2014/0003504 A1 | 1/2014 | Ugur |
| 2014/0003535 A1 | 1/2014 | Haque |
| 2014/0185682 A1 | 7/2014 | Chen |
| 2014/0192892 A1 | 7/2014 | Van Der Auwera et al. |
| 2014/0198844 A1 | 7/2014 | Hsu |
| 2014/0218473 A1 | 8/2014 | Hannuksela |
| 2014/0301441 A1 | 10/2014 | Wang |
| 2014/0301476 A1 | 10/2014 | Deshpande |
| 2015/0010050 A1 | 1/2015 | Chen |
| 2015/0010091 A1 | 1/2015 | Hsu |
| 2015/0103924 A1 | 4/2015 | Misra |
| 2015/0195577 A1 | 7/2015 | Hannuksela |
| 2015/0215631 A1 | 7/2015 | Zhou |
| 2015/0271515 A1 | 9/2015 | Pang |
| 2015/0341655 A1 | 11/2015 | Joshi |
| 2015/0341664 A1 | 11/2015 | Zhang |
| 2016/0100189 A1 | 4/2016 | Pang |
| 2016/0100196 A1 | 4/2016 | Wu |
| 2016/0105690 A1 | 4/2016 | Denoual |
| 2016/0165248 A1 | 6/2016 | Lainema |
| 2016/0173887 A1 | 6/2016 | Deshpande |
| 2016/0219278 A1 | 7/2016 | Chen |
| 2016/0234522 A1 | 8/2016 | Lu |
| 2016/0316215 A1 | 10/2016 | Minoo |
| 2016/0337661 A1 | 11/2016 | Pang |
| 2016/0381385 A1 | 12/2016 | Ugur |
| 2017/0006302 A1 | 1/2017 | Lee |
| 2017/0006304 A1 | 1/2017 | Miyoshi |
| 2017/0064339 A1 | 3/2017 | Van Der Auwera et al. |
| 2017/0237999 A1 | 8/2017 | Hendry |
| 2017/0272758 A1 | 9/2017 | Lin |
| 2017/0289566 A1 | 10/2017 | He |
| 2017/0295369 A1 | 10/2017 | Nakagami |
| 2017/0302951 A1 | 10/2017 | Joshi |
| 2017/0332095 A1 | 11/2017 | Zou |
| 2018/0048909 A1 | 2/2018 | Liu |
| 2018/0091829 A1 | 3/2018 | Liu |
| 2018/0098063 A1 | 4/2018 | Chen |
| 2018/0098090 A1 | 4/2018 | Lin |
| 2018/0184083 A1 | 6/2018 | Panusopone |
| 2018/0192072 A1 | 7/2018 | Chen |
| 2018/0199057 A1 | 7/2018 | Chuang et al. |
| 2018/0270500 A1 | 9/2018 | Li |
| 2018/0310017 A1 | 10/2018 | Chen |
| 2018/0343463 A1 | 11/2018 | Xiu |
| 2018/0376126 A1 | 12/2018 | Hannuksela |
| 2019/0058884 A1 | 2/2019 | Zhou |
| 2019/0058896 A1 | 2/2019 | Huang |
| 2019/0082191 A1 | 3/2019 | Chuang |
| 2019/0104319 A1 | 4/2019 | Zhang |
| 2019/0110064 A1 | 4/2019 | Zhang |
| 2019/0116376 A1 | 4/2019 | Chen |
| 2019/0138889 A1 | 5/2019 | Jiang |
| 2019/0141320 A1 | 5/2019 | Wang |
| 2019/0149838 A1 | 5/2019 | Zhang |
| 2019/0158865 A1 | 5/2019 | Park |
| 2019/0208234 A1 | 7/2019 | Van Brandenburg |
| 2019/0246143 A1 | 8/2019 | Zhang |
| 2019/0273937 A1 | 9/2019 | Yu |
| 2020/0112733 A1 | 4/2020 | Li |
| 2020/0221117 A1 | 7/2020 | Liu |
| 2020/0221122 A1 | 7/2020 | Ye |
| 2020/0228827 A1 | 7/2020 | Hannuksela |
| 2020/0252619 A1 | 8/2020 | Zhang |
| 2020/0296405 A1 | 9/2020 | Huang |
| 2020/0329246 A1 | 10/2020 | Yu |
| 2020/0382795 A1 | 12/2020 | Zhang |
| 2020/0396453 A1 | 12/2020 | Zhang |
| 2021/0029351 A1 | 1/2021 | Zhang |
| 2021/0029362 A1 | 1/2021 | Liu |
| 2021/0029378 A1 | 1/2021 | He |
| 2021/0044818 A1 | 2/2021 | Furht |
| 2021/0044838 A1 | 2/2021 | Chen |
| 2021/0058637 A1 | 2/2021 | Zhang |
| 2021/0076029 A1 | 3/2021 | Han |

(56) References Cited

U.S. PATENT DOCUMENTS

| | | | |
|---|---|---|---|
| 2021/0076050 A1 | 3/2021 | Zhang |
| 2021/0084295 A1 | 3/2021 | Chen |
| 2021/0084340 A1 | 3/2021 | Li |
| 2021/0136363 A1 | 5/2021 | Jang |
| 2021/0136407 A1 | 5/2021 | Aono |
| 2021/0136422 A1 | 5/2021 | Huang |
| 2021/0185347 A1 | 6/2021 | Liu |
| 2021/0195177 A1 | 6/2021 | Zhang |
| 2021/0211707 A1 | 7/2021 | Liu |
| 2021/0211713 A1 | 7/2021 | Zhang |
| 2021/0211714 A1 | 7/2021 | Zhang |
| 2021/0219001 A1 | 7/2021 | Jang |
| 2021/0227250 A1 | 7/2021 | Liu |
| 2021/0235109 A1 | 7/2021 | Liu |
| 2021/0243467 A1 | 8/2021 | Zhang |
| 2021/0243468 A1 | 8/2021 | Zhang |
| 2021/0266530 A1 | 8/2021 | Liu |
| 2021/0266560 A1 | 8/2021 | Jang |
| 2021/0266577 A1 | 8/2021 | Zhang |
| 2021/0266584 A1 | 8/2021 | Zhang |
| 2021/0266585 A1 | 8/2021 | Liu |
| 2021/0266591 A1 | 8/2021 | Zhang |
| 2021/0274208 A1 | 9/2021 | Zhang |
| 2021/0274209 A1 | 9/2021 | He |
| 2021/0274213 A1 | 9/2021 | Xiu |
| 2021/0281865 A1 | 9/2021 | Liu |
| 2021/0281875 A1 | 9/2021 | Liu |
| 2021/0289209 A1 | 9/2021 | Lee |
| 2021/0337184 A1 | 10/2021 | Meng |
| 2021/0337228 A1 | 10/2021 | Wang |
| 2021/0352302 A1 | 11/2021 | Zhang |
| 2021/0352315 A1 | 11/2021 | Zhang |
| 2021/0368198 A1 | 11/2021 | Zhang |
| 2021/0368199 A1 | 11/2021 | Zhang |
| 2021/0368203 A1 | 11/2021 | Zhang |
| 2021/0385481 A1 | 12/2021 | Liu |
| 2021/0385482 A1 | 12/2021 | Liu |
| 2021/0392367 A1 | 12/2021 | Zhang |
| 2021/0409730 A1 | 12/2021 | Wang |
| 2022/0007048 A1 | 1/2022 | He |
| 2022/0014735 A1 | 1/2022 | Chen |
| 2022/0053207 A1 | 2/2022 | Deshpande |
| 2022/0060695 A1 | 2/2022 | Zhang |
| 2022/0060696 A1 | 2/2022 | Zhang |
| 2022/0060718 A1 | 2/2022 | Zhang |
| 2022/0070442 A1 | 3/2022 | Jang |
| 2022/0094909 A1 | 3/2022 | Hannuksela |
| 2022/0132148 A1 | 4/2022 | Wang |
| 2022/0159246 A1 | 5/2022 | Zhang |
| 2022/0166971 A1 | 5/2022 | Zhang |
| 2022/0166985 A1 | 5/2022 | Zhang |
| 2022/0174322 A1 | 6/2022 | Zhang |
| 2022/0217342 A1 | 7/2022 | Hannuksela |
| 2022/0239912 A1 | 7/2022 | Zhang |
| 2022/0239926 A1 | 7/2022 | Jhu |
| 2022/0248007 A1 | 8/2022 | Misra |
| 2022/0256146 A1 | 8/2022 | Zhang |
| 2022/0256148 A1 | 8/2022 | Zhang |
| 2022/0256195 A1 | 8/2022 | Zhang |
| 2022/0272332 A1 | 8/2022 | Lai |
| 2022/0272378 A1 | 8/2022 | Samuelsson |
| 2022/0394301 A1 | 12/2022 | Deshpande |

FOREIGN PATENT DOCUMENTS

| | | |
|---|---|---|
| CN | 1609957 A | 4/2005 |
| CN | 1750659 A | 3/2006 |
| CN | 101668219 A | 3/2010 |
| CN | 101990103 A | 3/2011 |
| CN | 103202016 A | 7/2013 |
| CN | 103891292 A | 6/2014 |
| CN | 103891293 A | 6/2014 |
| CN | 103975596 A | 8/2014 |
| CN | 104041033 A | 9/2014 |
| CN | 104054347 A | 9/2014 |
| CN | 104641648 A | 5/2015 |
| CN | 104702963 A | 6/2015 |
| CN | 104756495 A | 7/2015 |
| CN | 104823449 A | 8/2015 |
| CN | 104885464 A | 9/2015 |
| CN | 105027567 A | 11/2015 |
| CN | 105074819 A | 11/2015 |
| CN | 105144720 A | 12/2015 |
| CN | 105393536 A | 3/2016 |
| CN | 105531999 A | 4/2016 |
| CN | 105556975 A | 5/2016 |
| CN | 105684448 A | 6/2016 |
| CN | 106165419 A | 11/2016 |
| CN | 106303543 A | 1/2017 |
| CN | 106464893 A | 2/2017 |
| CN | 106537915 A | 3/2017 |
| CN | 106664424 A | 5/2017 |
| CN | 106797229 A | 5/2017 |
| CN | 106797476 A | 5/2017 |
| CN | 107105295 A | 8/2017 |
| CN | 107211156 A | 9/2017 |
| CN | 107801039 A | 3/2018 |
| CN | 107852490 A | 3/2018 |
| CN | 108028929 A | 5/2018 |
| CN | 108432250 A | 8/2018 |
| CN | 108781284 A | 11/2018 |
| CN | 108781294 A | 11/2018 |
| CN | 108965871 A | 12/2018 |
| CN | 109076214 A | 12/2018 |
| CN | 109076216 A | 12/2018 |
| CN | 109076218 A | 12/2018 |
| CN | 109076236 A | 12/2018 |
| CN | 109155855 A | 1/2019 |
| CN | 109600611 A | 4/2019 |
| CN | 109691102 A | 4/2019 |
| CN | 109792531 A | 5/2019 |
| CN | 109792533 A | 5/2019 |
| CN | 109996072 A | 7/2019 |
| CN | 110097889 A | 8/2019 |
| CN | 110140355 A | 8/2019 |
| CN | 110662036 A | 1/2020 |
| CN | 110677678 A | 1/2020 |
| EP | 1672930 A3 | 11/2010 |
| EP | 3468190 A1 | 4/2019 |
| EP | 3942823 A1 | 1/2022 |
| GB | 201815444 | 9/2018 |
| GB | 201902829 | 3/2019 |
| GB | 201911952 | 9/2019 |
| GB | 2577318 A | 3/2020 |
| JP | 2015015575 A | 1/2015 |
| JP | 2017520162 A | 7/2017 |
| JP | 6280679 B2 | 2/2018 |
| JP | 2020017970 A | 1/2020 |
| KR | 20140056342 A | 5/2014 |
| KR | 20150057591 A | 5/2015 |
| KR | 20170018819 A | 2/2017 |
| KR | 20180128955 A | 12/2018 |
| KR | 20180129584 A | 12/2018 |
| KR | 20200126813 A | 11/2020 |
| RU | 2686559 C2 | 4/2019 |
| WO | 2014106692 A1 | 7/2014 |
| WO | 2015008479 A1 | 1/2015 |
| WO | 2015038877 A1 | 3/2015 |
| WO | 2015056941 A1 | 4/2015 |
| WO | 2015142556 A2 | 9/2015 |
| WO | 2016100424 A1 | 6/2016 |
| WO | 2016120468 A1 | 8/2016 |
| WO | 2016127889 A1 | 8/2016 |
| WO | 2017083784 A1 | 5/2017 |
| WO | 2017137444 A1 | 8/2017 |
| WO | 2017157259 A1 | 9/2017 |
| WO | 2018099269 A1 | 6/2018 |
| WO | 2018113658 A1 | 6/2018 |
| WO | 2019008174 A1 | 1/2019 |
| WO | 2019010156 A1 | 1/2019 |
| WO | 2019073112 A1 | 4/2019 |
| WO | 2019078169 A1 | 4/2019 |
| WO | 2019145262 A1 | 8/2019 |
| WO | 2019194507 A1 | 10/2019 |

(56) References Cited

FOREIGN PATENT DOCUMENTS

| WO | 2019194568 | A1 | 10/2019 |
|---|---|---|---|
| WO | 2019222060 | A1 | 11/2019 |
| WO | 2020003273 | A1 | 1/2020 |
| WO | 2020222588 | A1 | 11/2020 |

OTHER PUBLICATIONS

Bi-directional optical flow for improvement motion compensation; Dec. 2010. (Year: 2010).*
"Information technology—High efficiency coding and m,edia delivery in heterogeneous environments—Part 2: High efficiency video coding", Rec. ITU-T H.265, ISO/IEC JTC 1/SC 29/WG 11 N17661 | ISO/IEC 23008-2 (in force edition), Apr. 20, 2018, 8 pages.
Document: JVET-G1001-v1, "Algorithm description of Joint Exploration Test Model 7 (JEM7)" Joint Video Exploration Team (JVET) of ITU-T SG 16 WP 3 and ISO/IEC JTC 1/SC 29/WG 11 7th Meeting: Torino, IT, Jul. 13-21, 2017, 50 pages.
Suehring, K., VTM software: https://vcgit.hhi.fraunhofer.de/jvet/VVCSoftware_VTM.git, Dec. 20, 2022, 3 pages.
Document: JVET-Q0270, Pettersson, M., et al., "AHG9: On Picture Header Modifications," Joint Video Experts Team (JVET) of ITU-T SG 16 WP 3 and ISO/IEC JTC 1/SC 29/WG 11 17th Meeting: Brussels, BE, Jan. 7-17, 2020, 7 pages.
Document: JVET-O0553_r1, Li, X., et al., "Non-CE4: On prediction refinement with optical flow," Joint Video Experts Team (JVET) of ITU-T SG 16 WP 3 and ISO/IEC JTC 1/SC 29/WG 11 15th Meeting: Gothenburg, SE, Jul. 3-12, 2019, 22 pages.
Document: JVET-O0070, Luo, J., et al., "CE4-2.1: Prediction refinement with optical flow for affine mode (Test 2.1)," Joint Video Experts Team (JVET) of ITU-T SG 16 WP 3 and ISO/IEC JTC 1/SC 29/WG 11 15th Meeting: Gothenburg, SE, Jul. 3-12, 2019, 4 pages.
Foreign Communication From A Related Counterpart Application, PCT Application No. PCT/CN2021/082242, English Translation of International Search Report dated Jun. 22, 2021, 11 pages.
Foreign Communication From A Related Counterpart Application, PCT Application No. PCT/CN2021/082243, English Translation of International Search Report dated Jun. 21, 2021, 13 pages.
Non-Final Office Action dated Oct. 12, 2022, 26 pages, U.S. Appl. No. 17/723,175, filed Apr. 18, 2022.
Foreign Communication From A Related Counterpart Application, PCT Application No. PCT/CN2020/139389, International Search Report dated Mar. 24, 2021, 9 pages.
Foreign Communication From A Related Counterpart Application, PCT Application No. PCT/CN2021/071008, International Search Report dated Apr. 12, 2021, 13 pages.
Foreign Communication From A Related Counterpart Application, European Application No. 21738561.6, International Search Report dated Dec. 22, 2022, 12 pages.
Foreign Communication From A Related Counterpart Application, Indian Application No. 202247039697, Indian Office Action dated Oct. 12, 2022, 7 pages.
Non-Final Office Action dated Sep. 26, 2022, 12 pages, U.S. Appl. No. 17/861,728, filed Jul. 11, 2022.
Foreign Communication From A Related Counterpart Application, PCT Application No. PCT/CN2021/071360, International Search Report dated Apr. 19, 2021, 10 pages.
Non-Final Office Action dated Mar. 13, 2023, 15 pages, U.S. Appl. No. 17/950,411, filed Feb. 16, 2023.
Foreign Communication From A Related Counterpart Application, European Application No. 21774361.6, Extended European Search Report dated Mar. 22, 2023, 8 pages.
Document: JVET-N1001-v5, Bross, B., et al., "Versatile Video Coding (Draft 5)," Joint Video Experts Team (JVET) of ITU-T SG 16 WP 3 and ISO/IEC JTC 1/SC 29/WG 11 14th Meeting: Geneva, CH, Mar. 19-27, 2019, 374 pages.
Bossen, F., Retrieved from the Internet: vcgit.hhi.fraunhofer.de/jvet/VVCSoftware_VTM/tags/VTM-5.0, Apr. 10, 2023, 2 pages.

Document: JVET-K0337, Han, Y., et al., "CE4.1.3: Affine motion compensation prediction," Joint Video Exploration Team (JVET) of ITU-T SG 16 WP 3 and ISO/IEC JTC 1/SC 29/WG 11 11th Meeting: Ljubljana, SI, Jul. 10-18, 2018, 6 pages.
JVET-L0142-r2, Lee, J., "CE4: Simplification of the common base for affine merge (Test 4.2.6)," Joint Video Experts Team (JVET) of ITU-T SG 16 WP 3 and ISO/IEC JTC 1/SC 29/WG 11 12th Meeting: Macau, CN, Oct. 8-12, 2018, 6 pages.
Document: JVET-L0632-v1, Chen, H., et al., "Crosscheck of JVET-L0142 (CE4: Simplification of the common base for affine merge (Test 4.2.6))," Joint Video Experts Team (JVET) of ITU-T SG 16 WP 3 and ISO/IEC JTC 1/SC 29/WG 11 12th Meeting: Macao, CN, Oct. 3-12, 2018, 7 pages.
Document: JVET-L0278, Huang, H, et al., "CE4.2.5: Simplification of affine merge list construction and move ATMVP to affine merge list," Joint Video Experts Team (JVET) of ITU-T SG 16 WP 3 and ISO/IEC JTC 1/SC 29/WG 11 12th Meeting: Macao, CN, Oct. 3-12, 2018, 3 pages.
Document: JVET-N0236-r5, Luo, J., et al., "CE2-related: Prediction refinement with optical flow for affine mode," Joint Video Experts Team (JVET) of ITU-T SG 16 WP 3 and ISO/IEC JTC 1/SC 29/WG 11 14th Meeting: Geneva, CH, Mar. 19-27, 2019, 25 pages.
"Series H: Audiovisual and Multimedia Systems Infrastructure of audiovisual services—Coding of moving video High efficiency video coding," Rec. ITU-T H.265 | ISO/IEC 23008-2, Feb. 2018, 692 pages.
Document: JCTVC-Y1002, Rosewarne, C., et al., "High Efficiency Video Coding (HEVC) Test Model 16 (HM 16) Improved Encoder Description Update 7," Joint Collaborative Team on Video Coding (JCT-VC) of ITU-T SG16 WP3 and ISO/IEC JTC1/SC29/WG11 25th Meeting: Chengdu, CN, Oct. 14-21, 2016, 70 pages.
JEM-7.0, Retrieved from the internet: https://jvet.hhi.fraunhofer.de/svn/svn_HMJEMSoftware/tags/ HM-16.6-JEM-7.0, Apr. 10, 2023, 1 page.
Document: JVET-L0124-v2, Liao, R., et al., "CE10.3.1.b: Triangular prediction unit mode," Joint Video Exploration Team (JVET) of ITU-T SG 16 WP 3 and ISO/IEC JTC 1/SC 29/WG 11 12th Meeting: Macao, CN, Oct. 3-12, 2018, 8 pages.
Document: JVET-L0369-v2, Chen, H., et al., "CE4: Separate list for sub-block merge candidates (Test 4.2.8)," Joint Video Experts Team (JVET) of ITU-T SG 16 WP 3 and ISO/IEC JTC 1/SC 29/WG 11 12th Meeting: Macao, CN, Oct. 3-12, 2018, 5 pages.
Document: JVET-L0368-v2, Chen, H., et al., "CE4: Affine merge enhancement with simplification (Test 4.2.2)," Joint Video Experts Team (JVET) of ITU-T SG 16 WP 3 and ISO/IEC JTC 1/SC 29/WG 11 12th Meeting: Macao, CN, Oct. 3-12, 2018, 7 pages.
Document: JVET-L0332-v1, Liu, H., et al., "CE4-related: Adaptive Motion Vector Resolution for Affine Inter Mode," Joint Video Experts Team (JVET) of ITU-T SG 16 WP 3 and ISO/IEC JTC 1/SC 29/WG 11 12th Meeting: Macao, CN, Oct. 3-12, 2018, 8 pages.
Document: JVET-K0247-v1, Lai, C., et al., "CE4.3.4: Removal of AMVR flag constraint," Joint Video Experts Team (JVET) of ITU-T SG 16 WP 3 and ISO/IEC JTC 1/SC 29/WG 11 11th Meeting: Ljubljana, SI, Jul. 10-18, 2018, 3 pages.
Document: JVET-L1001-v5, Bross, B., et al., "Versatile Video Coding (Draft 3)," Joint Video Experts Team (JVET) of ITU-T SG 16 WP 3 and ISO/IEC JTC 1/SC 29/WG 11 12th Meeting: Macao, CN, Oct. 3-12, 2018, 193 pages.
Document: JVET-M0381, Laroche, G., et al., "CE2: On Subblock Merge index coding (Test CE2.2.2)," Joint Video Experts Team (JVET) of ITU-T SG 16 WP 3 and ISO/IEC JTC 1/SC 29/WG 11 13th Meeting: Marrakech, MA, Jan. 9-18, 2019, 6 pages.
Document: JVET-M0240, Lee, H., et al., "CE2-related: Simplification of subblock-based temporal merging candidates," Joint Video Experts Team (JVET) of ITU-T SG 16 WP 3 and ISO/IEC JTC 1/SC 29/WG 11 13th Meeting: Marrakech, MA, Jan. 9-18, 2019, 6 pages.
Document: JVET-M0273, Zhang, L., et al., "CE2-related: Eady awareness of accessing temporal blocks in sub-block merge list construction," Joint Video Experts Team (JVET) of ITU-T SG 16 WP 3 and ISO/IEC JTC 1/SC 29/WG 11 13th Meeting: Marrakech, MA, Jan. 9-18, 2019, 4 pages.
Document: JVET-M1001-v7, Bross, B., et al., "Versatile Video Coding (Draft 4)," Joint Video Experts Team (JVET) of ITU-T SG

(56) References Cited

OTHER PUBLICATIONS

16 WP 3 and ISO/IEC JTC 1/SC 29/WG 11 13th Meeting: Marrakech, MA, Jan. 9-18, 2019, 300 pages.
Document: JVET-M0651, Li, G., "Crosscheck of JVET-N0236 (CE2-related: Prediction refinement with optical flow for affine mode)," Joint Video Experts Team (JVET) of ITU-T SG 16 WP 3 and ISO/IEC JTC 1/SC 29/WG 11 14th Meeting: Geneva, CH, Mar. 19-27, 2019, 2 pages.
Document: JVET-M0246_r1, Liu, H., et al., "CE2: Adaptive Motion Vector Resolution for Affine Inter Mode (Test 2.1.2)," Joint Video Experts Team (JVET) of ITU-T SG 16 WP 3 and ISO/IEC JTC 1/SC 29/WG 11 13th Meeting: Marrakech, MA, Jan. 9-18, 2019, 10 pages.
Document: JVET-O2002-v2, Chen, J., et al., "Algorithm description for Versatile Video Coding and Test Model 6 (VTM6)," Joint Video Experts Team (JVET) of ITU-T SG 16 WP 3 and ISO/IEC JTC 1/SC 29/WG 11 15th Meeting: Gothenburg, SE, Jul. 3-12, 2019, 87 pages.
Document: JVET-O0141-v2, Wang, Y-K., et al. "AHG12: Sub-Picture Based Motion-Constrained Independent Regions," Joint Video Experts Team (JVET) of ITU-T SG 16 WP 3 and ISO/IEC JTC 1/SC 29/WG 11 15th Meeting: Gothernburg, SE, Jul. 3-12, 2019, 3 pages.
Document: JVET-N0826-v1, Wang, Y-K., et al. "AHG12: Harmonized Proposal for Sub-Picture-based Coding for VVC," Joint Video Experts Team (JVET) of ITU-T SG 16 WP 3 and ISO/IEC JTC 1/SC 29/WG 11 14th Meeting: Geneva, CH, Mar. 19-27, 2019, 3 pages.
Document: JVET-O2001-vE, Bross, B., et al. "Versatile Video Coding (Draft 6)," Joint Video Experts Team (JVET) of ITU-T SG 16 WP 3 and ISO/IEC JTC 1/SC 29/WG 11 15th Meeting: Gothenburg, SE, Jul. 3-12, 2019, 455 pages.
Document: JCTVC-AI0023-v2, Wennersten, P., et al. "Encoder-Only GOP-Based Temporal Filter," Joint Collaborative Team on Video Coding (JCT-VC) of ITU-T SG 16 WP 3 and ISO/IEC JTC 1/SC 29/WG 11 35th Meeting: Geneva, CH, Mar. 22-27, 2019, 7 pages.
Document: JVET-P2001-vE, Bross, B., et al., "Versatile Video Coding (Draft 7)," Joint Video Experts Team (JVET) of ITU-T SG 16 WP 3 and ISO/IEC JTC 1/SC 29/WG 11 16th Meeting: Geneva, CH, Oct. 1-11, 2019, 491 pages.
Document: JVET-P0884-v5, Gao, H., et al. "Simplified GEO without Multiplication and Minimum Blending Mask Storage (Harmonization of JVET-P0107, JVET-P0264 and JVET-P0304)," Joint Video Experts Team (JVET) of ITU-T SG 16 WP 3 and ISO/IEC JTC 1/ SC 29/WG 11 16th Meeting: Geneva, CH, Oct. 1-11, 2019, 9 pages.
Document: JVET-P1008-v2, Misra, K., et al. "CE5-related: On the Design of CC-ALF," Joint Video Experts Team (JVET) of ITU-T SG 16 WP 3 and ISO/IEC JTC 1/SC 29/WG 11 16th Meeting: Geneva, CH, Oct. 1-11, 2019, 6 pages.
Document: JVET-N0107-v1, Wang, Y-K., et al., "AHG12: Sub-Picture-Based Coding for VVC," Joint Video Experts Team (JVET) of ITU-T SG 16 WP 3 and ISO/IEC JTC 1/SC 29/WG 11 14th Meeting: Geneva, CH, Mar. 19-27, 2019, 4 pages.
Document: JVET-M0272, Zhang, L., et al. "CE4-Related: Restrictions on History Based Motion Vector Prediction," Joint Video Experts Team (JVET) of ITU-T SG 16 WP 3 and ISO/IEC JTC 1/SC 29/WG 11 13th Meeting: Marrakech, MA, Jan. 9-18, 2019, 4 pages.
Document: JVET-M0261, Hannuksela, M., et al. "AHG12: On Grouping of Tiles," Joint Video Experts Team (JVET) of ITU-T SG 16 WP 3 and ISO/IEC JTC 1/SC 29/WG 11 13th Meeting: Marrakech, MA, Jan. 9-18, 2019, 11 pages.
Document: JVET-O0182r1, He, Y., et al. "AHG12: On Picture and Sub-Picture Signaling," Joint Video Experts Team (JVET) of ITU-T SG 16 WP 3 and ISO/IEC JTC 1/SC 29/WG 11 15th Meeting: Gothenburg, SE, Jul. 3-12, 2019, 6 pages.
Document: JVET-O0555-v1, Boyce., J., et al. "Sub-Pictures and Sub-Picture Sets with Level Derivation," Joint Video Experts Team (JVET) of ITU-T SG 16 WP 3 and ISO/IEC JTC 1/SC 29/WG 11 15th Meeting: Gothenburg, SE, Jul. 3-12, 2019, 11 pages.

Document: JVET-O0334, Choi, B., et al., "AHG8/AHG12: On Sub-Picture Partitioning Support with Layers," Joint Video Experts Team (JVET) of ITU-T SG 16 WP 3 and ISO/IEC JTC 1/SC 29/WG 11 15th Meeting: Gothenburg, SE, Jul. 3-12, 2019, 3 pages.
JVET-M1001-v5, Bross, B., et al., "Versatile Video Coding (Draft 4)" Joint Video Experts Team (JVET) of ITU-T SG 16 WP 3 and ISO/IEC JTC 1/SC 29/WG 11 13th Meeting: Marrakech, MA, Jan. 9-18, 2019, 287 pages.
Document: JVET-N0073-v1, Chen, L., et al. "AHG17: [SYS-VVC] Signalling Subpicture Coded Video Sequence," Joint Video Experts Team (JVET) of ITU-T SG 16 WP 3 and ISO/IEC JTC 1/SC 29/WG 11 14th Meeting: Geneva, Switzerland, Mar. 19-27, 2019, 7 pages.
Document: JVET-M0154-v2, Choi, B., et al., "AHG17: On Decoded Picture Buffer Management for VVC," Joint Video Experts Team (JVET) of ITU-T SG 16 WP 3 and ISO/IEC JTC 1/SC 29/WG 11 13th Meeting: Marrakech, MA, Jan. 9-18, 2019, 5 pages.
Document: JVET-N0258-v1, Zhu, W., et al. "CE8-related: Palette Mode Coding," Joint Video Experts Team (JVET) of ITU-T SG 16 WP 3 and ISO/IEC JTC 1/SC 29/WG 11 14th Meeting: Geneva, CH, Mar. 19-27, 2019, 6 pages.
Document: JVET-N0472_v2, Xu, J., et al. "Non-CE8: On IBC Reference Buffer Design," Joint Video Experts Team (JVET) of ITU-T SG 16 WP 3 and ISO/IEC JTC 1/SC 29/WG 11 14th Meeting: Geneva, CH, Mar. 19-27, 2019, 6 pages.
Document: JVET-P0143-v1, Chen, L., et al. "AHG17/AHG12: On Signalling of Subpicture Structure in the SPS," Joint Video Experts Team (JVET) of ITU-T SG 16 WP 3 and ISO/IEC JTC 1/SC 29/WG 11 16th Meeting: Geneva, CH, Oct. 1-11, 2019, 4 pages.
Document: JVET-P0219, Choi, B., et al. "AHG8/AHG17: On Signaling Reference Picture Resampling," Joint Video Experts Team (JVET) of ITU-T SG 16 WP 3 and ISO/IEC JTC 1/SC 29/WG 11 16th Meeting: Geneva, CH, Oct. 1-11, 2019, 3 pages.
Document: JVET-P0144-v1, Chen, L., et al. "AHG17/AHG12: On Associating Slices with a Subpicture," Joint Video Experts Team (JVET) of ITU-T SG 16 WP 3 and ISO/IEC JTC 1/SC 29/WG 11 16th Meeting: Geneva, CH, Oct. 1-11, 2019, 7 pages.
Document: JVET-P2001-v9, Bross, B., et al., "Versatile Video Coding (Draft 7)," Joint Video Experts Team (JVET) of ITU-T SG 16 WP 3 and ISO/IEC JTC 1/SC 29/WG 11 16th Meeting: Geneva, CH, Oct. 1-11, 2019, 495 pages.
Document: JVET-O0636_r1, Misra, K., et al. "Cross-Component Adaptive Loop Filter for Chroma," Joint Video Experts Team (JVET) of ITU-T SG 16 WP 3 and ISO/IEC JTC 1/SC 29/WG 1115th Meeting: Gothenburg, SE, Jul. 3-12, 2019, 9 pages.
Document: JVET-L0266-v1, Zhang, L., et al., "CE4: History-Based Motion Vector Prediction (Test 4.4.7)," Joint Video Experts Team (JVET) of ITU-T SG 16 WP 3 and ISO/IEC JTC 1/SC 29/WG 11 12th Meeting: Macao, CN, Oct. 3-12, 2018, 4 pages.
Document: JVET-P0141-v1, Chen, L., et al., "AHG17/AHG12: On Signalling the Subpicture IDs," Joint Video Experts Team (JVET) of ITU-T SG 16 WP 3 and ISO/IEC JTC 1/SC 29/WG 11 16th Meeting: Geneva, CH, Oct. 1-11, 2019, 5 pages.
Document: JVET-N0276, Boyce, J., "AHG15: On interoperability point signalling," Joint Video Experts Team (JVET) of ITU-T SG 16 WP 3 and ISO/IEC JTC 1/SC 29/WG 11 14th Meeting: Geneva, CH, Mar. 19-27, 2019, 16 pages.
Document: JVET-Q2000-v2, Sullivan, G., et al., "Meeting Report of the 17th Meeting of the Joint Video Experts Team (JVET), Brussels, BE, Jan. 7-17, 2020," Joint Video Experts Team (JVET) of ITU-T SG 16 WP 3 and ISO/IEC JTC 1/SC 29/WG 11 17th Meeting: Brussels, BE, Jan. 7-17, 2020, 378 pages.
Document: JVET-Q0590-v1, Wang, Y.K., et al., "AHG12: A summary of proposals on subpicture ID signalling," Joint Video Experts Team (JVET) of ITU-T SG 16 WP 3 and ISO/IEC JTC 1/SC 29/WG 11 17th Meeting: Brussels, BE, Jan. 7-17, 2020, 4 pages.
Document: JVET-Q0297, Huang, H., et al., "AHG16: Merge estimation region with constraint in HMVP update," Joint Video Experts Team (JVET) of ITU-T SG 16 WP 3 and ISO/IEC JTC 1/SC 29/WG 11 17th Meeting: Brussels, BE, 67-17 Jan. 2020, 11 pages.
Document: JVET-O1170-v1, Xu, J., et al., "Bitstream conformance with a virtual IBC buffer concept," Joint Video Experts Team (JVET) of ITU-T SG 16 WP 3 and ISO/IEC JTC 1/SC 29/WG 11 15th Meeting: Gothenburg, SE, Jul. 3-12, 2019, 8 pages.

(56) References Cited

OTHER PUBLICATIONS

Document: JVET-M0457-v1, Ye, J., et al., "CE8: Palette predictor list enhancement (Test 8.2.6)," Joint Video Experts Team (JVET) of ITU-T SG 16 WP 3 and ISO/IEC JTC 1/SC 29/WG 11 13th Meeting: Marrakech, MA, Jan. 9-18, 2019, 3 pages.
Document: JVET-P0129-v1, He, Y., et al., "AHG12: On subpicture grid syntax" Joint Video Experts Team (JVET) of ITU-T SG 16 WP 3 and ISO/IEC JT C 1/SC 29/WG 1116th Meeting: Geneva, Oct. 1-11, 2019, 3 pages.
Document: JVET-P0377-v1, Zhang, K., et al., "AHG12: Cleanups on syntax design of sub-pictures," Joint Video Experts Team (JVET) of ITU-T SG 16 WP 3 and ISO/IEC JTC 1/SC 29/WG 11 16th Meeting: Geneva, CH, Oct. 1-11, 2019, 4 pages.
Document: JVET-N0055-v2, Choi, B., et al. "AHG12: on Sub-Picture Partitioning," Joint Video Experts Teams (JVET) of ITU-T SG 16 WP 3 and ISO/IEC JTC 1/SC 29/WG 11 14th Meeting, Geneva, CH, Mar. 19-27, 2019, 8 pages.
Foreign Communication From A Related Counterpart Application, PCT Application No. PCT/CN2020/091537, International Search Report dated Jul. 29, 2020, 8 pages.
Non-Final Office Action dated Feb. 4, 2022, 7 pages, U.S. Appl. No. 17/521,043, filed Nov. 8, 2021.
Foreign Communication From A Related Counterpart Application, PCT Application No. PCT/CN2020/091538, International Search Report dated Aug. 19, 2020, 10 pages.
Document: JVET-P0693, Hannuksela, M., et al. "AHG12: Summary of HLS Proposals on Subpictures," Joint Video Experts Team (JVET) of ITU-T SG 16 WP 3 and ISO/IEC JTC 1/SC 29/WG 11 16th Meeting: Geneva, CH, Oct. 1-11, 2019, 6 pages.
Document: JVET-M0350_v2, Fu, T., et al. "CE4-Related: Quadtree-Based Merge Estimation Region for VVC," Joint Video Experts Team (JVET) of ITU-T SG 16 WP 3 and ISO/IEC JTC 1/SC 29/WG 11 13th Meeting: Marrakech, MA, Jan. 9-18, 2019, 5 pages.
Document: JVET-Q0290, Hsiang, S., et al., "AHG9/AHG12: Modifications related to subpicture signalling and RPR," Joint Video Experts Team (JVET) of ITU-T SG 16 WP 3 and ISO/IEC JTC 1/SC 29/WG 11 17th Meeting: Brussels, BE, Jan. 7-17, 2020, 5 pages.
Document: JVET-Q0043, Nishi, T., et al., "AHG9: Constraint about usage of reference picture resampling and subpictures," Joint Video Experts Team (JVET) of ITU-T SG 16 WP 3 and ISO/IEC JTC 1/SC 29/WG 11 17th Meeting: Brussels, BE, Jan. 7-17, 2020, 2 pages.
Document: JVET-O0133, Hendry, F., et al., "AHG8: Support for reference picture resampling—handling of picture size signalling, conformance windows, and DPB management," Joint Video Experts Team (JVET) of ITU-T SG 16 WP 3 and ISO/IEC JTC 1/SC 29/WG 11 15th Meeting: Gothenburg, SE, Jul. 3-12, 2019, 3 pages.
Document: JVET-O1164, Chen, P., et al., "AHG8: Integrated Specification Text for Reference Picture Resampling," Joint Video Experts Team (JVET) of ITU-T SG 16 WP 3 and ISO/IEC JTC 1/SC 29/WG 11 15th Meeting: Gothenburg, SE, Jul. 3-12, 2019, 1 page.
Document: JVET-O0204, Samuelsson, J., et al., "AHG 8: Adaptive Resolution Change (ARC) High-Level Syntax (HLS)," Joint Video Experts Team (JVET) of ITU-T SG 16 WP 3 and ISO/IEC JTC 1/SC 29/WG 11 15th Meeting: Gothenburg, SE, Jul. 3-12, 2019, 6 pages.
Document: JVET-O0303-v2, Chen, P., et al., "AHG 8: Adaptive Resolution Change," Joint Video Experts Team (JVET) of ITU-T SG 16 WP 3 and ISO/IEC JTC 1/SC 29/WG 11 15th Meeting: Gothenburg, SE, Jul. 3-12, 2019, 8 pages.
Senanayake, R., et al., "High performance hardware architectures for intra Block Copy and Palette Coding for HEVC Screen Content Coding extension" IEEE, 2017, 6 pages.
Document: JVET-P0545-v1, Fan, K., et al., "CE6-2.3-related: Reduced 8x8 matrices for LFNST," Joint Video Experts Team (JVET) of ITU-T SG 16 WP 3 and ISO/IEC JTC 1/SC 29/WG 11 16th Meeting: Geneva, CH, Oct. 1-11, 2019, 3 pages.
Document: JVET-Q0787-v2, Suehring, K., et al., "AHG9: Subpicture location signalling bugfix," Joint Video Experts Team (JVET) of ITU-T SG 16 WP 3 and ISO/IEC JTC 1/SC 29/WG 11 17th Meeting: Brussels, BE, Jan. 7-17, 2020, 3 pages.

Document: JVET-M0377-v1, Zhang, K., et al., "AHG17: Picture header NAL unit type," Joint Video Experts Team (JVET) of ITU-T SG 16 WP 3 and ISO/IEC JTC 1/SC 29/WG 11 14th Meeting: Marrakesh, MA, Jan. 9-18, 2019, 7 pages.
Foreign Communication From A Related Counterpart Application, PCT Application No. PCT/CN2020/091539, International Search Report dated Aug. 21, 2020, 9 pages.
Final Office Action dated May 6, 2022, 22 pages, U.S. Appl. No. 17/521,012, filed Nov. 8, 2021.
Non-Final Office Action dated Jan. 24, 2022, 8 pages, U.S. Appl. No. 17/521,012, filed Nov. 8, 2021.
Foreign Communication From A Related Counterpart Application, PCT Application No. PCT/CN2020/091540, International Search Report dated Jul. 30, 2020, 10 pages.
Non-Final Office Action dated Mar. 3, 2022, 17 pages, U.S. Appl. No. 17/520,975, filed Nov. 8, 2021.
Foreign Communication From A Related Counterpart Application, PCT Application No. PCT/CN2020/133271, International Search Report dated Mar. 8, 2021, 10 pages.
Foreign Communication From A Related Counterpart Application, PCT Application No. PCT/CN2020/108142, International Search Report dated Oct. 28, 2020, 9 pages.
Non-Final Office Action dated Apr. 15, 2022, 11 pages, U.S. Appl. No. 17/665,242, filed Feb. 4, 2022.
Foreign Communication From A Related Counterpart Application, PCT Application No. PCT/CN2020/108159, International Search Report dated Nov. 12, 2020, 9 pages.
Foreign Communication From A Related Counterpart Application, PCT Application No. PCT/CN2020/108175, International Search Report dated Nov. 18, 2020, 10 pages.
Foreign Communication From A Related Counterpart Application, European Application No. 20852929.7, Extended European Search Report dated Sep. 26, 2022, 15 pages.
Non-Final Office Action dated May 25, 2022, 25 pages, U.S. Appl. No. 17/665,275, filed Feb. 4, 2022.
Foreign Communication From A Related Counterpart Application, PCT Application No. PCT/CN2020/108182 International Search Report dated Nov. 16, 2020, 11 pages.
Foreign Communication From A Related Counterpart Application, European Application No. 20852734.1, Extended European Search Report dated Jan. 20, 2023, 8 pages.
Foreign Communication From A Related Counterpart Application, Indian Application No. 202247007118, Indian Office Action dated Jul. 6, 2022, 7 pages.
Non-Final Office Action dated May 24, 2022, 47 pages, U.S. Appl. No. 17/665,220, filed May 24, 2022.
Notice of Allowance dated Sep. 29, 2022, 24 pages, U.S. Appl. No. 17/665,220, filed Feb. 4, 2022.
Foreign Communication From A Related Counterpart Application, PCT Application No. PCT/CN2020/119931, International Search Report dated Jan. 12, 2021, 10 pages.
Non-Final Office Action dated Jun. 8, 2022, 16 pages, U.S. Appl. No. 17/711,319, filed Apr. 1, 2022.
Foreign Communication From A Related Counterpart Application, PCT Application No. PCT/CN2020/119932, International Search Report dated Dec. 30, 2020, 9 pages.
Foreign Communication From A Related Counterpart Application, European Application No. 20871705.8, Extended European Search Report dated Oct. 31, 2022.
Non-Final Office Action dated Jun. 7, 2022, 14 pages, U.S. Appl. No. 17/711,294, filed Apr. 1, 2022.
Foreign Communication From A Related Counterpart Application, PCT Application No. PCT/CN2020/121767, International Search Report dated Jan. 27, 2021.
Foreign Communication From A Related Counterpart Application, European Application No. 20876854.9, Extended European Search Report dated Oct. 31, 2022.
Foreign Communication From A Related Counterpart Application, Indian Application No. 202247022804, Indian Office Action dated Sep. 8, 2022, 6 pages.
Non-Final Office Action dated Aug. 1, 2022, 27 pages, U.S. Appl. No. 17/723,089, filed Apr. 18, 2022.

(56) References Cited

OTHER PUBLICATIONS

Foreign Communication From A Related Counterpart Application, PCT Application No. PCT/CN2020/121768, International Search Report dated Jan. 8, 2021.
Foreign Communication From A Related Counterpart Application, Indian Application No. 202247023112, Indian Office Action dated Aug. 18, 2022, 7 pages.
Document: JVET-O2000, Sullivan, G., et al., "Meeting Report of the 15th Meeting of the Joint Video Experts Team (JVET), Gothenburg, SE, Jul. 3-12, 2019," Joint Video Experts Team (JVET) of ITU-T SG 16 WP 3 and ISO/IEC JTC 1/SC 29/WG 11 15th Meeting: Gothenburg, SE, Jul. 3-12, 2019, 409 pages.
Document: JVET-N0195-v1, Li, J., et al., "CE2: Memory bandwidth reduction for the affine mode(Test2.4.3)", Joint Video Experts Team(JVET) of ITU-T SG 16 WP 3 and ISO/IEC JTC 1/SC 29/WG 11 14th Meeting: Geneva, CH, Mar. 19-27, 2019, 4 pages.
Document: JVET-O0530-v2, Li, G., et al., "Non-CE4: Adaptive subblock size for affine motion compensation," Joint Video Experts Team (JVET) of ITU-T SG 16 WP 3 and ISO/IEC JTC 1/SC 29/WG 11 15th Meeting: Gothenburg, SE, Jul. 3-12, 2019, 9 pages.
Document: JVET-M0247, Liu, H., et al., "CE2-related: Joint test of AMVR for Affine Inter mode(Test 2.1.1 and Test 2.1.2)", Joint Video Experts Team (JVET) of ITU-T SG 16 WP 3 and ISO/IEC JTC 1/SC 29/WG 11 13th Meeting: Marrakech, MA, Jan. 9-18, 2019, 3 pages.
Document: JVET-P0126, Hannuksela, M., et al., "AHG12:Signalling of subpicture IDs and layout," Joint Video Experts Team (JVET) of ITU-T SG 16 WP 3 and ISO/IEC JTC 1/SC 29/WG 11 16th Meeting: Geneva, CH, Oct. 1-11, 2019, 2 pages.
Document: JCTVC-R1014, Joshi, R., et al., "Screen content coding test model 2 (SCM 2)," Joint Collaborative Team on Video Coding (JCT-VC) of ITU-T SG 16 WP 3 and ISO/IEC JTC 1/SC 29/WG 11 17th Meeting: Valencia, ES, Mar. 27-Apr. 4, 2014, 10 pages.
Document: JVET-N0052, Wenger, S., et al., "[AHG19] On Signaling of Adaptive Resolution Change," Joint Video Experts Team (JVET) of ITU-T SG16 WP 3 and ISO/IEC JTC 1/SC 29/WG 11, JVET-N0052, 14th Meeting: Geneva, Mar. 19-27, 2019, 11 pages.
Non-Final Office Action from U.S. Appl. No. 17/831,074 dated Dec. 19, 2023, 67 pages.
Final Office Action from U.S. Appl. No. 17/861,728 dated Nov. 21, 2023, 21 pages.
Non-Final Office Action from U.S. Appl. No. 17/950,411 dated Nov. 27, 2023, 22 pages.

\* cited by examiner

1100

1102

Performing a conversion between a video comprising one or more pictures comprising one or more slices and a bitstream of the video, wherein the bitstream conforms to a format rule that specifies whether a first syntax element and a second syntax element are respectively included in a picture header and a slice header, or are inferred are based on a value of a third syntax element in a picture parameter set, wherein the first syntax element indicates whether a deblocking filter is disabled at a picture level of the video, wherein the second syntax element indicates whether the deblocking filter is disabled at a slice level of the video, and wherein the third syntax element indicates whether the deblocking filter is enabled for the one or more pictures that refer to the picture parameter set

FIG. 11

PREDICTION REFINEMENT FOR AFFINE MERGE AND AFFINE MOTION VECTOR PREDICTION MODE

CROSS REFERENCE TO RELATED APPLICATIONS

This application is a continuation of International Patent Application No. PCT/CN2021/082243, filed on Mar. 23, 2021 which claims the priority to and benefits of International Patent Application No. PCT/CN2020/080602, filed on Mar. 23, 2020. All the aforementioned patent applications are hereby incorporated by reference in their entireties.

TECHNICAL FIELD

This patent document relates to image and video coding and decoding.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The present document discloses techniques that can be used by video encoders and decoders for processing coded representation of video using control information useful for decoding of the coded representation.

In one example aspect, a video processing method is disclosed. The method includes performing a conversion between a video comprising a picture comprising one or more slices and a bitstream of the video, wherein the conversion conforms to a rule that specifies that whether a deblocking filter is applied to the one or more slices referring to a picture parameter set is based at least on a first syntax element included in the picture parameter set, and wherein the first syntax element indicates whether the deblocking filter is disabled for the picture.

In another example aspect, a video processing method is disclosed. The method includes performing a conversion between a video comprising a picture comprising one or more slices and a bitstream of the video, wherein the conversion conforms to a rule that specifies that whether a deblocking filter is applied to the one or more slices referring to a picture parameter set is based only on a syntax element included in the picture parameter set that indicates whether the deblocking filter is disabled.

In another example aspect, a video processing method is disclosed. The method includes performing a conversion between a video comprising one or more pictures comprising one or more slices and a bitstream of the video, wherein the bitstream conforms to a rule, wherein the rule specifies that whether a deblocking operation for a slice or a picture will be overridden at a slice level or at a picture level is determined based on a first value of a first syntax element at the slice level or a second value of a second syntax element at the picture level, and wherein the rule specifies that, responsive to an absence of the first syntax element in a slice header, the first value of the first syntax element is determined independent of the second value of the second syntax element at the picture level.

In another example aspect, a video processing method is disclosed. The method includes performing a conversion between a video comprising one or more pictures comprising one or more slices and a bitstream of the video, wherein the bitstream conforms to a rule, wherein the rule specifies that whether deblocking parameters are included in a slice header or in a picture header is determined based on a first value of a first syntax element at a slice level or a second value of a second syntax element at a picture level, and wherein the rule specifies that, responsive to an absence of the first syntax element in the slice header, the first value of the first syntax element is determined independent of the second value of the second syntax element at the picture level.

In another example aspect, a video processing method is disclosed. The method includes performing a conversion between a video comprising one or more pictures comprising one or more slices and a bitstream of the video, wherein the bitstream conforms to a format rule that specifies whether a first syntax element and a second syntax element are respectively included in a picture header and a slice header, or are inferred are based on a value of a third syntax element in a picture parameter set, wherein the first syntax element indicates whether a deblocking filter is disabled at a picture level of the video, wherein the second syntax element indicates whether the deblocking filter is disabled at a slice level of the video, and wherein the third syntax element indicates whether the deblocking filter is enabled for the one or more pictures that refer to the picture parameter set.

In another example aspect, a video processing method is disclosed. The method includes performing a conversion between a video comprising one or more pictures comprising one or more slices and a bitstream of the video, wherein the conversion conforms to a rule that specifies that whether a deblocking filter is applied to a slice is based on syntax elements included in a slice header and/or a picture header and/or a picture parameter set referred to by the slice, and wherein the syntax elements indicate whether the deblocking filter is enabled at a picture parameter set level and/or a slice level and/or a picture level.

In another example aspect, a video processing method is disclosed. The method includes performing a conversion between a video comprising one or more pictures comprising one or more slices and a bitstream of the video, wherein the conversion conforms to a rule that specifies that whether a deblocking filter is applied to a slice is based on syntax elements included in a sequence parameter set referred to by the slice, and wherein the syntax elements include a first syntax element that indicates whether the deblocking filter is enabled and/or a set of syntax elements that indicate a first set of parameters of the deblocking filter.

In another example aspect, a video processing method is disclosed. The method includes performing a conversion between a video comprising one or more pictures comprising one or more slices and a bitstream of the video, wherein the conversion conforms to a rule that specifies that whether a deblocking filter is applied to a slice is based on a non-binary syntax element included in a video unit level, and wherein the non-binary syntax element indicates whether and/or how the deblocking filter is applied to the one or more slices.

In another example aspect, a video processing method is disclosed. The method includes performing a conversion between a video comprising one or more pictures comprising one or more slices and a bitstream of the video, wherein the conversion conforms to a rule that specifies that: (1) a deblocking filter is enabled at a picture level of the video or a slice level of the video, and (2) 0-valued deblocking parameter offsets for beta and tC are used for parameters of the deblocking filter.

In another example aspect, a video processing method is disclosed. The method includes determining, for a conversion between a video block of a video and a bitstream of the video, a size of prediction block corresponding to the video block according to a rule; and performing the conversion based on the determining, wherein the rule specifies that a first size of the prediction block is determined responsive to whether a prediction refinement using optical flow technique is used for coding the video block, and wherein the video block has a second size and is coded using an affine merge mode or an affine advanced motion vector prediction mode.

In another example aspect, a video processing method is disclosed. The method includes performing a conversion between a video comprising one or more pictures comprising one or more slices and a bitstream of the video, wherein a rule specifies that a first syntax element is indicated in a video level that is higher than a picture level or a slice level, and wherein the first syntax element indicates whether the picture level or the slice level includes a quantization parameter delta.

In another example aspect, a video processing method is disclosed. The method includes performing a conversion between a video comprising one or more pictures comprising one or more slices and a bitstream of the video, wherein a first rule specifies that a first flag in a first video level indicates whether one or more chroma quantization parameter offsets are included in the first video level, wherein the first video level is higher than a slice level, wherein a second rule specifies that a second flag in a second video level indicates whether one or more chroma quantization parameter offsets are included in a picture header or a slice header, and wherein the second video level is higher than a picture level.

In another example aspect, a video processing method is disclosed. The method includes performing a conversion between a video comprising one or more pictures comprising one or more slices and a bitstream of the video, wherein the bitstream includes a first syntax element indicative of a coding block subdivision value, and wherein the coding block subdivision value has a range according to a rule.

In another example aspect, a video processing method is disclosed. The method includes performing a conversion between a video comprising one or more video pictures comprising one or more video slices, wherein the conversion conforms to a first rule that specifies that a decision regarding applicability of a deblocking filter to the one or more video slices referring to a video picture parameter set is performed based on a deblocking syntax field that is included in a picture header of a corresponding video picture.

In another example aspect, another video processing method is disclosed. The method includes performing a conversion between a video comprising one or more video pictures comprising one or more video slices, wherein the conversion conforms to a rule that specifies a constraint on applicability of deblocking filter to a video slice based on fields included at a slice header level and/or a picture header level and/or a picture parameter set level for the video slice.

In another example aspect, another video processing method is disclosed. The method includes making a determination, about applicability of a prediction refinement based optical flow (PROF) coding with an affine advanced motion vector predictor coding based on a first rule or with an affine merge mode based on a second rule; and performing a conversion between a video block of a video and a coded representation of the video according to the determination.

In another example aspect, another video processing method is disclosed. The method includes performing a conversion between a video comprising one or more pictures comprising one or more slices and a coded representation of the video, wherein a first syntax element at a picture level or a slice level and/or a second syntax element at another level indicative of a quantization parameter delta or an offset signaling are conditionally included in the coded representation according to a rule.

In another example aspect, another video processing method is disclosed. The method includes performing a conversion between a video comprising one or more pictures comprising one or more slices and a coded representation of the video, wherein the coded representation includes a syntax element indicative of a coding block subdivision value (cbSubDiv) whose range is according to a rule.

In yet another example aspect, a video encoder apparatus is disclosed. The video encoder comprises a processor configured to implement above-described methods.

In yet another example aspect, a video decoder apparatus is disclosed. The video decoder comprises a processor configured to implement above-described methods.

In yet another example aspect, a computer readable medium having code stored thereon is disclose. The code embodies one of the methods described herein in the form of processor-executable code.

These, and other, features are described throughout the present document.

BRIEF DESCRIPTION OF DRAWINGS

FIGS. 7 to 19 are flowcharts for methods of video processing, in accordance with various examples.

DETAILED DESCRIPTION

Figure 1:
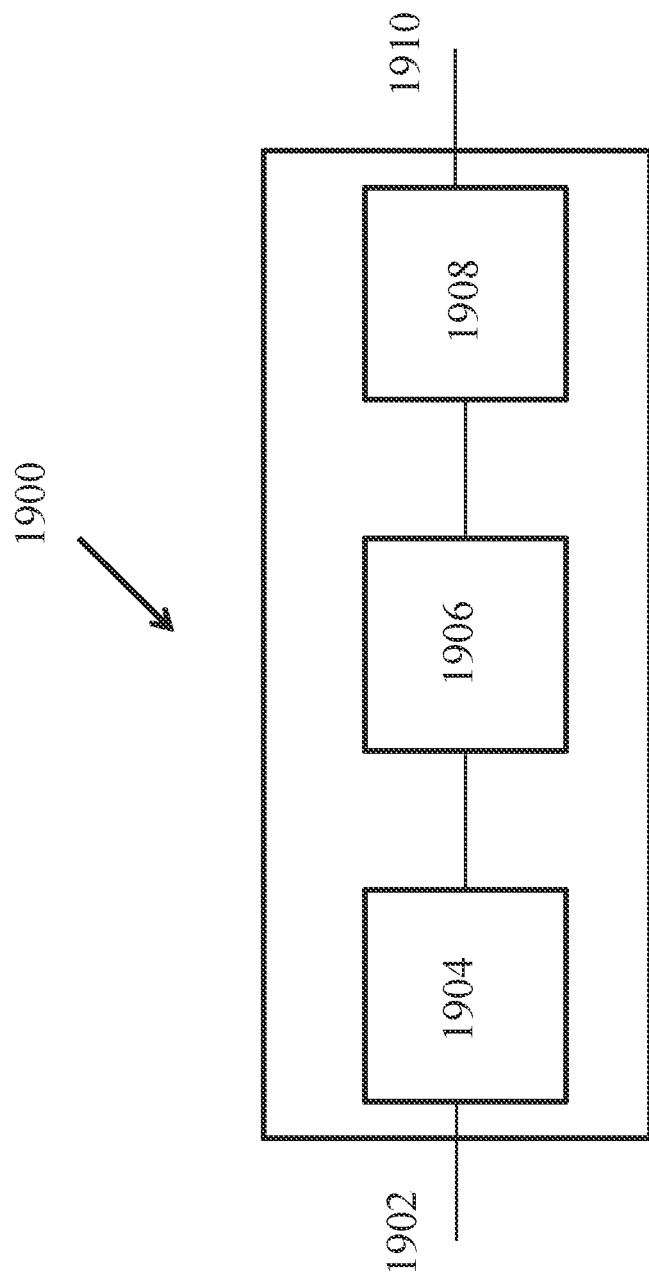
FIG. 1 is a block diagram of an example video processing system.

Section headings are used in the present document for ease of understanding and do not limit the applicability of techniques and embodiments disclosed in each section only to that section. Furthermore, H.266 terminology is used in some description only for ease of understanding and not for limiting scope of the disclosed techniques. As such, the techniques described herein are applicable to other video codec protocols and designs also.

1. INTRODUCTION

This document is related to video coding technologies. Specifically, it is about the support of deblocking signaling, Quantization Parameter (QP) delta/offset signaling, cbSubdiv value defining for quantization group, and Prediction Refinement with Optical Flow (PROF) handling in video coding. The ideas may be applied individually or in various combination, to any video coding standard or non-standard video codec that supports multi-layer video coding, for example, the being-developed Versatile Video Coding (VVC).

2. ABBREVIATIONS

APS Adaptation Parameter Set
AU Access Unit
AUD Access Unit Delimiter
AVC Advanced Video Coding
CLVS Coded Layer Video Sequence
CPB Coded Picture Buffer
CPMVP Control Point Motion Vector Predictor
CRA Clean Random Access
CTU Coding Tree Unit
CVS Coded Video Sequence
DPB Decoded Picture Buffer
DPS Decoding Parameter Set
EOB End Of Bitstream
EOS End Of Sequence
GDR Gradual Decoding Refresh
HEVC High Efficiency Video Coding
HRD Hypothetical Reference Decoder
IDR Instantaneous Decoding Refresh
JEM Joint Exploration Model
MCTS Motion-Constrained Tile Sets
NAL Network Abstraction Layer
OLS Output Layer Set
PH Picture Header
PPS Picture Parameter Set
PROF Prediction Refinement with Optical Flow
PTL Profile, Tier and Level
PU Picture Unit
RBSP Raw Byte Sequence Payload
SEI Supplemental Enhancement Information
SH Slice Header
SPS Sequence Parameter Set
SVC Scalable Video Coding
TMVP Temporal Motion Vector Prediction
VCL Video Coding Layer
VPS Video Parameter Set
VTM VVC Test Model
VUI Video Usability Information
VVC Versatile Video Coding
WP Weighted Prediction

3. INITIAL DISCUSSION

Video coding standards have evolved primarily through the development of the well-known International Telecommunication Union-Telecommunication Standardization Sector (ITU-T) and International Organization for Standardization (ISO)/International Electrotechnical Commission (IEC) standards. The ITU-T produced H.261 and H.263, ISO/IEC produced Moving Picture Experts Group (MPEG)-1 and MPEG-4 Visual, and the two organizations jointly produced the H.262/MPEG-2 Video and H.264/MPEG-4 Advanced Video Coding (AVC) and H.265/High Efficiency Video Coding (HEVC) standards. Since H.262, the video coding standards are based on the hybrid video coding structure wherein temporal prediction plus transform coding are utilized. To explore the future video coding technologies beyond HEVC, the Joint Video Exploration Team (JVET) was founded by Video Coding Experts Group (VCEG) and MPEG jointly in 2015. Since then, many new methods have been adopted by JVET and put into the reference software named Joint Exploration Model (JEM). The JVET meeting is concurrently held once every quarter, and the new coding standard is targeting at 50% bitrate reduction as compared to HEVC. The new video coding standard was officially named as Versatile Video Coding (VVC) in the April 2018 JVET meeting, and the first version of VVC test model (VTM) was released at that time. As there are continuous effort contributing to VVC standardization, new coding techniques are being adopted to the VVC standard in every JVET meeting. The VVC working draft and test model VTM are then updated after every meeting. The VVC project is now aiming for technical completion Final Draft International Standard (FDIS) at the July 2020 meeting.

3.1. PPS Syntax and Semantics

In the latest VVC draft text, the Picture Parameter Set (PPS) syntax and semantics are as follows:

|  | Descriptor |
|---|---|
| pic_parameter_set_rbsp( ) { |  |
|   pps_pic_parameter_set_id | ue(v) |
|   pps_seq_parameter_set_id | u(4) |
|   mixed_nalu_types_in_pic_flag | u(1) |
|   pic_width_in_luma_samples | ue(v) |
|   pic_height_in_luma_samples | ue(v) |
|   pps_conformance_window_flag | u(1) |
|   if( pps_conformance_window_flag ) { |  |
|     pps_conf_win_left_offset | ue(v) |
|     pps_conf_win_right_offset | ue(v) |
|     pps_conf_win_top_offset | ue(v) |
|     pps_conf_win_bottom_offset | ue(v) |
|   } |  |
|   scaling_window_explicit_signalling_flag | u(1) |
|   if( scaling_window_explicit_signalling_flag ) { |  |
|     scaling_win_left_offset | ue(v) |
|     scaling_win_right_offset | ue(v) |
|     scaling_win_top_offset | ue(v) |
|     scaling_win_bottom_offset | ue(v) |
|   } |  |
|   output_flag_present_flag | u(1) |
|   subpic_id_mapping_in_pps_flag | u(1) |
|   if( subpic_id_mapping_in_pps_flag ) { |  |
|     pps_num_subpics_minus1 | ue(v) |

| | Descriptor |
|---|---|
| pps_subpic_id_len_minus1 | ue(v) |
|   for( i = 0; i <= pps_num_subpic_minus1; i++ ) | |
|     pps_subpic_id[ i ] | u(v) |
| } | |
| no_pic_partition_flag | u(1) |
| if( !no_pic_partition_flag ) { | |
|   pps_log2_ctu_size_minus5 | u(2) |
|   num_exp_tile_columns_minus1 | ue(v) |
|   num_exp_tile_rows_minus1 | ue(v) |
|   for( i = 0; i <= num_exp_tile_columns_minus1; i++ ) | |
|     tile_column_width_minus1[ i ] | ue(v) |
|   for( i = 0; i <= num_exp_tile_rows_minus1; i++ ) | |
|     tile_row_height_minus1[ i ] | ue(v) |
|   if( NumTilesInPic > 1 ) | |
|     rect_slice_flag | u(1) |
|   if( rect_slice_flag ) | |
|     single_slice_per_subpic_flag | u(1) |
|   if( rect_slice_flag && !single_slice_per_subpic_flag ) { | |
|     num_slices_in_pic_minus1 | ue(v) |
|     if( num_slices_in_pic_minus1 > 0 ) | |
|       tile_idx_delta_present_flag | u(1) |
|     for( i = 0; i < num_slices_in_pic_minus1; i++ ) { | |
|       if( NumTileColumns > 1 ) | |
|         slice_width_in_tiles_minus1[ i ] | ue(v) |
|       if( NumTileRows > 1 && | |
|         ( tile_idx_delta_present_flag \|\| | |
| tileIdx % NumTileColumns = = 0 ) ) | |
|         slice_height_in_tiles_minus1[ i ] | ue(v) |
|       if( slice_width_in_tiles_minus1[ i ] = = 0 && | |
|         slice_height_in_tiles_minus1[ i ] | |
| = = 0 && | |
|   RowHeight[ SliceTopLeftTileIdx[ i ] / NumTileColumns ] > 1 ) { | |
|         num_exp_slices_in_tile[ i ] | ue(v) |
|         for( j = 0; j < num_exp_slices_in_tile[ i ]; j++ ) | |
|           exp_slice_height_in_ctus_minus1[ j ] | ue(v) |
|         i += NumSlicesInTile[ i ] − 1 | |
|       } | |
|       if( tile_idx_delta_present_flag && i < | |
| num_slices_in_pic_minus1 ) | |
|         tile_idx_delta[ i ] | se(v) |
|     } | |
|   } | |
|   loop_filter_across_tiles_enabled_flag | u(1) |
|   loop_filter_across_slices_enabled_flag | u(1) |
| } | |
| cabac_init_present_flag | u(1) |
| for( i = 0; i < 2; i++ ) | |
|   num_ref_idx_default_active_minus1[ i ] | ue(v) |
| rpl1_idx_present_flag | u(1) |
| init_qp_minus26 | se(v) |
| cu_qp_delta_enabled_flag | u(1) |
| pps_chroma_tool_offsets_present_flag | u(1) |
| if( pps_chroma_tool_offsets_present_flag ) { | |
|   pps_cb_qp_offset | se(v) |
|   pps_cr_qp_offset | se(v) |
|   pps_joint_cbcr_qp_offset_present_flag | u(1) |
|   if( pps_joint_cbcr_qp_offset_present_flag ) | |
|     pps_joint_cbcr_qp_offset_value | se(v) |
|   pps_slice_chroma_qp_offsets_present_flag | u(1) |
|   pps_cu_chroma_qp_offset_list_enabled_flag | u(1) |
| } | |
| if( pps_cu_chroma_qp_offset_list_enabled_flag ) { | |
|   chroma_qp_offset_list_len_minus1 | ue(v) |
|   for( i = 0; i <= chroma_qp_offset_list_len_minus1; i++ ) { | |
|     cb_qp_offset_list[ i ] | se(v) |
|     cr_qp_offset_list[ i ] | se(v) |
|     if( pps_joint_cbcr_qp_offset_present_flag ) | |
|       joint_cbcr_qp_offset_list[ i ] | se(v) |
|   } | |
| } | |
| pps_weighted_pred_flag | u(1) |
| pps_weighted_bipred_flag | u(1) |
| deblocking_filter_control_present_flag | u(1) |
| if( deblocking_filter_control_present_flag ) { | |
|   deblocking_filter_override_enabled_flag | u(1) |
|   pps_deblocking_filter_disabled_flag | u(1) |

| | Descriptor |
|---|---|
|   if( !pps_deblocking_filter_disabled_flag ) { | |
|     pps_beta_offset_div2 | se(v) |
|     pps_tc_offset_div2 | se(v) |
|     pps_cb_beta_offset_div2 | se(v) |
|     pps_cb_tc_offset_div2 | se(v) |
|     pps_cr_beta_offset_div2 | se(v) |
|     pps_cr_tc_offset_div2 | se(v) |
|   } | |
| } | |
| rpl_info_in_ph_flag | u(1) |
| if( deblocking_filter_override_enabled_flag ) | |
|   dbf_info_in_ph_flag | u(1) |
| sao_info_in_ph_flag | u(1) |
| alf_info_in_ph_flag | u(1) |
| if( ( pps_weighted_pred_flag \|\| pps_weighted_bipred_flag ) && rpl_info_in_ph_flag ) | |
|   wp_info_in_ph_flag | u(1) |
| qp_delta_info_in_ph_flag | u(1) |
| pps_ref_wraparound_enabled_flag | u(1) |
| if( pps_ref_wraparound_enabled_flag ) | |
|   pps_ref_wraparound_offset | ue(v) |
| picture_header_extension_present_flag | u(1) |
| slice_header_extension_present_flag | u(1) |
| pps_extension_flag | u(1) |
| if( pps_extension_flag ) | |
|   while( more_rbsp_data( ) ) | |
|     pps_extension_data_flag | u(1) |
| rbsp_trailing_bits( ) | |
| } | |

A PPS Raw Byte Sequence Payload (RBSP) shall be available to the decoding process prior to it being referenced, included in at least one Access Unit (AU) with TemporalId less than or equal to the TemporalId of the PPS Network Abstraction Layer (NAL) unit or provided through external means.

All PPS NAL units with a particular value of pps_pic_parameter_set_id within a Picture Unit (PU) shall have the same content.

pps_pic_parameter_set_id identifies the PPS for reference by other syntax elements. The value of pps_pic_parameter_set_id shall be in the range of 0 to 63, inclusive.

PPS NAL units, regardless of the nuh_layer_id values, share the same value space of pps_pic_parameter_set_id.

Let ppsLayerId be the value of the nuh_layer_id of a particular PPS NAL unit, and vclLayerId be the value of the nuh_layer_id of a particular Video Coding Layer (VCL) NAL unit. The particular VCL NAL unit shall not refer to the particular PPS NAL unit unless ppsLayerId is less than or equal to vclLayerId and the layer with nuh_layer_id equal to ppsLayerId is included in at least one Output Layer Set (OLS) that includes the layer with nuh_layer_id equal to vclLayerId.

pps_seq_parameter_set_id specifies the value of sps_seq_parameter_set_id for the Sequence Parameter Set (SPS). The value of pps_seq_parameter_set_id shall be in the range of 0 to 15, inclusive. The value of pps_seq_parameter_set_id shall be the same in all PPSs that are referred to by coded pictures in a Coded Layer Video Sequence (CLVS).

mixed_nalu_types_in_pic_flag equal to 1 specifies that each picture referring to the PPS has more than one VCL NAL unit, the VCL NAL units do not have the same value of nal_unit_type, and the picture is not an Intra Random Access Point (IRAP) picture. mixed_nalu_types_in_pic_flag equal to 0 specifies that each picture referring to the PPS has one or more VCL NAL units and the VCL NAL units of each picture referring to the PPS have the same value of nal_unit_type.

When no_mixed_nalu_types_in_pic_constraint_flag is equal to 1, the value of mixed_nalu_types_in_pic_flag shall be equal to 0.

For each slice with a nal_unit_type value nalUnitTypeA in the range of IDR_W_RADL to CRA_NUT, inclusive, in a picture picA that also contains one or more slices with another value of nal_unit_type (i.e., the value of mixed_nalu_types_in_pic_flag for the picture picA is equal to 1), the following applies:

The slice shall belong to a subpicture subpicA for which the value of the corresponding subpic_treated_as_pic_flag[i] is equal to 1.

The slice shall not belong to a subpicture of picA containing VCL NAL units with nal_unit_type not equal to nalUnitTypeA.

If nalUnitTypeA is equal to Clean Random Access (CRA), for all the following PUs following the current picture in the CLVS in decoding order and in output order, neither RefPicList[0] nor RefPicList[1] of a slice in subpicA in those PUs shall include any picture preceding picA in decoding order in an active entry.

Otherwise (i.e., nalUnitTypeA is equal to IDR_W_RADL or IDR_N_LP), for all the PUs in the CLVS following the current picture in decoding order, neither RefPicList[0] nor RefPicList[1] of a slice in subpicA in those PUs shall include any picture preceding picA in decoding order in an active entry.

NOTE 1—mixed_nalu_types_in_pic_flag equal to 1 indicates that pictures referring to the PPS contain slices with different NAL unit types, e.g., coded pictures originating from a subpicture bitstream merging operation for which encoders have to ensure matching bitstream structure and further alignment of parameters of the original bitstreams. One example of such alignments is as follows: When the value of sps_idr_rpl_flag is equal to 0 and mixed_nalu_types_in_pic_flag is equal to 1, a picture referring to the PPS cannot have slices with nal_unit_type equal to IDR_W_RADL or IDR_N_LP.

pic_width_in_luma_samples specifies the width of each decoded picture referring to the PPS in units of luma samples. pic_width_in_luma_samples shall not be equal to 0, shall be an integer multiple of Max(8, MinCbSizeY), and shall be less than or equal to pic_width_max_in_luma_samples.

When res_change_in_clvs_allowed_flag equal to 0, the value of pic_width_in_luma_samples shall be equal to pic_width_max_in_luma_samples.

pic_height_in_luma_samples specifies the height of each decoded picture referring to the PPS in units of luma samples. pic_height_in_luma_samples shall not be equal to 0 and shall be an integer multiple of Max(8, MinCbSizeY), and shall be less than or equal to pic_height_max_in_luma_samples.

When res_change_in_clvs_allowed_flag equal to 0, the value of pic_height_in_luma_samples shall be equal to pic_height_max_in_luma_samples.

The variables PicWidthInCtbsY, PicHeightInCtbsY, PicSizeInCtbsY, PicWidthInMinCbsY, PicHeightInMinCbsY, PicSizeInMinCbsY, PicSizeInSamplesY, PicWidthInSamplesC and PicHeightInSamplesC are derived as follows:

$$\text{PicWidthIn}CtbsY = \text{Ceil}(pic\_width\_in\_luma\_samples + CtbSizeY) \tag{69}$$

$$\text{PicHeightIn}CtbsY = \text{Ceil}(pic\_height\_in\_luma\_samples + CtbSizeY) \tag{70}$$

$$\text{PicSizeIn}CtbsY = \text{PicWidthIn}CtbsY * \text{PicHeightIn}CtbsY \tag{71}$$

$$\text{PicWidthIn Min } CbsY = pic\_width\_in\_luma\_samples / \text{Min } CbSizeY \tag{72}$$

$$\text{PicHeightIn Min } CbsY = pic\_height\_in\_luma\_samples / \text{Min } CbSizeY \tag{73}$$

$$\text{PicSizeIn Min } CbsY = \text{PicWidthIn Min } CbsY * \text{PicHeightIn Min } CbsY \tag{74}$$

$$\text{PicSizeInSamples}Y = pic\_width\_in\_luma\_samples * pic\_height\_in\_luma\_samples \tag{75}$$

$$\text{PicWidthInSamples}C = pic\_width\_in\_luma\_samples / \text{SubWidth}C \tag{76}$$

$$\text{PicHeightInSamples}C = pic\_height\_in\_luma\_samples / \text{SubHeight}C \tag{77}$$

pps_conformance_window_flag equal to 1 indicates that the conformance cropping window offset parameters follow next in the PPS. pps_conformance_window_flag equal to 0 indicates that the conformance cropping window offset parameters are not present in the PPS.

pps_conf_win_left_offset, pps_conf_win_right_offset, pps_conf_win_top_offset, and pps_conf_win_bottom_offset specify the samples of the pictures in the CLVS that are output from the decoding process, in terms of a rectangular region specified in picture coordinates for output. When pps_conformance_window_flag is equal to 0, the values of pps_conf_win_left_offset, pps_conf_win_right_offset, pps_conf_win_top_offset, and pps_conf_win_bottom_offset are inferred to be equal to 0.

The conformance cropping window contains the luma samples with horizontal picture coordinates from SubWidthC*pps_conf_win_left_offset to pic_width_in_luma_samples−(SubWidthC*pps_conf_win_right_offset+1) and vertical picture coordinates from SubHeightC*pps_conf_win_top_offset to pic_height_in_luma_samples−(SubHeightC*pps_conf_win_bottom_offset+1), inclusive.

The value of SubWidthC*(pps_conf_win_left_offset+pps_conf_win_right_offset) shall be less than pic_width_in_luma_samples, and the value of SubHeightC*(pps_conf_win_top_offset+pps_conf_win_bottom_offset) shall be less than pic_height_in_luma_samples.

When ChromaArrayType is not equal to 0, the corresponding specified samples of the two chroma arrays are the samples having picture coordinates (x/SubWidthC, y/SubHeightC), where (x, y) are the picture coordinates of the specified luma samples.

NOTE 2—The conformance cropping window offset parameters are only applied at the output. All internal decoding processes are applied to the uncropped picture size.

Let ppsA and ppsB be any two PPSs referring to the same SPS. It is a requirement of bitstream conformance that, when ppsA and ppsB have the same the values of pic_width_in_luma_samples and pic_height_in_luma_samples, respectively, ppsA and ppsB shall have the same values of pps_conf_win_left_offset, pps_conf_win_right_offset, pps_conf_win_top_offset, and pps_conf_win_bottom_offset, respectively.

When pic_width_in_luma_samples is equal to pic_width_max_in_luma_samples and pic_height_in_luma_samples is equal to pic_height_max_in_luma_samples, it is a requirement of bitstream conformance that pps_conf_win_left_offset, pps_conf_win_right_offset, pps_conf_win_top_offset, and pps_conf_win_bottom_offset, are equal to sps_conf_win_left_offset, sps_conf_win_right_offset, sps_conf_win_top_offset, and sps_conf_win_bottom_offset, respectively.

scaling_window_explicit_signalling_flag equal to 1 specifies that the scaling window offset parameters are present in the PPS. scaling_window_explicit_signalling_flag equal to 0 specifies that the scaling window offset parameters are not present in the PPS. When res_change_in_clvs_allowed_flag is equal to 0, the value of scaling_window_explicit_signalling_flag shall be equal to 0.

scaling_win_left_offset, scaling_win_right_offset, scaling_win_top_offset, and scaling_win_bottom_offset specify the offsets that are applied to the picture size for scaling ratio calculation. When not present, the values of scaling_win_left_offset, scaling_win_right_offset, scaling_win_top_offset, and scaling_win_bottom_offset are inferred to be equal to pps_conf_win_left_offset, pps_conf_win_right_offset, pps_conf_win_top_offset, and pps_conf_win_bottom_offset, respectively.

The value of SubWidthC*(scaling_win_left_offset+scaling_win_right_offset) shall be less than pic_width_in_luma_samples, and the value of Sub- HeightC*(scaling_win_top_offset+scaling_win_bottom_offset) shall be less than pic_height_in_luma_samples.

The variables PicOutputWidthL and PicOutputHeightL are derived as follows:

PicOutputWidth*L*=pic_width_in_luma_samples−SubWidth*C**(scaling_win_right_offset+scaling_win_left_offset) (78)

PicOutputHeight*L*=pic_height_in_luma_samples−SubWidth*C**(scaling_win_bottom_offset+scaling_win_top_offset) (79)

Let refPicOutputWidthL and refPicOutputHeightL be the PicOutputWidthL and PicOutputHeightL, respectively, of a reference picture of a current picture referring to this PPS. Is a requirement of bitstream conformance that all of the following conditions are satisfied:
  PicOutputWidthL*2 shall be greater than or equal to refPicWidthInLumaSamples.
  PicOutputHeightL*2 shall be greater than or equal to refPicHeightInLumaSamples.
  PicOutputWidthL shall be less than or equal to refPicWidthInLumaSamples*8.
  PicOutputHeightL shall be less than or equal to refPicHeightInLumaSamples*8.
  PicOutputWidthL*pic_width_max_in_luma_samples shall be greater than or equal to refPicOutputWidthL*(pic_width_in_luma_samples−Max(8, MinCbSizeY)).
  PicOutputHeightL*pic_height_max_in_luma_samples shall be greater than or equal to refPicOutputHeightL*(pic_height_in_luma_samples−Max(8, MinCbSizeY)).

output_flag_present_flag equal to 1 indicates that the pic_output_flag syntax element is present in slice headers referring to the PPS. output_flag_present_flag equal to 0 indicates that the pic_output_flag syntax element is not present in slice headers referring to the PPS.

subpic_id_mapping_in_pps_flag equal to 1 specifies that the subpicture Identifier (ID) mapping is signalled in the PPS. subpic_id_mapping_in_pps_flag equal to 0 specifies that the subpicture ID mapping is not signalled in the PPS. If subpic_id_mapping_explicitly_signalled_flag is 0 or subpic_id_mapping_in_sps_flag is equal to 1, the value of subpic_id_mapping_in_pps_flag shall be equal to 0. Otherwise (subpic_id_mapping_explicitly_signalled_flag is equal to 1 and subpic_id_mapping_in_sps_flag is equal to 0), the value of subpic_id_mapping_in_pps_flag shall be equal to 1.

pps_num_subpics_minus1 shall be equal to sps_num_subpics_minus1.

pps_subpic_id_len_minus1 shall be equal to sps_subpic_id_len_minus1.

pps_subpic_id[i] specifies the subpicture ID of the i-th subpicture. The length of the pps_subpic_id[i] syntax element is pps_subpic_id_len_minus1+1 bits.

The variable SubpicIdVal[i], for each value of i in the range of 0 to sps_num_subpics_minus1, inclusive, is derived as follows:
  for(i=0; i<=sps_num_subpics_minus1; i++)

if(subpic_id_mapping_explicitly_signalled_flag)

SubpicIdVal[*i*]=subpic_id_mapping_in_pps_flag?pps_subpic_id[*i*]

sps_subpic_id[*i*] (80)

else

SubpicIdVal[*i*]=*i*

It is a requirement of bitstream conformance that both of the following constraints apply:
  For any two different values of i and j in the range of 0 to sps_num_subpics_minus1, inclusive, SubpicIdVal[i] shall not be equal to SubpicIdVal[j].
  When the current picture is not the first picture of the CLVS, for each value of i in the range of 0 to sps_num_subpics_minus1, inclusive, if the value of SubpicIdVal[i] is not equal to the value of SubpicIdVal[i] of the previous picture in decoding order in the same layer, the nal_unit_type for all coded slice NAL units of the subpicture in the current picture with subpicture index i shall be equal to a particular value in the range of IDR_W_RADL to CRA_NUT, inclusive.

no_pic_partition_flag equal to 1 specifies that no picture partitioning is applied to each picture referring to the PPS. no_pic_partition_flag equal to 0 specifies each picture referring to the PPS may be partitioned into more than one tile or slice.

It is a requirement of bitstream conformance that the value of no_pic_partition_flag shall be the same for all PPSs that are referred to by coded pictures within a CLVS.

It is a requirement of bitstream conformance that the value of no_pic_partition_flag shall not be equal to 1 when the value of sps_num_subpics_minus1+1 is greater than 1.

pps_log 2_ctu_size_minus5 plus 5 specifies the luma coding tree block size of each Coding Tree Unit (CTU). pps_log 2_ctu_size_minus5 shall be equal to sps_log 2_ctu_size_minus5.

num_exp_tile_columns_minus1 plus 1 specifies the number of explicitly provided tile column widths. The value of num_exp_tile_columns_minus1 shall be in the range of 0 to PicWidthInCtbsY−1, inclusive. When no_pic_partition_flag is equal to 1, the value of num_exp_tile_columns_minus1 is inferred to be equal to 0.

num_exp_tile_rows_minus1 plus 1 specifies the number of explicitly provided tile row heights. The value of num_exp_tile_rows_minus1 shall be in the range of 0 to PicHeightInCtbsY−1, inclusive. When no_pic_partition_flag is equal to 1, the value of num_tile_rows_minus1 is inferred to be equal to 0.

tile_column_width_minus1[i] plus 1 specifies the width of the i-th tile column in units of Coding Tree Blocks (CTBs) for i in the range of 0 to num_exp_tile_columns_minus1−1, inclusive. tile_column_width_minus1[num_exp_tile_columns_minus1] is used to derive the width of the tile columns with index greater than or equal to num_exp_tile_columns_minus1 as specified in clause 6.5.1. The value of tile_column_width_minus1[i] shall be in the range of 0 to PicWidthInCtbsY−1, inclusive. When not present, the value of tile_column_width_minus1[0] is inferred to be equal to PicWidthInCtbsY−1.

tile_row_height_minus1[i] plus 1 specifies the height of the i-th tile row in units of CTBs for i in the range of 0 to num_exp_tile_rows_minus1−1, inclusive. tile_row_height_minus1[num_exp_tile_rows_minus1] is used to derive the height of the tile rows with index greater than or equal to num_exp_tile_rows_minus1 as specified in clause 6.5.1. The value of tile_row_height_minus1[i] shall be in the range of 0 to PicHeight- InCtbsY−1, inclusive. When not present, the value of tile_row_height_minus1[0] is inferred to be equal to PicHeightInCtbsY−1.

rect_slice_flag equal to 0 specifies that tiles within each slice are in raster scan order and the slice information is not signalled in PPS. rect_slice_flag equal to 1 specifies that tiles within each slice cover a rectangular region of the picture and the slice information is signalled in the PPS. When not present, rect_slice_flag is inferred to be equal to 1. When subpic_info_present_flag is equal to 1, the value of rect_slice_flag shall be equal to 1.

single_slice_per_subpic_flag equal to 1 specifies that each subpicture consists of one and only one rectangular slice. single_slice_per_subpic_flag equal to 0 specifies that each subpicture may consist of one or more rectangular slices. When single_slice_per_subpic_flag is equal to 1, num_slices_in_pic_minus1 is inferred to be equal to sps_num_subpics_minus1. When not present, the value of single_slice_per_subpic_flag is inferred to be equal to 0. num_slices_in_pic_minus1 plus 1 specifies the number of rectangular slices in each picture referring to the PPS. The value of num_slices_in_pic_minus1 shall be in the range of 0 to MaxSlicesPerPicture−1, inclusive, where MaxSlicesPerPicture is specified in Annex A. When no_pic_partition_flag is equal to 1, the value of num_slices_in_pic_minus1 is inferred to be equal to 0.

tile_idx_delta_present_flag equal to 0 specifies that tile_idx_delta values are not present in the PPS and all rectangular slices in pictures referring to the PPS are specified in raster order according to the process defined in clause 6.5.1. tile_idx_delta_present_flag equal to 1 specifies that tile_idx_delta values may be present in the PPS and all rectangular slices in pictures referring to the PPS are specified in the order indicated by the values of tile_idx_delta. When not present, the value of tile_idx_delta_present_flag is inferred to be equal to 0.

slice_width_in_tiles_minus1[i] plus 1 specifies the width of the i-th rectangular slice in units of tile columns. The value of slice_width_in_tiles_minus1[i] shall be in the range of 0 to NumTileColumns−1, inclusive.

When slice_width_in_tiles_minus1[i] is not present, the following applies:
  If NumTileColumns is equal to 1, the value of slice_width_in_tiles_minus1[i] is inferred to be equal to 0.
  Otherwise, the value of slice_width_in_tiles_minus1[i] is inferred as specified in clause 6.5.1.

slice_height_in_tiles_minus1[i] plus 1 specifies the height of the i-th rectangular slice in units of tile rows. The value of slice_height_in_tiles_minus1[i] shall be in the range of 0 to NumTileRows−1, inclusive.

When slice_height_in_tiles_minus1[i] is not present, the following applies:
  If NumTileRows is equal to 1, or tile_idx_delta_present_flag is equal to 0 and tileIdx % NumTileColumns is greater than 0), the value of slice_height_in_tiles_minus1[i] is inferred to be equal to 0.
  Otherwise (NumTileRows is not equal to 1, and tile_idx_delta_present_flag is equal to 1 or tileIdx % NumTileColumns is equal to 0), when tile_idx_delta_present_flag is equal to 1 or tileIdx % NumTileColumns is equal to 0, the value of slice_height_in_tiles_minus1[i] is inferred to be equal to slice_height_in_tiles_minus1[i−1].

num_exp_slices_in_tile[i] specifies the number of explicitly provided slice heights in the current tile that contains more than one rectangular slices. The value of num_exp_slices_in_tile[i] shall be in the range of 0 to RowHeight[tileY]−1, inclusive, where tileY is the tile row index containing the i-th slice. When not present, the value of num_exp_slices_in_tile[i] is inferred to be equal to 0. When num_exp_slices_in_tile[i] is equal to 0, the value of the variable NumSlicesInTile[i] is derived to be equal to 1.

exp_slice_height_in_ctus_minus1[j] plus 1 specifies the height of the j-th rectangular slice in the current tile in units of CTU rows. The value of exp_slice_height_in_ctus_minus1[j] shall be in the range of 0 to RowHeight[tileY]−1, inclusive, where tileY is the tile row index of the current tile.

When num_exp_slices_in_tile[i] is greater than 0, the variable NumSlicesInTile[i] and SliceHeightInCtusMinus1[i+k] for k in the range of 0 to NumSlicesInTile[i]−1 are derived as follows:

```
remainingHeightInCtbsY = RowHeight[ SliceTopLeftTileIdx
[ i ] / NumTileColumns ]
numExpSliceInTile = num_exp_slices_in_tile[ i ]
for( j = 0; j < numExpSliceInTile − 1; j++ ) {
    SliceHeightInCtusMinus1[ i++ ] = exp_slice_height_in_ctu_minus1[ j ]
    remainingHeightInCtbsY −= SliceHeightInCtusMinus1[ j ]
}
uniformSliceHeightMinus1 = SliceHeightInCtusMinus1[ i − 1 ]    (81)
while( remainingHeightInCtbsY >= (uniformSliceHeightMinus1 + 1) ) {
    SliceHeightInCtusMinus1[ i++ ] = uniformSliceHeightMinus1
    remainingHeightInCtbsY −= (uniformSliceHeightMinus1 + 1)
    j++
}
if( remainingHeightInCtbsY > 0 ) {
    SliceHeightInCtusMinus1[ i++ ] = remainingHeightInCtbsY
    j++
}
NumSlicesInTile[ i ] = j
``` tile_idx_delta[i] specifies the difference between the tile index of the first tile in the i-th rectangular slice and the tile index of the first tile in the (i+1)-th rectangular slice. The value of tile_idx_delta[i] shall be in the range of −NumTilesInPic+1 to NumTilesInPic−1, inclusive. When not present, the value of tile_idx_delta[i] is inferred to be equal to 0. When present, the value of tile_idx_delta[i] shall not be equal to 0.

loop_filter_across_tiles_enabled_flag equal to 1 specifies that in-loop filtering operations may be performed across tile boundaries in pictures referring to the PPS. loop_filter_across_tiles_enabled_flag equal to 0 specifies that in-loop filtering operations are not performed across tile boundaries in pictures referring to the PPS. The in-loop filtering operations include the deblocking filter, sample adaptive offset filter, and adaptive loop filter operations. When not present, the value of loop_filter_across_tiles_enabled_flag is inferred to be equal to 1.

loop_filter_across_slices_enabled_flag equal to 1 specifies that in-loop filtering operations may be performed across slice boundaries in pictures referring to the PPS. loop_filter_across_slice_enabled_flag equal to 0 specifies that in-loop filtering operations are not performed across slice boundaries in pictures referring to the PPS. The in-loop filtering operations include the deblocking filter, sample adaptive offset filter, and adaptive loop filter operations. When not present, the value of loop_filter_across_slices_enabled_flag is inferred to be equal to 0.

cabac_init_present_flag equal to 1 specifies that cabac_init_flag is present in slice headers referring to the PPS. cabac_init_present_flag equal to 0 specifies that cabac_init_flag is not present in slice headers referring to the PPS.

num_ref_idx_default_active_minus1[i] plus 1, when i is equal to 0, specifies the inferred value of the variable NumRefIdxActive[0] for P or B slices with num_ref_idx_active_override_flag equal to 0, and, when i is equal to 1, specifies the inferred value of NumRefIdxActive[1] for B slices with num_ref_idx_active_override_flag equal to 0. The value of num_ref_idx_default_active_minus1[i] shall be in the range of 0 to 14, inclusive.

rpl1_idx_present_flag equal to 0 specifies that ref_pic_list_sps_flag[1] and ref_pic_list_idx[1] are not present in the PH syntax structures or the slice headers for pictures referring to the PPS. rpl1_idx_present_flag equal to 1 specifies that ref_pic_list_sps_flag[1] and ref_pic_list_idx[1] may be present in the PH syntax structures or the slice headers for pictures referring to the PPS.

init_qp_minus26 plus 26 specifies the initial value of $SliceQp_Y$ for each slice referring to the PPS. The initial value of $SliceQp_Y$ is modified at the picture level when a non-zero value of ph_qp_delta is decoded or at the slice level when a non-zero value of slice_qp_delta is decoded. The value of init_qp_minus26 shall be in the range of −(26+QpBdOffset) to +37, inclusive.

cu_qp_delta_enabled_flag equal to 1 specifies that the ph_cu_qp_delta_subdiv_intra_slice and ph_cu_qp_delta_subdiv_inter_slice syntax elements are present in Picture Headers (PHs) referring to the PPS and cu_qp_delta_abs may be present in the transform unit syntax. cu_qp_delta_enabled_flag equal to 0 specifies that the ph_cu_qp_delta_subdiv_intra_slice and ph_cu_qp_delta_subdiv_inter_slice syntax elements are not present in PHs referring to the PPS and cu_qp_delta_abs is not present in the transform unit syntax.

pps_chroma_tool_offsets_present_flag equal to 1 specifies that chroma tool offsets related syntax elements are present in the PPS RBSP syntax structure. pps_chroma_tool_offsets_present_flag equal to 0 specifies that chroma tool offsets related syntax elements are not present in in the PPS RBSP syntax structure. When ChromaArrayType is equal to 0, the value of pps_chroma_tool_offsets_present_flag shall be equal to 0.

pps_cb_qp_offset and pps_cr_qp_offset specify the offsets to the luma quantization parameter $Qp'_Y$ used for deriving $Qp'_{Cb}$ and $Qp'_{Cr}$, respectively. The values of pps_cb_qp_offset and pps_cr_qp_offset shall be in the range of −12 to +12, inclusive. When ChromaArrayType is equal to 0, pps_cb_qp_offset and pps_cr_qp_offset are not used in the decoding process and decoders shall ignore their value. When not present, the values of pps_cb_qp_offset and pps_cr_qp_offset are inferred to be equal to 0.

pps_joint_cbcr_qp_offset_present_flag equal to 1 specifies that pps_joint_cbcr_qp_offset_value and joint_cbcr_qp_offset_list[i] are present in the PPS RBSP syntax structure. pps_joint_cbcr_qp_offset_present_flag equal to 0 specifies that pps_joint_cbcr_qp_offset_value and joint_cbcr_qp_offset_list[i] are not present in the PPS RBSP syntax structure. When ChromaArrayType is equal to 0 or sps_joint_cbcr_enabled_flag is equal to 0, the value of pps_joint_cbcr_qp_offset_present_flag shall be equal to 0. When not present, the value of pps_joint_cbcr_qp_offset_present_flag is inferred to be equal to 0.

pps_joint_cbcr_qp_offset_value specifies the offset to the luma quantization parameter $Qp'_Y$ used for deriving $Qp'_{CbCr}$. The value of pps_joint_cbcr_qp_offset_value shall be in the range of −12 to +12, inclusive. When ChromaArrayType is equal to 0 or sps_joint_cbcr_enabled_flag is equal to 0, pps_joint_cbcr_qp_offset_value is not used in the decoding process and decoders shall ignore its value. When pps_joint_cbcr_qp_offset_present_flag is equal to 0, pps_joint_cbcr_qp_offset_value is not present and is inferred to be equal to 0.

pps_slice_chroma_qp_offsets_present_flag equal to 1 specifies that the slice_cb_qp_offset and slice_cr_qp_offset syntax elements are present in the associated slice headers. pps_slice_chroma_qp_offsets_present_flag equal to 0 specifies that the slice_cb_qp_offset and slice_cr_qp_offset syntax elements are not present in the associated slice headers. When not present, the value of pps_slice_chroma_qp_offsets_present_flag is inferred to be equal to 0.

pps_cu_chroma_qp_offset_list_enabled_flag equal to 1 specifies that the ph_cu_chroma_qp_offset_subdiv_intra_slice and ph_cu_chroma_qp_offset_subdiv_inter_slice syntax elements are present in PHs referring to the PPS and cu_chroma_qp_offset_flag may be present in the transform unit syntax and the palette coding syntax. pps_cu_chroma_qp_offset_list_enabled_flag equal to 0 specifies that the ph_cu_chroma_qp_offset_subdiv_intra_slice and ph_cu_chroma_qp_offset_subdiv_inter_slice syntax elements are not present in PHs referring to the PPS and the cu_chroma_qp_offset_flag is not present in the transform unit syntax and the palette coding syntax. When not present, the value of pps_cu_chroma_qp_offset_list_enabled_flag is inferred to be equal to 0.

chroma_qp_offset_list_len_minus1 plus 1 specifies the number of cb_qp_offset_list[i], cr_qp_offset_list[i], and joint_cbcr_qp_offset_list[i], syntax elements that are present in the PPS RBSP syntax structure. The value of chroma_qp_offset_list_len_minus1 shall be in the range of 0 to 5, inclusive.

cb_qp_offset_list[i], cr_qp_offset_list[i], and joint_cbcr_qp_offset_list[i], specify offsets used in the derivation of $Qp'_{Cb}$, $Qp'_{Cr}$, and $Qp'_{CbCr}$, respectively. The values of cb_qp_offset_list[i], cr_qp_offset_list[i], and joint_cbcr_qp_offset_list[i] shall be in the range of −12 to +12, inclusive. When pps_joint_cbcr_qp_offset_present_flag is equal to 0, joint_cbcr_qp_offset_list[i] is not present and it is inferred to be equal to 0.

pps_weighted_pred_flag equal to 0 specifies that weighted prediction is not applied to P slices referring to the PPS. pps_weighted_pred_flag equal to 1 specifies that weighted prediction is applied to P slices referring to the PPS. When sps_weighted_pred_flag is equal to 0, the value of pps_weighted_pred_flag shall be equal to 0.

pps_weighted_bipred_flag equal to 0 specifies that explicit weighted prediction is not applied to B slices referring to the PPS. pps_weighted_bipred_flag equal to 1 specifies that explicit weighted prediction is applied to B slices referring to the PPS. When sps_weighted_bipred_flag is equal to 0, the value of pps_weighted_bipred_flag shall be equal to 0.

deblocking_filter_control_present_flag equal to 1 specifies the presence of deblocking filter control syntax elements in the PPS. deblocking_filter_control_present_flag equal to 0 specifies the absence of deblocking filter control syntax elements in the PPS.

deblocking_filter_override_enabled_flag equal to 1 specifies the presence of ph_deblocking_filter_override_flag in the PHs referring to the PPS or slice_deblocking_filter_override_flag in the slice headers referring to the PPS. deblocking_filter_override_enabled_flag equal to 0 specifies the absence of ph_deblocking_filter_override_flag in PHs referring to the PPS or slice_deblocking_filter_override_flag in slice headers referring to the PPS. When not present, the value of deblocking_filter_override_enabled_flag is inferred to be equal to 0.

pps_deblocking_filter_disabled_flag equal to 1 specifies that the operation of deblocking filter is not applied for slices referring to the PPS in which slice_deblocking_filter_disabled_flag is not present. pps_deblocking_filter_disabled_flag equal to 0 specifies that the operation of the deblocking filter is applied for slices referring to the PPS in which slice_deblocking_filter_disabled_flag is not present. When not present, the value of pps_deblocking_filter_disabled_flag is inferred to be equal to 0.

pps_beta_offset_div2 and pps_tc_offset_div2 specify the default deblocking parameter offsets for β and tC (divided by 2) that are applied to the luma component for slices referring to the PPS, unless the default deblocking parameter offsets are overridden by the deblocking parameter offsets present in the picture headers or the slice headers of the slices referring to the PPS. The values of pps_beta_offset_div2 and pps_tc_offset_div2 shall both be in the range of −12 to 12, inclusive. When not present, the values of pps_beta_offset_div2 and pps_tc_offset_div2 are both inferred to be equal to 0.

pps_cb_beta_offset_div2 and pps_cb_tc_offset_div2 specify the default deblocking parameter offsets for β and tC (divided by 2) that are applied to the Cb component for slices referring to the PPS, unless the default deblocking parameter offsets are overridden by the deblocking parameter offsets present in the picture headers or the slice headers of the slices referring to the PPS. The values of pps_cb_beta_offset_div2 and pps_cb_tc_offset_div2 shall both be in the range of −12 to 12, inclusive. When not present, the values of pps_cb_beta_offset_div2 and pps_cb_tc_offset_div2 are both inferred to be equal to 0.

pps_cr_beta_offset_div2 and pps_cr_tc_offset_div2 specify the default deblocking parameter offsets for β and tC (divided by 2) that are applied to the Cr component for slices referring to the PPS, unless the default deblocking parameter offsets are overridden by the deblocking parameter offsets present in the picture headers or the slice headers of the slices referring to the PPS. The values of pps_cr_beta_offset_div2 and pps_cr_tc_offset_div2 shall both be in the range of −12 to 12, inclusive. When not present, the values of pps_cr_beta_offset_div2 and pps_cr_tc_offset_div2 are both inferred to be equal to 0.

rpl_info_in_ph_flag equal to 1 specifies that reference picture list information is present in the PH syntax structure and not present in slice headers referring to the PPS that do not contain a PH syntax structure. rpl_info_in_ph_flag equal to 0 specifies that reference picture list information is not present in the PH syntax structure and may be present in slice headers referring to the PPS that do not contain a PH syntax structure.

dbf_info_in_ph_flag equal to 1 specifies that deblocking filter information is present in the PH syntax structure and not present in slice headers referring to the PPS that do not contain a PH syntax structure. dbf_info_in_ph_flag equal to 0 specifies that deblocking filter information is not present in the PH syntax structure and may be present in slice headers referring to the PPS that do not contain a PH syntax structure. When not present, the value of dbf_info_in_ph_flag is inferred to be equal to 0.

sao_info_in_ph_flag equal to 1 specifies that Sample Adaptive Offset (SAO) filter information is present in the PH syntax structure and not present in slice headers referring to the PPS that do not contain a PH syntax structure. sao_info_in_ph_flag equal to 0 specifies that SAO filter information is not present in the PH syntax structure and may be present in slice headers referring to the PPS that do not contain a PH syntax structure.

alf_info_in_ph_flag equal to 1 specifies that Adaptive Loop Filter (ALF) information is present in the PH syntax structure and not present in slice headers referring to the PPS that do not contain a PH syntax structure. alf_info_in_ph_flag equal to 0 specifies that ALF information is not present in the PH syntax structure and may be present in slice headers referring to the PPS that do not contain a PH syntax structure.

wp_info_in_ph_flag equal to 1 specifies that weighted prediction information may be present in the PH syntax structure and not present in slice headers referring to the PPS that do not contain a PH syntax structure. wp_info_in_ph_flag equal to 0 specifies that weighted prediction information is not present in the PH syntax structure and may be present in slice headers referring to the PPS that do not contain a PH syntax structure. When not present, the value of wp_info_in_ph_flag is inferred to be equal to 0.

qp_delta_info_in_ph_flag equal to 1 specifies that QP delta information is present in the PH syntax structure and not present in slice headers referring to the PPS that do not contain a PH syntax structure. qp_delta_info_in_ph_flag equal to 0 specifies that QP delta information is not present in the PH syntax structure and may be present in slice headers referring to the PPS that do not contain a PH syntax structure.

pps_ref_wraparound_enabled_flag equal to 1 specifies that horizontal wrap-around motion compensation is applied in inter prediction. pps_ref_wraparound_enabled_flag equal to 0 specifies that horizontal wrap-around motion compensation is not applied. When the value of CtbSizeY/MinCbSizeY+1 is greater than pic_width_in_luma_samples/MinCbSizeY−1, the value of pps_ref_wraparound_enabled_flag shall be equal to 0. When sps_ref_wraparound_enabled_flag is equal to 0, the value of pps_ref_wraparound_enabled_flag shall be equal to 0.

pps_ref_wraparound_offset plus (CtbSizeY/MinCbSizeY)+2 specifies the offset used for computing the horizontal wrap-around position in units of MinCbSizeY luma samples. The value of pps_ref_wraparound_offset shall be in the range of 0 to (pic_width_in_luma_samples/MinCbSizeY)−(CtbSizeY/MinCbSizeY)−2, inclusive. The variable Pps- RefWraparoundOffset is set equal to pps_ref_wrap-around_offset+(CtbSizeY/MinCbSizeY)+2.

picture_header_extension_present_flag equal to 0 specifies that no PH extension syntax elements are present in PHs referring to the PPS. picture_header_extension_present_flag equal to 1 specifies that PH extension syntax elements are present in PHs referring to the PPS. picture_header_extension_present_flag shall be equal to 0 in bitstreams conforming to this version of this Specification.

slice_header_extension_present_flag equal to 0 specifies that no slice header extension syntax elements are present in the slice headers for coded pictures referring to the PPS. slice_header_extension_present_flag equal to 1 specifies that slice header extension syntax elements are present in the slice headers for coded pictures referring to the PPS. slice_header_extension_present_flag shall be equal to 0 in bitstreams conforming to this version of this Specification.

pps_extension_flag equal to 0 specifies that no pps_extension_data_flag syntax elements are present in the PPS RBSP syntax structure. pps_extension_flag equal to 1 specifies that there are pps_extension_data_flag syntax elements present in the PPS RBSP syntax structure. pps_extension_data_flag may have any value. Its presence and value do not affect decoder conformance to profiles specified in this version of this Specification. Decoders conforming to this version of this Specification shall ignore all pps_extension_data_flag syntax elements.

3.2. PH Syntax and Semantics

In the latest VVC draft text, the PH syntax and semantics are as follows:

|  | Descriptor |
|---|---|
| picture_header_rbsp( ) { |  |
|   picture_header_structure( ) |  |
|   rbsp_trailing_bits( ) |  |
| } |  |

The PH RBSP contains a PH syntax structure, i.e., picture_header_structure( ).

|  | Descriptor |
|---|---|
| picture_header_structure( ) { |  |
|   gdr_or_irap_pic_flag | u(1) |
|   if( gdr_or_irap_pic_flag ) |  |
|     gdr_pic_flag | u(1) |
|   ph_inter_slice_allowed_flag | u(1) |
|   if( ph_inter_slice_allowed_flag ) |  |
|     ph_intra_slice_allowed_flag | u(1) |
|   non_reference_picture_flag | u(1) |
|   ph_pic_parameter_set_id | ue(v) |
|   ph_pic_order_cnt_lsb | u(v) |
|   if( gdr_or_irap_pic_flag ) |  |
|     no_output_of_prior_pics_flag | u(1) |
|   if( gdr_pic_flag ) |  |
|     recovery_poc_cnt | ue(v) |
|   for( i = 0; i < NumExtraPhBits; i++ ) |  |
|     ph_extra_bit[ i ] | u(1) |
|   if( sps_poc_msb_flag ) { |  |
|     ph_poc_msb_present_flag | u(1) |
|     if( ph_poc_msb_present_flag ) |  |
|       poc_msb_val | u(v) |
|   } |  |

-continued

|  | Descriptor |
|---|---|
|   if( sps_alf_enabled_flag && alf_info_in_ph_flag ) { |  |
|     ph_alf_enabled_flag | u(1) |
|     if( ph_alf_enabled_flag ) { |  |
|       ph_num_alf_aps_ids_luma | u(3) |
|       for( i = 0; i < ph_num_alf_aps_ids_luma; i++ ) |  |
|         ph_alf_aps_id_luma[ i ] | u(3) |
|       if( ChromaArrayType != 0 ) |  |
|         ph_alf_chroma_idc | u(2) |
|       if( ph_alf_chroma_idc > 0 ) |  |
|         ph_alf_aps_id_chroma | u(3) |
|       if( sps_ccalf_enabled_flag ) { |  |
|         ph_cc_alf_cb_enabled_flag | u(1) |
|         if( ph_cc_alf_cb_enabled_flag ) |  |
|           ph_cc_alf_cb_aps_id | u(3) |
|         ph_cc_alf_cr_enabled_flag | u(1) |
|         if( ph_cc_alf_cr_enabled_flag ) |  |
|           ph_cc_alf_cr_aps_id | u(3) |
|       } |  |
|     } |  |
|   } |  |
|   if( sps_lmcs_enabled_flag ) { |  |
|     ph_lmcs_enabled_flag | u(1) |
|     if( ph_lmcs_enabled_flag ) { |  |
|       ph_lmcs_aps_id | u(2) |
|       if( ChromaArrayType != 0 ) |  |
|         ph_chroma_residual_scale_flag | u(1) |
|     } |  |
|   } |  |
|   if( sps_scaling_list_enabled_flag ) { |  |
|     ph_scaling_list_present_flag | u(1) |
|     if( ph_scaling_list_present_flag ) |  |
|       ph_scaling_list_aps_id | u(3) |
|   } |  |
|   if( sps_virtual_boundaries_enabled_flag && !sps_virtual_boundaries_present_flag ) { |  |
|     ph_virtual_boundaries_present_flag | u(1) |
|     if( ph_virtual_boundaries_present_flag ) { |  |
|       ph_num_ver_virtual_boundaries | u(2) |
|       for( i = 0; i < ph_num_ver_virtual_boundaries; i++ ) |  |
|         ph_virtual_boundaries_pos_x[ i ] | u(13) |
|       ph_num_hor_virtual_boundaries | u(2) |
|       for( i = 0; i < ph_num_hor_virtual_boundaries; i++ ) |  |
|         ph_virtual_boundaries_pos_y[ i ] | u(13) |
|     } |  |
|   } |  |
|   if( output_flag_present_flag ) |  |
|     pic_output_flag | u(1) |
|   if( rpl_info_in_ph_flag ) |  |
|     ref_pic_lists( ) |  |
|   if( partition_constraints_override_enabled_flag ) |  |
|     partition_constraints_override_flag | u(1) |
|   if( ph_intra_slice_allowed_flag ) { |  |
|     if( partition_constraints_override_flag ) { |  |
|       ph_log2_diff_min_qt_min_cb_intra_slice_luma | ue(v) |
|       ph_max_mtt_hierarchy_depth_intra_slice_luma | ue(v) |
|       if( ph_max_mtt_hierarchy_depth_intra_slice_luma != 0 ) { |  |
|         ph_log2_diff_max_bt_min_qt_intra_slice_luma | ue(v) |
|         ph_log2_diff_max_tt_min_qt_intra_slice_luma | ue(v) |
|       } |  |
|       if( qtbtt_dual_tree_intra_flag ) { |  |
|         ph_log2_diff_min_qt_min_cb_intra_slice_chroma | ue(v) |
|         ph_max_mtt_hierarchy_depth_intra_slice_chroma | ue(v) |
|         if( ph_max_mtt_hierarchy_depth_intra_slice_chroma != 0 ) { |  |
|           ph_log2_diff_max_bt_min_qt_intra_slice_chroma | ue(v) |
|           ph_log2_diff_max_tt_min_qt_intra_slice_chroma | ue(v) |
|         } |  |
|       } |  |
|     } |  |
|     if( cu_qp_delta_enabled_flag ) |  |
|       ph_cu_qp_delta_subdiv_intra_slice | ue(v) |
|     if( pps_cu_chroma_qp_offset_list_enabled_flag ) |  |
|       ph_cu_chroma_qp_offset_subdiv_intra_slice | ue(v) |
|   } |  |
|   if( ph_inter_slice_allowed_flag ) { |  |

-continued

| | Descriptor |
|---|---|
| if( partition_constraints_override_flag ) { | |
|   ph_log2_diff_min_qt_min_cb_inter_slice | ue(v) |
|   ph_max_mtt_hierarchy_depth_inter_slice | ue(v) |
|   if( ph_max_mtt_hierarchy_depth_inter_slice != 0 ) { | |
|     ph_log2_diff_max_bt_min_qt_inter_slice | ue(v) |
|     ph_log2_diff_max_tt_min_qt_inter_slice | ue(v) |
|   } | |
| } | |
| if( cu_qp_delta_enabled_flag ) | |
|   ph_cu_qp_delta_subdiv_inter_slice | ue(v) |
| if( pps_cu_chroma_qp_offset_list_enabled_flag ) | |
|   ph_cu_chroma_qp_offset_subdiv_inter_slice | ue(v) |
| if( sps_temporal_mvp_enabled_flag ) { | |
|   ph_temporal_mvp_enabled_flag | u(1) |
|   if( ph_temporal_mvp_enabled_flag && rpl_info_in_ph_flag ) { | |
|     ph_collocated_from_l0_flag | u(1) |
|     if( ( ph_collocated_from_l0_flag && num_ref_entries[ 0 ][ RplsIdx[ 0 ] ] > 1 ) \|\| ( !ph_collocated_from_l0_flag && num_ref_entries[ 1 ][ RplsIdx[ 1 ] ] > 1 ) ) | |
|       ph_collocated_ref_idx | ue(v) |
|   } | |
| } | |
| mvd_l1_zero_flag | u(1) |
| if( sps_fpel_mmvd_enabled_flag ) | |
|   ph_fpel_mmvd_enabled_flag | u(1) |
| if( sps_bdof_pic_present_flag ) | |
|   ph_disable_bdof_flag | u(1) |
| if( sps_dmvr_pic_present_flag ) | |
|   ph_disable_dmvr_flag | u(1) |
| if( sps_prof_pic_present_flag ) | |
|   ph_disable_prof_flag | u(1) |
| if( ( pps_weighted_pred_flag \|\| pps_weighted_bipred_flag ) && wp_info_in_ph_flag ) | |
|   pred_weight_table( ) | |
| } | |
| if( qp_delta_info_in_ph_flag ) | |
|   ph_qp_delta | se(v) |
| if( sps_joint_cbcr_enabled_flag ) | |
|   ph_joint_cbcr_sign_flag | u(1) |
| if( sps_sao_enabled_flag && sao_info_in_ph_flag ) { | |
|   ph_sao_luma_enabled_flag | u(1) |
|   if( ChromaArrayType != 0 ) | |
|     ph_sao_chroma_enabled_flag | u(1) |
| } | |
| if( sps_dep_quant_enabled_flag ) | |
|   ph_dep_quant_enabled_flag | u(1) |
| if( sps_sign_data_hiding_enabled_flag && !ph_dep_quant_enabled_flag ) | |
|   pic_sign_data_hiding_enabled_flag | u(1) |
| if( deblocking_filter_override_enabled_flag && dbf_info_in_ph_flag ) { | |
|   ph_deblocking_filter_override_flag | u(1) |
|   if( ph_deblocking_filter_override_flag ) { | |
|     ph_deblocking_filter_disabled_flag | u(1) |
|     if( !ph_deblocking_filter_disabled_flag ) { | |
|       ph_beta_offset_div2 | se(v) |
|       ph_tc_offset_div2 | se(v) |
|       ph_cb_beta_offset_div2 | se(v) |
|       ph_cb_tc_offset_div2 | se(v) |
|       ph_cr_beta_offset_div2 | se(v) |
|       ph_cr_tc_offset_div2 | se(v) |
|     } | |
|   } | |
| } | |
| if( picture_header_extension_present_flag ) { | |
|   ph_extension_length | ue(v) |
|   for( i = 0; i < ph_extension_length; i++) | |
|     ph_extension_data_byte[ i ] | u(8) |
| } | |
| } | |

The PH syntax structure contains information that is common for all slices of the coded picture associated with the PH syntax structure.

gdr_or_irap_pic_flag equal to 1 specifies that the current picture is a Gradual Decoding Refresh (GDR) or IRAP picture. gdr_or_irap_pic_flag equal to 0 specifies that the current picture may or may not be a GDR or IRAP picture.

gdr_pic_flag equal to 1 specifies the picture associated with the PH is a GDR picture. gdr_pic_flag equal to 0 specifies that the picture associated with the PH is not a GDR picture. When not present, the value of gdr_pic_flag is inferred to be equal to 0. When gdr_enabled_flag is equal to 0, the value of gdr_pic_flag shall be equal to 0.

ph_inter_slice_allowed_flag equal to 0 specifies that all coded slices of the picture have slice_type equal to 2. ph_inter_slice_allowed_flag equal to 1 specifies that there may or may not be one or more coded slices in the picture that have slice_type equal to 0 or 1.

ph_intra_slice_allowed_flag equal to 0 specifies that all coded slices of the picture have slice_type equal to 0 or 1. ph_intra_slice_allowed_flag equal to 1 specifies that there may or may not be one or more coded slices in the picture that have slice_type equal to 2. When not present, the value of ph_intra_slice_allowed_flag is inferred to be equal to 1.

NOTE 1—For bitstreams that are supposed to work subpicure based bitstream merging without the need of changing PH NAL units, the encoder is expected to set the values of both ph_inter_slice_allowed_flag and ph_intra_slice_allowed_flag equal to 1.

non_reference_picture_flag equal to 1 specifies the picture associated with the PH is never used as a reference picture. non_reference_picture_flag equal to 0 specifies the picture associated with the PH may or may not be used as a reference picture.

ph_pic_parameter_set_id specifies the value of pps_pic_parameter_set_id for the PPS in use. The value of ph_pic_parameter_set_id shall be in the range of 0 to 63, inclusive.

It is a requirement of bitstream conformance that the value of TemporalId of the PH shall be greater than or equal to the value of TemporalId of the PPS that has pps_pic_parameter_set_id equal to ph_pic_parameter_set_id.

ph_pic_order_cnt_lsb specifies the picture order count modulo MaxPicOrderCntLsb for the current picture. The length of the ph_pic_order_cnt_lsb syntax element is log 2_max_pic_order_cnt_lsb_minus4+4 bits. The value of the ph_pic_order_cnt_lsb shall be in the range of 0 to MaxPicOrderCntLsb−1, inclusive.

no_output_of_prior_pics_flag affects the output of previously-decoded pictures in the Decoded Picture Buffer (DPB) after the decoding of a Coded Layer Video Sequence Start (CLVSS) picture that is not the first picture in the bitstream as specified in Annex C.

recovery_poc_cnt specifies the recovery point of decoded pictures in output order. If the current picture is a GDR picture that is associated with the PH, and there is a picture picA that follows the current GDR picture in decoding order in the CLVS that has PicOrderCntVal equal to the PicOrderCntVal of the current GDR picture plus the value of recovery_poc_cnt, the picture picA is referred to as the recovery point picture. Otherwise, the first picture in output order that has PicOrderCntVal greater than the PicOrderCntVal of the current picture plus the value of recovery_poc_cnt is referred to as the recovery point picture. The recovery point picture shall not precede the current GDR picture in decoding order.

The value of recovery_poc_cnt shall be in the range of 0 to MaxPicOrderCntLsb−1, inclusive.

When the current picture is a GDR picture, the variable RpPicOrderCntVal is derived as follows:

$$RpPicOrderCntVal = PicOrderCntVal + recovery\_poc\_cnt \quad (82)$$

NOTE 2—When gdr_enabled_flag is equal to 1 and PicOrderCntVal of the current picture is greater than or equal to RpPicOrderCntVal of the associated GDR picture, the current and subsequent decoded pictures in output order are exact match to the corresponding pictures produced by starting the decoding process from the previous IRAP picture, when present, preceding the associated GDR picture in decoding order.

ph_extra_bit[i] may be equal to 1 or 0. Decoders conforming to this version of this Specification shall ignore the value of ph_extra_bit[i]. Its value does not affect decoder conformance to profiles specified in this version of specification.

ph_poc_msb_present_flag equal to 1 specifies that the syntax element poc_msb_val is present in the PH. ph_poc_msb_present_flag equal to 0 specifies that the syntax element poc_msb_val is not present in the PH. When vps_independent_layer_flag[GeneralLayerIdx[nuh_layer_id]] is equal to 0 and there is a picture in the current AU in a reference layer of the current layer, the value of ph_poc_msb_present_flag shall be equal to 0.

poc_msb_val specifies the Picture Order Count (POC) Most Significant Bit (MSB) value of the current picture. The length of the syntax element poc_msb_val is poc_msb_len_minus1+1 bits.

ph_alf_enabled_flag equal to 1 specifies that adaptive loop filter is enabled for all slices associated with the PH and may be applied to Y, Cb, or Cr colour component in the slices. ph_alf_enabled_flag equal to 0 specifies that adaptive loop filter may be disabled for one, or more, or all slices associated with the PH. When not present, ph_alf_enabled_flag is inferred to be equal to 0.

ph_num_alf_aps_ids_luma specifies the number of ALF APSs that the slices associated with the PH refers to.

ph_alf_aps_id_luma[i] specifies the adaptation_parameter_set_id of the i-th ALF APS that the luma component of the slices associated with the PH refers to.

The value of alf_luma_filter_signal_flag of the APS NAL unit having aps_params_type equal to ALF_APS and adaptation_parameter_set_id equal to ph_alf_aps_id_luma[i] shall be equal to 1.

The TemporalId of the APS NAL unit having aps_params_type equal to ALF_APS and adaptation_parameter_set_id equal to ph_alf_aps_id_luma[i] shall be less than or equal to the TemporalId of the picture associated with the PH.

ph_alf_chroma_idc equal to 0 specifies that the adaptive loop filter is not applied to Cb and Cr colour components. ph_alf_chroma_idc equal to 1 indicates that the adaptive loop filter is applied to the Cb colour component. ph_alf_chroma_idc equal to 2 indicates that the adaptive loop filter is applied to the Cr colour component. ph_alf_chroma_idc equal to 3 indicates that the adaptive loop filter is applied to Cb and Cr colour components. When ph_alf_chroma_idc is not present, it is inferred to be equal to 0.

ph_alf_aps_id_chroma specifies the adaptation_parameter_set_id of the ALF APS that the chroma component of the slices associated with the PH refers to.

The value of alf_chroma_filter_signal_flag of the APS NAL unit having aps_params_type equal to ALF_APS and adaptation_parameter_set_id equal to ph_alf_aps_id_chroma shall be equal to 1.

The TemporalId of the APS NAL unit having aps_params_type equal to ALF_APS and adaptation_parameter_set_id equal to ph_alf_aps_id_chroma shall be less than or equal to the TemporalId of the picture associated with the PH.

ph_cc_alf_cb_enabled_flag equal to 1 specifies that cross-component filter for Cb colour component is enabled for all slices associated with the PH and may be applied to Cb colour component in the slices. ph_cc_alf_cb_enabled_flag equal to 0 specifies that cross-component filter for Cb colour component may be disabled for one, or more, or all slices associated with the PH. When not present, ph_cc_alf_cb_enabled_flag is inferred to be equal to 0.

ph_cc_alf_cb_aps_id specifies the adaptation_parameter_set_id of the ALF Adaptation Parameter Set (APS) that the Cb colour component of the slices associated with the PH refers to.

The value of alf_cc_cb_filter_signal_flag of the APS NAL unit having aps_params_type equal to ALF_APS and adaptation_parameter_set_id equal to ph_cc_alf_cb_aps_id shall be equal to 1.

The TemporalId of the APS NAL unit having aps_params_type equal to ALF_APS and adaptation_parameter_set_id equal to ph_cc_alf_cb_aps_id shall be less than or equal to the TemporalId of the picture associated with the PH.

ph_cc_alf_cr_enabled_flag equal to 1 specifies that cross-component filter for Cr colour component is enabled for all slices associated with the PH and may be applied to Cr colour component in the slices. ph_cc_alf_cr_enabled_flag equal to 0 specifies that cross-component filter for Cr colour component may be disabled for one, or more, or all slices associated with the PH. When not present, ph_cc_alf_cr_enabled_flag is inferred to be equal to 0.

ph_cc_alf_cr_aps_id specifies the adaptation_parameter_set_id of the ALF APS that the Cr colour component of the slices associated with the PH refers to.

The value of alf_cc_cr_filter_signal_flag of the APS NAL unit having aps_params_type equal to ALF_APS and adaptation_parameter_set_id equal to ph_cc_alf_cr_aps_id shall be equal to 1.

The TemporalId of the APS NAL unit having aps_params_type equal to ALF_APS and adaptation_parameter_set_id equal to ph_cc_alf_cr_aps_id shall be less than or equal to the TemporalId of the picture associated with the PH.

ph_lmcs_enabled_flag equal to 1 specifies that luma mapping with chroma scaling is enabled for all slices associated with the PH. ph_lmcs_enabled_flag equal to 0 specifies that luma mapping with chroma scaling may be disabled for one, or more, or all slices associated with the PH. When not present, the value of ph_lmcs_enabled_flag is inferred to be equal to 0.

ph_lmcs_aps_id specifies the adaptation_parameter_set_id of the Luma Mapping with Chroma Scaling (LMCS) APS that the slices associated with the PH refers to. The TemporalId of the APS NAL unit having aps_params_type equal to LMCS_APS and adaptation_parameter_set_id equal to ph_lmes_aps_id shall be less than or equal to the TemporalId of the picture associated with PH.

ph_chroma_residual_scale_flag equal to 1 specifies that chroma residual scaling is enabled for the all slices associated with the PH. ph_chroma_residual_scale_flag equal to 0 specifies that chroma residual scaling may be disabled for one, or more, or all slices associated with the PH. When ph_chroma_residual_scale_flag is not present, it is inferred to be equal to 0.

ph_scaling_list_present_flag equal to 1 specifies that the scaling list data used for the slices associated with the PH is derived based on the scaling list data contained in the referenced scaling list APS. ph_scaling_list_present_flag equal to 0 specifies that the scaling list data used for the slices associated with the PH is set to be equal to 16. When not present, the value of ph_scaling_list_present_flag is inferred to be equal to 0.

ph_scaling_list_aps_id specifies the adaptation_parameter_set_id of the scaling list APS. The TemporalId of the APS NAL unit having aps_params_type equal to SCALING_APS and adaptation_parameter_set_id equal to ph_scaling_list_aps_id shall be less than or equal to the TemporalId of the picture associated with PH.

ph_virtual_boundaries_present_flag equal to 1 specifies that information of virtual boundaries is signalled in the PH. ph_virtual_boundaries_present_flag equal to 0 specifies that information of virtual boundaries is not signalled in the PH. When there is one or more than one virtual boundaries signalled in the PH, the in-loop filtering operations are disabled across the virtual boundaries in the picture. The in-loop filtering operations include the deblocking filter, sample adaptive offset filter, and adaptive loop filter operations. When not present, the value of ph_virtual_boundaries_present_flag is inferred to be equal to 0.

It is a requirement of bitstream conformance that, when subpic_info_present_flag is equal to 1, the value of ph_virtual_boundaries_present_flag shall be equal to 0.

The variable VirtualBoundariesPresentFlag is derived as follows:

```
VirtualBoundariesPresentFlag = 0
if( sps_virtual_boundaries_enabled_flag )
    VirtualBoundariesPresentFlag =
    sps_virtual_boundaries_present_flag ||
        ph_virtual_boundaries_present_flag          (83)
``` ph_num_ver_virtual_boundaries specifies the number of ph_virtual_boundaries_pos_x[i] syntax elements that are present in the PH. When ph_num_ver_virtual_boundaries is not present, it is inferred to be equal to 0. The variable NumVerVirtualBoundaries is derived as follows:

```
NumVerVirtualBoundaries = 0
if( sps_virtual_boundaries_enabled_flag )
    NumVerVirtualBoundaries =
    sps_virtual_boundaries_present_flag ?
        sps_num_ver_virtual_boundaries :
        ph_num_ver_virtual_boundaries
                                                     (84)
``` ph_virtual_boundaries_pos_x[i] specifies the location of the i-th vertical virtual boundary in units of luma samples divided by 8. The value of ph_virtual_boundaries_pos_x[i] shall be in the range of 1 to Ceil (pic_width_in_luma_samples+8)−1, inclusive.

The list VirtualBoundariesPosX[i] for i ranging from 0 to NumVerVirtualBoundaries−1, inclusive, in units of luma samples, specifying the locations of the vertical virtual boundaries, is derived as follows:

```
for( i = 0; i < NumVerVirtualBoundaries; i++)
    VirtualBoundariesPosX[ i ] =
    ( sps_virtual_boundaries_present_flag ?
        sps_virtual_boundaries_pos_x[ i ] :
        ph_virtual_boundaries_pos_x[ i ] ) * 8
                                                     (85)
```

The distance between any two vertical virtual boundaries shall be greater than or equal to CtbSizeY luma samples.

ph_num_hor_virtual_boundaries specifies the number of ph_virtual_boundaries_pos_y[i] syntax elements that are present in the PH. When ph_num_hor_virtual_boundaries is not present, it is inferred to be equal to 0.

The parameter NumHorVirtualBoundaries is derived as follows:

```
NumHorVirtualBoundaries = 0
if( sps_virtual_boundaries_enabled_flag )
    NumHorVirtualBoundaries = sps_virtual_boundaries_present_flag ?
        sps_num_hor_virtual_boundaries : ph_num_hor_virtual_boundaries
                                                     (86)
```

When sps_virtual_boundaries_enabled_flag is equal to 1 and ph_virtual_boundaries_present_flag is equal to 1, the sum of ph_num_ver_virtual_boundaries and ph_num_hor_virtual_boundaries shall be greater than 0.

ph_virtual_boundaries_pos_y[i] specifies the location of the i-th horizontal virtual boundary in units of luma samples divided by 8. The value of ph_virtual_boundaries_pos_y[i] shall be in the range of 1 to Ceil(pic_height_in_luma_samples+8)−1, inclusive.

The list VirtualBoundariesPosY[i] for i ranging from 0 to NumHorVirtualBoundaries−1, inclusive, in units of luma samples, specifying the locations of the horizontal virtual boundaries, is derived as follows:

```
for( i = 0; i < NumHorVirtualBoundaries; i++)
    VirtualBoundariesPosY[ i ] = ( sps_virtual_boundaries_present_flag ?
        sps_virtual_boundaries_pos_y[ i ] :
        ph_virtual_boundaries_pos_y[ i ]) * 8
                                                     (87)
```

The distance between any two horizontal virtual boundaries shall be greater than or equal to CtbSizeY luma samples.

pic_output_flag affects the decoded picture output and removal processes as specified in Annex C. When pic_output_flag is not present, it is inferred to be equal to 1.

partition_constraints_override_flag equal to 1 specifies that partition constraint parameters are present in the PH. partition_constraints_override_flag equal to 0 specifies that partition constraint parameters are not present in the PH. When not present, the value of partition_constraints_override_flag is inferred to be equal to 0.

ph_log 2_diff_min_qt_min_cb_intra_slice_luma specifies the difference between the base 2 logarithm of the minimum size in luma samples of a luma leaf block resulting from quadtree splitting of a CTU and the base 2 logarithm of the minimum coding block size in luma samples for luma Coding Units (CUs) in the slices with slice_type equal to 2 (I) associated with the PH. The value of ph_log 2_diff_min_qt_min_cb_intra_slice_luma shall be in the range of 0 to Ctb Log 2SizeY−MinCb Log 2SizeY, inclusive. When not present, the value of ph_log 2_diff_min_qt_min_cb_luma is inferred to be equal to sps_log 2_diff_min_qt_min_cb_intra_slice_luma.

ph_max_mtt_hierarchy_depth_intra_slice_luma specifies the maximum hierarchy depth for coding units resulting from multi-type tree splitting of a quadtree leaf in slices with slice_type equal to 2 (I) associated with the PH. The value of ph_max_mtt_hierarchy_depth_intra_slice_luma shall be in the range of 0 to 2*(Ctb Log 2SizeY−MinCb Log 2SizeY), inclusive. When not present, the value of ph_max_mtt_hierarchy_depth_intra_slice_luma is inferred to be equal to sps_max_mtt_hierarchy_depth_intra_slice_luma.

ph_log 2_diff_max_bt_min_qt_intra_slice_luma specifies the difference between the base 2 logarithm of the maximum size (width or height) in luma samples of a luma coding block that can be split using a binary split and the minimum size (width or height) in luma samples of a luma leaf block resulting from quadtree splitting of a CTU in slices with slice_type equal to 2 (I) associated with the PH. The value of ph_log 2_diff_max_bt_min_qt_intra_slice_luma shall be in the range of 0 to Ctb Log 2SizeY−MinQt Log 2SizeIntraY, inclusive. When not present, the value of ph_log 2_diff_max_bt_min_qt_intra_slice_luma is inferred to be equal to sps_log 2_diff_max_bt_min_qt_intra_slice_luma.

ph_log 2_diff_max_tt_min_qt_intra_slice_luma specifies the difference between the base 2 logarithm of the maximum size (width or height) in luma samples of a luma coding block that can be split using a ternary split and the minimum size (width or height) in luma samples of a luma leaf block resulting from quadtree splitting of a CTU in slices with slice_type equal to 2 (I) associated with the PH. The value of ph_log 2_diff_max_tt_min_qt_intra_slice_luma shall be in the range of 0 to Ctb Log 2SizeY−MinQt Log 2SizeIntraY, inclusive. When not present, the value of ph_log 2_diff_max_tt_min_qt_intra_slice_luma is inferred to be equal to sps_log 2_diff_max_tt_min_qt_intra_slice_luma.

ph_log 2_diff_min_qt_min_cb_intra_slice_chroma specifies the difference between the base 2 logarithm of the minimum size in luma samples of a chroma leaf block resulting from quadtree splitting of a chroma CTU with treeType equal to DUAL_TREE_CHROMA and the base 2 logarithm of the minimum coding block size in luma samples for chroma CUs with treeType equal to DUAL_TREE_CHROMA in slices with slice_type equal to 2 (I) associated with the PH. The value of ph_log 2_diff_min_qt_min_cb_intra_slice_chroma shall be in the range of 0 to Ctb Log 2SizeY−MinCb Log 2SizeY, inclusive. When not present, the value of ph_log 2_diff_min_qt_min_cb_intra_slice_chroma is inferred to be equal to sps_log 2_diff_min_qt_min_cb_intra_slice_chroma.

ph_max_mtt_hierarchy_depth_intra_slice_chroma specifies the maximum hierarchy depth for chroma coding units resulting from multi-type tree splitting of a chroma quadtree leaf with treeType equal to DUAL_TREE_CHROMA in slices with slice_type equal to 2 (I) associated with the PH. The value of ph_max_mtt_hierarchy_depth_intra_slice_chroma shall be in the range of 0 to 2*(Ctb Log 2SizeY−MinCb Log 2SizeY), inclusive. When not present, the value of ph_max_mtt_hierarchy_depth_intra_slice_chroma is inferred to be equal to sps_max_mtt_hierarchy_depth_intra_slice_chroma.

ph_log 2_diff_max_bt_min_qt_intra_slice_chroma specifies the difference between the base 2 logarithm of the maximum size (width or height) in luma samples of a chroma coding block that can be split using a binary split and the minimum size (width or height) in luma samples of a chroma leaf block resulting from quadtree splitting of a chroma CTU with treeType equal to DUAL_TREE_CHROMA in slices with slice_type equal to 2 (I) associated with the PH. The value of ph_log 2_diff_max_bt_min_qt_intra_slice_chroma shall be in the range of 0 to Ctb Log 2SizeY−MinQt Log 2SizeIntraC, inclusive. When not present, the value of ph_log 2_diff_max_bt_min_qt_intra_slice_chroma is inferred to be equal to sps_log 2_diff_max_bt_min_qt_intra_slice_chroma.

ph_log 2_diff_max_tt_min_qt_intra_slice_chroma specifies the difference between the base 2 logarithm of the maximum size (width or height) in luma samples of a chroma coding block that can be split using a ternary split and the minimum size (width or height) in luma samples of a chroma leaf block resulting from quadtree splitting of a chroma CTU with treeType equal to DUAL_TREE_CHROMA in slices with slice_type equal to 2 (I) associated with the PH. The value of ph_log 2_diff_max_tt_min_qt_intra_slice_chroma shall be in the range of 0 to Ctb Log 2SizeY−MinQt Log 2SizeIntraC, inclusive. When not present, the value of ph_log 2_diff_max_tt_min_qt_intra_slice_chroma is inferred to be equal to sps_log 2_diff_max_tt_min_qt_intra_slice_chroma ph_cu_qp_delta_subdiv_intra_slice specifies the maximum cbSubdiv value of coding units in intra slice that convey cu_qp_delta_abs and cu_qp_delta_sign_flag. The value of ph_cu_qp_delta_subdiv_intra_slice shall be in the range of 0 to 2*(Ctb Log 2SizeY−MinQt Log 2SizeIntraY+ph_max_mtt_hierarchy_depth_intra_slice_luma), inclusive.

When not present, the value of ph_cu_qp_delta_subdiv_intra_slice is inferred to be equal to 0.

ph_cu_chroma_qp_offset_subdiv_intra_slice specifies the maximum cbSubdiv value of coding units in intra slice that convey cu_chroma_qp_offset_flag. The value of ph_cu_chroma_qp_offset_subdiv_intra_slice shall be in the range of 0 to 2*(Ctb Log 2SizeY−MinQt Log 2SizeIntraY+ph_max_mtt_hierarchy_depth_intra_slice_luma), inclusive.

When not present, the value of ph_cu_chroma_qp_offset_subdiv_intra_slice is inferred to be equal to 0.

ph_log 2_diff_min_qt_min_cb_inter_slice specifies the difference between the base 2 logarithm of the minimum size in luma samples of a luma leaf block resulting from quadtree splitting of a CTU and the base 2 logarithm of the minimum luma coding block size in luma samples for luma CUs in the slices with slice_type equal to 0 (B) or 1 (P) associated with the PH.

The value of ph_log 2_diff_min_qt_ min_cb_inter_slice shall be in the range of 0 to Ctb Log 2SizeY−MinCb Log 2SizeY, inclusive. When not present, the value of ph_log 2_diff_min_qt_ min_cb_luma is inferred to be equal to sps_log 2_diff_min_qt_ min_cb_inter_slice.

ph_max_mtt_hierarchy_depth_inter_slice specifies the maximum hierarchy depth for coding units resulting from multi-type tree splitting of a quadtree leaf in slices with slice_type equal to 0 (B) or 1 (P) associated with the PH. The value of ph_max_mtt_hierarchy_depth_inter_slice shall be in the range of 0 to 2*(Ctb Log 2SizeY−MinCb Log 2SizeY), inclusive. When not present, the value of ph_max_mtt_hierarchy_depth_inter_slice is inferred to be equal to sps_max_mtt_hierarchy_depth_inter_slice.

ph_log 2_diff_max_bt_min_qt_inter_slice specifies the difference between the base 2 logarithm of the maximum size (width or height) in luma samples of a luma coding block that can be split using a binary split and the minimum size (width or height) in luma samples of a luma leaf block resulting from quadtree splitting of a CTU in the slices with slice_type equal to 0 (B) or 1 (P) associated with the PH. The value of ph_log 2_diff_max_bt_min_qt_inter_slice shall be in the range of 0 to Ctb Log 2SizeY−MinQt Log 2SizeInterY, inclusive. When not present, the value of ph_log 2_diff_max_bt_min_qt_inter_slice is inferred to be equal to sps_log 2_diff_max_bt_min_qt_inter_slice.

ph_log 2_diff_max_tt_min_qt_inter_slice specifies the difference between the base 2 logarithm of the maximum size (width or height) in luma samples of a luma coding block that can be split using a ternary split and the minimum size (width or height) in luma samples of a luma leaf block resulting from quadtree splitting of a CTU in slices with slice_type equal to 0 (B) or 1 (P) associated with the PH. The value of ph_log 2_diff_max_tt_min_qt_inter_slice shall be in the range of 0 to Ctb Log 2SizeY−MinQt Log 2SizeInterY, inclusive. When not present, the value of ph_log 2_diff_max_tt_ min_qt_inter_slice is inferred to be equal to sps_log 2_diff_max_tt_min_qt_inter_slice.

ph_cu_qp_delta_subdiv_inter_slice specifies the maximum cbSubdiv value of coding units that in inter slice convey cu_qp_delta_abs and cu_qp_delta_sign_flag. The value of ph_cu_qp_delta_subdiv_inter_slice shall be in the range of 0 to 2*(Ctb Log 2SizeY−MinQt Log 2SizeInterY+ph_max_mtt_hierarchy_depth_inter_slice), inclusive.

When not present, the value of ph_cu_qp_delta_subdiv_inter_slice is inferred to be equal to 0.

ph_cu_chroma_qp_offset_subdiv_inter_slice specifies the maximum cbSubdiv value of coding units in inter slice that convey cu_chroma_qp_offset_flag. The value of ph_cu_chroma_qp_offset_subdiv_inter_slice shall be in the range of 0 to 2*(Ctb Log 2SizeY−MinQt Log 2SizeInterY+ph_max_mtt_hierarchy_depth_inter_slice), inclusive.

When not present, the value of ph_cu_chroma_qp_offset_subdiv_inter_slice is inferred to be equal to 0.

ph_temporal_mvp_enabled_flag specifies whether temporal motion vector predictors can be used for inter prediction for slices associated with the PH. If ph_temporal_mvp_enabled_flag is equal to 0, the syntax elements of the slices associated with the PH shall be constrained such that no temporal motion vector predictor is used in decoding of the slices. Otherwise (ph_temporal_mvp_enabled_flag is equal to 1), temporal motion vector predictors may be used in decoding of the slices associated with the PH. When not present, the value of ph_temporal_mvp_enabled_flag is inferred to be equal to 0. When no reference picture in the DPB has the same spatial resolution as the current picture, the value of ph_temporal_mvp_enabled_flag shall be equal to 0.

The maximum number of subblock-based merging Motion Vector Prediction (MVP) candidates, MaxNumSubblockMergeCand, is derived as follows:

```
if( sps_affine_enabled_flag )
   MaxNumSubblockMergeCand = 5 −
      five_minus_max_num_subblock_merge_cand
                                                          (88)
else
   MaxNumSubblockMergeCand =
      sps_sbtmvp_enabled_flag && ph_temporal_mvp_enable_flag
```

The value of MaxNumSubblockMergeCand shall be in the range of 0 to 5, inclusive.

ph_collocated_from_10_flag equal to 1 specifies that the collocated picture used for temporal motion vector prediction is derived from reference picture list 0. ph_collocated_from_10_flag equal to 0 specifies that the collocated picture used for temporal motion vector prediction is derived from reference picture list 1.

ph_collocated_ref_idx specifies the reference index of the collocated picture used for temporal motion vector prediction.

When ph_collocated_from_10_flag is equal to 1, ph_collocated_ref_idx refers to an entry in reference picture list 0, and the value of ph_collocated_ref_idx shall be in the range of 0 to num_ref_entries[0][RplsIdx[0]]−1, inclusive.

When ph_collocated_from_10_flag is equal to 0, ph_collocated_ref_idx refers to an entry in reference picture list 1, and the value of ph_collocated_ref_idx shall be in the range of 0 to num_ref_entries[1][RplsIdx[1]]−1, inclusive.

When not present, the value of ph_collocated_ref_idx is inferred to be equal to 0.

mvd_11_zero_flag equal to 1 indicates that the mvd_coding(x0, y0, 1) syntax structure is not parsed and MvdL1 [x0][y0][compIdx] and MvdCpL1[x0][y0][cpIdx][compIdx] are set equal to 0 for compIdx=0 . . . 1 and cpIdx=0 . . . 2. mvd_11_zero_flag equal to 0 indicates that the mvd_coding(x0, y0, 1) syntax structure is parsed.

ph_fpel_mmvd_enabled_flag equal to 1 specifies that merge mode with motion vector difference uses integer sample precision in the slices associated with the PH. ph_fpel_mmvd_enabled_flag equal to 0 specifies that merge mode with motion vector difference can use fractional sample precision in the slices associated with the PH. When not present, the value of ph_fpel_mmvd_enabled_flag is inferred to be 0.

ph_disable_bdof_flag equal to 1 specifies that bi-directional optical flow inter prediction based inter bi-prediction is disabled in the slices associated with the PH. ph_disable_bdof_flag equal to 0 specifies that bi-directional optical flow inter prediction based inter bi-prediction may or may not be enabled in the slices associated with the PH.

When ph_disable_bdof_flag is not present, the following applies:

If sps_bdof_enabled_flag is equal to 1, the value of ph_disable_bdof_flag is inferred to be equal to 0.

Otherwise (sps_bdof_enabled_flag is equal to 0), the value of ph_disable_bdof_flag is inferred to be equal to 1.

ph_disable_dmvr_flag equal to 1 specifies that decoder motion vector refinement based inter bi-prediction is disabled in the slices associated with the PH. ph_disable_dmvr_flag equal to 0 specifies that decoder motion vector refinement based inter bi-prediction may or may not be enabled in the slices associated with the PH.

When ph_disable_dmvr_flag is not present, the following applies:

If sps_dmvr_enabled_flag is equal to 1, the value of ph_disable_dmvr_flag is inferred to be equal to 0.

Otherwise (sps_dmvr_enabled_flag is equal to 0), the value of ph_disable_dmvr_flag is inferred to be equal to 1.

ph_disable_prof_flag equal to 1 specifies that prediction refinement with optical flow is disabled in the slices associated with the PH. ph_disable_prof_flag equal to 0 specifies that prediction refinement with optical flow may or may not be enabled in the slices associated with the PH.

When ph_disable_prof_flag is not present, the following applies:

If sps_affine_prof_enabled_flag is equal to 1, the value of ph_disable_prof_flag is inferred to be equal to 0.

Otherwise (sps_affine_prof_enabled_flag is equal to 0), the value of ph_disable_prof_flag is inferred to be equal to 1.

ph_qp_delta specifies the initial value of $Qp_Y$ to be used for the coding blocks in the picture until modified by the value of CuQpDeltaVal in the coding unit layer.

When qp_delta_info_in_ph_flag is equal to 1, the initial value of the $Qp_Y$ quantization parameter for all slices of the picture, $SliceQp_Y$, is derived as follows:

$$Slice Qp_Y = 26 + init\_qp\_minus26 + ph\_qp\_delta \quad (89)$$

The value of $SliceQp_Y$ shall be in the range of −QpBdOffset to +63, inclusive.

ph_joint_cbcr_sign_flag specifies whether, in transform units with tu_joint_cbcr_residual_flag[x0][y0] equal to 1, the collocated residual samples of both chroma components have inverted signs. When tu_joint_cbcr_residual_flag[x0][y0] equal to 1 for a transform unit, ph_joint_cbcr_sign_flag equal to 0 specifies that the sign of each residual sample of the Cr (or Cb) component is identical to the sign of the collocated Cb (or Cr) residual sample and ph_joint_cbcr_sign_flag equal to 1 specifies that the sign of each residual sample of the Cr (or Cb) component is given by the inverted sign of the collocated Cb (or Cr) residual sample.

ph_sao_luma_enabled_flag equal to 1 specifies that SAO is enabled for the luma component in all slices associated with the PH; ph_sao_luma_enabled_flag equal to 0 specifies that SAO for the luma component may be disabled for one, or more, or all slices associated with the PH. When ph_sao_luma_enabled_flag is not present, it is inferred to be equal to 0.

ph_sao_chroma_enabled_flag equal to 1 specifies that SAO is enabled for the chroma component in all slices associated with the PH; ph_sao_chroma_enabled_flag equal to 0 specifies that SAO for chroma component may be disabled for one, or more, or all slices associated with the PH. When ph_sao_chroma_enabled_flag is not present, it is inferred to be equal to 0.

ph_dep_quant_enabled_flag equal to 0 specifies that dependent quantization is disabled for the current picture. ph_dep_quant_enabled_flag equal to 1 specifies that dependent quantization is enabled for the current picture. When ph_dep_quant_enabled_flag is not present, it is inferred to be equal to 0.

pic_sign_data_hiding_enabled_flag equal to 0 specifies that sign bit hiding is disabled for the current picture. pic_sign_data_hiding_enabled_flag equal to 1 specifies that sign bit hiding is enabled for the current picture. When pic_sign_data_hiding_enabled_flag is not present, it is inferred to be equal to 0.

ph_deblocking_filter_override_flag equal to 1 specifies that deblocking parameters are present in the PH. ph_deblocking_filter_override_flag equal to 0 specifies that deblocking parameters are not present in the PH. When not present, the value of ph_deblocking_filter_override_flag is inferred to be equal to 0.

ph_deblocking_filter_disabled_flag equal to 1 specifies that the operation of the deblocking filter is not applied for the slices associated with the PH. ph_deblocking_filter_disabled_flag equal to 0 specifies that the operation of the deblocking filter is applied for the slices associated with the PH. When ph_deblocking_filter_disabled_flag is not present, it is inferred to be equal to pps_deblocking_filter_disabled_flag.

ph_beta_offset_div2 and ph_tc_offset_div2 specify the deblocking parameter offsets for β and tC (divided by 2) that are applied to the luma component for the slices associated with the PH. The values of ph_beta_offset_div2 and ph_tc_offset_div2 shall both be in the range of −12 to 12, inclusive. When not present, the values of ph_beta_offset_div2 and ph_tc_offset_div2 are inferred to be equal to pps_beta_offset_div2 and pps_tc_offset_div2, respectively.

ph_cb_beta_offset_div2 and ph_cb_tc_offset_div2 specify the deblocking parameter offsets for β and tC (divided by 2) that are applied to the Cb component for the slices associated with the PH. The values of ph_cb_beta_offset_div2 and ph_cb_tc_offset_div2 shall both be in the range of −12 to 12, inclusive. When not present, the values of ph_cb_beta_offset_div2 and ph_cb_tc_offset_div2 are inferred to be equal to pps_cb_beta_offset_div2 and pps_cb_tc_offset_div2, respectively.

ph_cr_beta_offset_div2 and ph_cr_tc_offset_div2 specify the deblocking parameter offsets for β and tC (divided by 2) that are applied to the Cr component for the slices associated with the PH. The values of ph_cr_beta_offset_div2 and ph_cr_tc_offset_div2 shall both be in the range of −12 to 12, inclusive. When not present, the values of ph_cr_beta_offset_div2 and ph_cr_tc_offset_div2 are inferred to be equal to pps_cr_beta_offset_div2 and pps_cr_tc_offset_div2, respectively.

ph_extension_length specifies the length of the PH extension data in bytes, not including the bits used for signalling ph_extension_length itself. The value of ph_extension_length shall be in the range of 0 to 256, inclusive. When not present, the value of ph_extension_length is inferred to be equal to 0.

ph_extension_data_byte may have any value. Decoders conforming to this version of this Specification shall ignore the value of ph_extension_data_byte. Its value does not affect decoder conformance to profiles specified in this version of specification.

3.3. SH Syntax and Semantics

In the latest VVC draft text, the SH syntax and semantics are as follows:

| | Descriptor |
|---|---|
| slice_header( ) { | |
|   picture_header_in_slice_header_flag | u(1) |
|   if( picture_header_in_slice_header_flag ) | |
|     picture_header_structure( ) | |
|   if( subpic_info_present_flag ) | |
|     slice_subpic_id | u(v) |
|   if( ( rect_slice_flag && NumSlicesInSubpic[ CurrSubpicIdx ] > 1 ) \|\| | |
|     ( !rect_slice_flag && NumTilesInPic > 1 ) ) | |
|     slice_address | u(v) |
|   for( i = 0; i < NumExtraShBits; i++ ) | |
|     sh_extra_bit[ i ] | u(1) |
|   if( !rect_slice_flag && NumTilesInPic > 1 ) | |
|     num_tiles_in_slice_minus1 | ue(v) |
|   if( ph_inter_slice_allowed_flag ) | |
|     slice_type | ue(v) |
|   if( sps_alf_enabled_flag && !alf_info_in_ph_flag ) { | |
|     slice_alf_enabled_flag | u(1) |
|     if( slice_alf_enabled_flag ) { | |
|       slice_num_alf_aps_ids_luma | u(3) |
|       for( i = 0; i < slice_num_alf_aps_ids_luma; i++ ) | |
|         slice_alf_aps_id_luma[ i ] | u(3) |
|       if( ChromaArrayType != 0 ) | |
|         slice_alf_chroma_idc | u(2) |
|       if( slice_alf_chroma_idc ) | |
|         slice_alf_aps_id_chroma | u(3) |
|       if( sps_ccalf_enabled_flag ) { | |
|         slice_cc_alf_cb_enabled_flag | u(1) |
|         if( slice_cc_alf_cb_enabled_flag ) | |
|           slice_cc_alf_cb_aps_id | u(3) |
|         slice_cc_alf_cr_enabled_flag | u(1) |
|         if( slice_cc_alf_cr_enabled_flag ) | |
|           slice_cc_alf_cr_aps_id | u(3) |
|       } | |
|     } | |
|   } | |
|   if( separate_colour_plane_flag = = 1 ) | |
|     colour_plane_id | u(2) |
|   if( !rpl_info_in_ph_flag && ( ( nal_unit_type != IDR_W_RADL && nal_unit_type != | |
|     IDR_N_LP ) \|\| sps_idr_rpl_present_flag ) ) | |
|     ref_pic_lists( ) | |
|   if( ( rpl_info_in_ph_flag \|\| ( ( nal_unit_type != IDR_W_RADL && nal_unit_type != | |
|     IDR_N_LP ) \|\| sps_idr_rpl_present_flag ) ) && | |
|     ( slice_type != I && num_ref_entries[ 0 ][ RplsIdx[ 0 ] ] > 1 ) \|\| | |
|     ( slice_type = = B && num_ref_entries[ 1 ][ RplsIdx[ 1 ] ] > 1 ) ) { | |
|     num_ref_idx_active_override_flag | u(1) |
|     if( num_ref_idx_active_override_flag ) | |
|       for( i = 0; i < ( slice_type = = B ? 2: 1 ); i++ ) | |
|         if( num_ref_entries[ i ][ RplsIdx[ i ] ] > 1 ) | |
|           num_ref_idx_active_minus1[ i ] | ue(v) |
|   } | |
|   if( slice_type != I ) { | |
|     if( cabac_init_present_flag ) | |
|       cabac_init_flag | u(1) |
|     if( ph_temporal_mvp_enabled_flag && !rpl_info_in_ph_flag ) { | |
|       if( slice_type = = B ) | |
|         slice_collocated_from_l0_flag | u(1) |
|       if( ( slice_collocated_from_l0_flag && NumRefIdxActive[ 0 ] > 1 ) \|\| | |
|         ( ! slice_collocated_from_l0_flag && NumRefIdxActive[ 1 ] > 1 ) ) | |
|         slice_collocated_ref_idx | ue(v) |
|     } | |
|     if( !wp_info_in_ph_flag && ( ( pps_weighted_pred_flag && slice_type = = P ) \|\| | |
|       ( pps_weighted_bipred_flag && slice_type = = B ) ) ) | |
|       pred_weight_table( ) | |

|  | Descriptor |
|---|---|
| } | |
| if( !qp_delta_info_in_ph_flag ) | |
|   slice_qp_delta | se(v) |
| if( pps_slice_chroma_qp_offsets_present_flag ) { | |
|   slice_cb_qp_offset | se(v) |
|   slice_cr_qp_offset | se(v) |
|   if( sps_joint_cbcr_enabled_flag ) | |
|     slice_joint_cbcr_qp_offset | se(v) |
| } | |
| if( pps_cu_chroma_qp_offset_list_enabled_flag ) | |
|   cu_chroma_qp_offset_enabled_flag | u(1) |
| if( sps_sao_enabled_flag && !sao_info_in_ph_flag ) { | |
|   slice_sao_luma_flag | u(1) |
|   if( ChromaArrayType != 0 ) | |
|     slice_sao_chroma_flag | u(1) |
| } | |
| if( deblocking_filter_override_enabled_flag && !dbf_info_in_ph_flag ) | |
|   slice_deblocking_filter_override_flag | u(1) |
| if( slice_deblocking_filter_override_flag ) { | |
|   slice_deblocking_filter_disabled_flag | u(1) |
|   if( !slice_deblocking_filter_disabled_flag ) { | |
|     slice_beta_offset_div2 | se(v) |
|     slice_tc_offset_div2 | se(v) |
|     slice_cb_beta_offset_div2 | se(v) |
|     slice_cb_tc_offset_div2 | se(v) |
|     slice_cr_beta_offset_div2 | se(v) |
|     slice_cr_tc_offset_div2 | se(v) |
|   } | |
| } | |
| slice_ts_residual_coding_disabled_flag | u(1) |
| if( ph_lmcs_enabled_flag ) | |
|   slice_lmcs_enabled_flag | u(1) |
| if( ph_scaling_list_enabled_flag ) | |
|   slice_scaling_list_present_flag | u(1) |
| if( NumEntryPoints > 0 ) { | |
|   offset_len_minus1 | ue(v) |
|   for( i = 0; i < NumEntryPoints; i++ ) | |
|     entry_point_offset_minus1[ i ] | u(v) |
| } | |
| if( slice_header_extension_present_flag ) { | |
|   slice_header_extension_length | ue(v) |
|   for( i = 0; i < slice_header_extension_length; i++) | |
|     slice_header_extension_data_byte[ i ] | u(8) |
| } | |
| byte_alignment( ) | |
| } | |

The variable CuQpDeltaVal, specifying the difference between a luma quantization parameter for the coding unit containing cu_qp_delta_abs and its prediction, is set equal to 0. The variables $CuQpOffset_{Cb}$, $CuQpOffset_{Cr}$, and $CuQpOffset_{CbCr}$, specifying values to be used when determining the respective values of the $Qp'_{Cb}$, $Qp'_{Cr}$, and $Qp'_{CbCr}$ quantization parameters for the coding unit containing cu_chroma_qp_offset_flag, are all set equal to 0.

picture_header_in_slice_header_flag equal to 1 specifies that the PH syntax structure is present in the slice header. picture_header_in_slice_header_flag equal to 0 specifies that the PH syntax structure is not present in the slice header.

It is a requirement of bitstream conformance that the value of picture_header_in_slice_header_flag shall be the same in all coded slices in a CLVS.

When picture_header_in_slice_header_flag is equal to 1 for a coded slice, it is a requirement of bitstream conformance that no VCL NAL unit with nal_unit_type equal to PH_NUT shall be present in the CLVS.

When picture_header_in_slice_header_flag is equal to 0, all coded slices in the current picture shall have picture_header_in_slice_header_flag is equal to 0, and the current PU shall have a PH NAL unit.

slice_subpic_id specifies the subpicture ID of the subpicture that contains the slice. If slice_subpic_id is present, the value of the variable CurrSubpicIdx is derived to be such that SubpicIdVal[CurrSubpicIdx] is equal to slice_subpic_id. Otherwise (slice_subpic_id is not present), CurrSubpicIdx is derived to be equal to 0. The length of slice_subpic_id is sps_subpic_id_len_minus1+1 bits.

slice_address specifies the slice address of the slice. When not present, the value of slice_address is inferred to be equal to 0. When rect_slice_flag is equal to 1 and NumSlicesInSubpic[CurrSubpicIdx] is equal to 1, the value of slice_address is inferred to be equal to 0.

If rect_slice_flag is equal to 0, the following applies:
  The slice address is the raster scan tile index.
  The length of slice_address is Ceil(Log 2 (NumTilesInPic)) bits.
  The value of slice_address shall be in the range of 0 to NumTilesInPic−1, inclusive.

Otherwise (rect_slice_flag is equal to 1), the following applies:

The slice address is the subpicture-level slice index of the slice.

The length of slice_address is Ceil(Log 2(NumSlicesInSubpic[CurrSubpicIdx])) bits.

The value of slice_address shall be in the range of 0 to NumSlicesInSubpic[CurrSubpicIdx]−1, inclusive.

It is a requirement of bitstream conformance that the following constraints apply:

If rect_slice_flag is equal to 0 or subpic_info_present_flag is equal to 0, the value of slice_address shall not be equal to the value of slice_address of any other coded slice NAL unit of the same coded picture.

Otherwise, the pair of slice_subpic_id and slice_address values shall not be equal to the pair of slice_subpic_id and slice_address values of any other coded slice NAL unit of the same coded picture.

The shapes of the slices of a picture shall be such that each CTU, when decoded, shall have its entire left boundary and entire top boundary consisting of a picture boundary or consisting of boundaries of previously decoded CTU(s).

sh_extra_bit[i] may be equal to 1 or 0. Decoders conforming to this version of this Specification shall ignore the value of sh_extra_bit[i]. Its value does not affect decoder conformance to profiles specified in this version of specification.

num_tiles_in_slice_minus1 plus 1, when present, specifies the number of tiles in the slice. The value of num_tiles_in_slice_minus1 shall be in the range of 0 to NumTilesInPic−1, inclusive.

The variable NumCtusInCurrSlice, which specifies the number of CTUs in the current slice, and the list CtbAddrInCurrSlice[i], for i ranging from 0 to NumCtusInCurrSlice−1, inclusive, specifying the picture raster scan address of the i-th CTB within the slice, are derived as follows:

```
if( rect_slice_flag ) {
  picLevelSliceIdx = slice_address
  for( j = 0; j < CurrSubpicIdx; j++ )
    picLevelSliceIdx += NumSlicesInSubpic[ j ]
  NumCtusInCurrSlice = NumCtusInSlice[ picLevelSliceIdx ]
  for( i = 0; i < NumCtusInCurrSlice; i++ )
    CtbAddrInCurrSlice[ i ] = CtbAddrInSlice
      [ picLevelSliceIdx ] [ i ]         (117)
} else {
  NumCtusInCurrSlice = 0
  for( tileIdx = slice_address; tileIdx <= slice_address +
    num_tiles_in_slice_minus1;
tileIdx++ ) {
    tileX = tileIdx % NumTileColumns
    tileY = tileIdx / NumTileColumns
    for( ctbY = tileRowBd[ tileY ];
      ctbY < tileRowBd[ tileY + 1 ]; ctbY++ ) {
      for( ctbX = tileColBd[ tileX ];
        ctbX < tileColBd[ tileX + 1 ]; ctbX++ ) {
        CtbAddrInCurrSlice[ NumCtusInCurrSlice ] =
ctbY * PicWidthInCtb + ctbX
        NumCtusInCurrSlice++
      }
    }
  }
}
```

The variables SubpicLeftBoundaryPos, SubpicTopBoundaryPos, SubpicRightBoundaryPos, and SubpicBotBoundaryPos are derived as follows:

```
if( subpic_treated_as_pic_flag[ CurrSubpicIdx ] ) {
  SubpicLeftBoundaryPos = subpic_ctu_top_left_x
    [ CurrSubpicIdx ] * CtbSizeY
  SubpicRightBoundaryPos = Min
    ( pic_width_max_in_luma_samples − 1,
      ( subpic_ctu_top_left_x[ CurrSubpicIdx ] +
      subpic_width_minus1[ CurrSubpicIdx ] + 1 ) * CtbSizeY − 1 )
  SubpicTopBoundaryPos = subpic_ctu_top_left_y
    [ CurrSubpicIdx ] *CtbSizeY
                                                        (118)
  SubpicBotBoundaryPos = Min
    ( pic_height_max_in_luma_samples − 1,
      ( subpic_ctu_top_left_y[ CurrSubpicIdx ] +
      subpic_height_minus1[ CurrSubpicIdx ] + 1 ) * CtbSizeY − 1 )
}
``` slice_type specifies the coding type of the slice according to Table 9.

TABLE 9

Name association to slice_type

| slice_type | Name of slice_type |
| --- | --- |
| 0 | B (B slice) |
| 1 | P (P slice) |
| 2 | I (I slice) |

When not present, the value of slice_type is inferred to be equal to 2.

When ph_intra_slice_allowed_flag is equal to 0, the value of slice_type shall be equal to 0 or 1. When nal_unit_type is in the range of IDR_W_RADL to CRA_NUT, inclusive, and vps_independent_layer_flag[GeneralLayerIdx[nuh_layer_id]] is equal to 1, slice_type shall be equal to 2.

The variables MinQt Log 2SizeY, MinQt Log 2SizeC, MinQtSizeY, MinQtSizeC, MaxBtSizeY, MaxBtSizeC, MinBtSizeY, MaxTtSizeY, MaxTtSizeC, MinTtSizeY, MaxMttDepthY and MaxMttDepthC are derived as follows:

If slice_type equal to 2 (I), the following applies:

$$\text{Min } Qt \text{ Log } 2SizeY = \text{Min } Cb \text{ Log } 2SizeY + ph\_log 2\_diff\_min\_qt\_min\_cb\_intra\_slice\_luma \quad (119)$$

$$\text{Min } Qt \text{ Log } 2SizeC = \text{Min } Cb \text{ Log } 2SizeY + ph\_log 2\_diff\_min\_qt\_min\_cb\_intra\_slice\_chroma \quad (120)$$

$$\text{Max } BtSizeY = 1 << (\text{Min } Qt \text{ Log } 2SizeY + ph\_log 2\_diff\_max\_bt\_min\_qt\_intra\_slice\_luma) \quad (121)$$

$$\text{Max } BtSizeC = 1 << (\text{Min } Qt \text{ Log } 2SizeC + ph\_log 2\_diff\_max\_bt\_min\_qt\_intra\_slice\_chroma) \quad (122)$$

$$\text{Max } TtSizeY = 1 << (\text{Min } Qt \text{ Log } 2SizeY + ph\_log 2\_diff\_max\_tt\_min\_qt\_intra\_slice\_luma) \quad (123)$$

$$\text{Max } TtSizeC = 1 << (\text{Min } Qt \text{ Log } 2SizeC + ph\_log 2\_diff\_max\_tt\_min\_qt\_intra\_slice\_chroma) \quad (124)$$

$$\text{Max } MttDepthY = ph\_max\_mtt\_hierarchy\_depth\_intra\_slice\_luma \quad (125)$$

$$\text{Max } MttDepthC = ph\_max\_mtt\_hierarchy\_depth\_intra\_slice\_chroma \quad (126)$$

$$CuQpDeltaSubdiv = ph\_cu\_qp\_delta\_subdiv\_intra\_slice \quad (127)$$

$$CuChromaQpOffsetSubdiv = ph\_cu\_chroma\_qp\_offset\_subdiv\_intra\_slice \quad (128)$$

Otherwise (slice_type equal to 0 (B) or 1 (P)), the following applies:

Min $Qt$ Log $2SizeY$=Min $Cb$ Log $2SizeY$+$ph\_log2\_diff\_min\_qt\_min\_cb\_inter\_slice$ (129)

Min $Qt$ Log $2SizeC$=Min $Cb$ Log $2SizeY$+$ph\_log2\_diff\_min\_qt\_min\_cb\_inter\_slice$ (130)

Max $BtSizeY$=1<<(Min $Qt$ Log $2SizeY$+$ph\_log2\_diff\_max\_bt\_min\_qt\_inter\_slice$) (131)

Max $BtSizeC$=1<<(Min $Qt$ Log $2SizeC$+$ph\_log2\_diff\_max\_bt\_min\_qt\_inter\_slice$) (132)

Max $TtSizeY$=1<<(Min $Qt$ Log $2SizeY$+$ph\_log2\_diff\_max\_tt\_min\_qt\_inter\_slice$) (133)

Max $TtSizeC$=1<<(Min $Qt$ Log $2SizeC$+$ph\_log2\_diff\_max\_tt\_min\_qt\_inter\_slice$) (134)

Max $MttDepthY$=$ph\_max\_mtt\_hierarchy\_depth\_inter\_slice$ (135)

Max $MttDepthC$=$ph\_max\_mtt\_hierarchy\_depth\_inter\_slice$ (136)

$CuQpDeltaSubdiv$=$ph\_cu\_qp\_delta\_subdiv\_inter\_slice$ (137)

$CuChromaQpOffsetSubdiv$=$ph\_cu\_chroma\_qp\_offset\_subdiv\_inter\_slice$ (138)

The following applies:

Min $QtSizeY$=1<<Min $Qt$ Log $2SizeY$ (139)

Min $QtSizeC$=1<<Min $Qt$ Log $2SizeC$ (140)

Min $BtSizeY$=1<<Min $Cb$ Log $2SizeY$ (141)

Min $TtSizeY$=1<Min $Cb$ Log $2SizeY$ (142)

slice_alf_enabled_flag equal to 1 specifies that adaptive loop filter is enabled and may be applied to Y, Cb, or Cr colour component in a slice. slice_alf_enabled_flag equal to 0 specifies that adaptive loop filter is disabled for all colour components in a slice. When not present, the value of slice_alf_enabled_flag is inferred to be equal to ph_alf_enabled_flag.

slice_num_alf_aps_ids_luma specifies the number of ALF APSs that the slice refers to. When slice_alf_enabled_flag is equal to 1 and slice_num_alf_aps_ids_luma is not present, the value of slice_num_alf_aps_ids_luma is inferred to be equal to the value of ph_num_alf_aps_ids_luma.

slice_alf_aps_id_luma[i] specifies the adaptation_parameter_set_id of the i-th ALF APS that the luma component of the slice refers to. The TemporalId of the APS NAL unit having aps_params_type equal to ALF_APS and adaptation_parameter_set_id equal to slice_alf_aps_id_luma[i] shall be less than or equal to the TemporalId of the coded slice NAL unit. When slice_alf_enabled_flag is equal to 1 and slice_alf_aps_id_luma[i] is not present, the value of slice_alf_aps_id_luma[i] is inferred to be equal to the value of ph_alf_aps_id_luma[i].

The value of alf_luma_filter_signal_flag of the APS NAL unit having aps_params_type equal to ALF_APS and adaptation_parameter_set_id equal to slice_alf_aps_id_luma[i] shall be equal to 1.

slice_alf_chroma_idc equal to 0 specifies that the adaptive loop filter is not applied to Cb and Cr colour components. slice_alf_chroma_idc equal to 1 indicates that the adaptive loop filter is applied to the Cb colour component. slice_alf_chroma_idc equal to 2 indicates that the adaptive loop filter is applied to the Cr colour component. slice_alf_chroma_idc equal to 3 indicates that the adaptive loop filter is applied to Cb and Cr colour components. When slice_alf_chroma_idc is not present, it is inferred to be equal to ph_alf_chroma_idc.

slice_alf_aps_id_chroma specifies the adaptation_parameter_set_id of the ALF APS that the chroma component of the slice refers to. The TemporalId of the APS NAL unit having aps_params_type equal to ALF_APS and adaptation_parameter_set_id equal to slice_alf_aps_id_ chroma shall be less than or equal to the TemporalId of the coded slice NAL unit. When slice_alf_enabled_ flag is equal to 1 and slice_alf_aps_id_chroma is not present, the value of slice_alf_aps_id_chroma is inferred to be equal to the value of ph_alf_aps_id_ chroma.

The value of alf_chroma_filter_signal_flag of the APS NAL unit having aps_params_type equal to ALF_APS and adaptation_parameter_set_id equal to slice_alf_aps_id_chroma shall be equal to 1.

slice_cc_alf_cb_enabled_flag equal to 0 specifies that the cross-component filter is not applied to the Cb colour component. slice_cc_alf_cb_enabled_flag equal to 1 indicates that the cross-component filter is enabled and may be applied to the Cb colour component. When slice_cc_alf_cb_enabled_flag is not present, it is inferred to be equal to ph_cc_alf_cb_enabled_flag.

slice_cc_alf_cb_aps_id specifies the adaptation_parameter_set_id that the Cb colour component of the slice refers to.

The TemporalId of the APS NAL unit having aps_params_type equal to ALF_APS and adaptation_parameter_set_id equal to slice_cc_alf_cb_aps_id shall be less than or equal to the TemporalId of the coded slice NAL unit. When slice_cc_alf_cb_enabled_flag is equal to 1 and slice_cc_alf_cb_aps_id is not present, the value of slice_cc_alf_cb_aps_id is inferred to be equal to the value of ph_cc_alf_cb_aps_id.

The value of alf_cc_cb_filter_signal_flag of the APS NAL unit having aps_params_type equal to ALF_APS and adaptation_parameter_set_id equal to slice_cc_alf_cb_aps_id shall be equal to 1.

slice_cc_alf_cr_enabled_flag equal to 0 specifies that the cross-component filter is not applied to the Cr colour component. slice_cc_alf_cb_enabled_flag equal to 1 indicates that the cross-component adaptive loop filter is enabled and may be applied to the Cr colour component. When slice_cc_alf_cr_enabled_flag is not present, it is inferred to be equal to ph_cc_alf_cr_enabled_ flag.

slice_cc_alf_cr_aps_id specifies the adaptation_parameter_set_id that the Cr colour component of the slice refers to. The TemporalId of the APS NAL unit having aps_params_type equal to ALF_APS and adaptation_parameter_set_id equal to slice_cc_alf_cr_aps_id shall be less than or equal to the TemporalId of the coded slice NAL unit. When slice_cc_alf_cr_enabled_flag is equal to 1 and slice_cc_alf_cr_aps_id is not present, the value of slice_cc_alf_cr_aps_id is inferred to be equal to the value of ph_cc_alf_cr_aps_id.

The value of alf_cc_cr_filter_signal_flag of the APS NAL unit having aps_params_type equal to ALF_APS and adaptation_parameter_set_id equal to slice_cc_alf_cr_aps_id shall be equal to 1.

colour_plane_id identifies the colour plane associated with the current slice when separate_colour_plane_flag is equal to 1. The value of colour_plane_id shall be in the range of 0 to 2, inclusive. colour_plane_id values 0, 1 and 2 correspond to the Y, Cb and Cr planes, respectively. The value 3 of colour_plane_id is reserved for future use by ITU-T ISO/JEC.

NOTE 1—There is no dependency between the decoding processes of different colour planes of one picture.

num_ref_idx_active_override_flag equal to 1 specifies that the syntax element num_ref_idx_active_minus1[0] is present for P and B slices and the syntax element num_ref_idx_active_minus1[1] is present for B slices. num_ref_idx_active_override_flag equal to 0 specifies that the syntax elements num_ref_idx_active_minus1[0] and num_ref_idx_active_minus1[1] are not present. When not present, the value of num_ref_idx_active_override_flag is inferred to be equal to 1.

num_ref_idx_active_minus1[i] is used for the derivation of the variable NumRefIdxActive[i] as specified by Equation 143. The value of num_ref_idx_active_minus1[i] shall be in the range of 0 to 14, inclusive.

For i equal to 0 or 1, when the current slice is a B slice, num_ref_idx_active_override_flag is equal to 1, and num_ref_idx_active_minus1[i] is not present, num_ref_idx_active_minus1[i] is inferred to be equal to 0. When the current slice is a P slice, num_ref_idx_active_override_flag is equal to 1, and num_ref_idx_active_minus1[0] is not present, num_ref_idx_active_minus1[0] is inferred to be equal to 0.

The variable NumRefIdxActive[i] is derived as follows:

```
for( i = 0; i < 2; i++ ) {
   if( slice_type = = B || ( slice_type = = P && i = = 0 ) ) {
      if( num_ref_idx_active_override_flag )
         NumRefIdxActive[ i ] =
            num_ref_idx_active_minus1[ i ] + 1                      (143)
      else {
         if( num_ref_entries[ i ][ RplsIdx[ i ] ] >=
num_ref_idx_default_active_minus1[ i ] + 1 )
            NumRefIdxActive [ i ] =
num_ref_idx_default_active_minus1[ i ] + 1
         else
            NumRefIdxActive[ i ] = num_ref_entries[ i ][ RplsIdx[ i ] ]
      }
   } else /* slice_type = = I || ( slice_type = = P && i = = 1 ) */
      NumRefIdxActive [ i ] = 0
}
```

The value of NumRefIdxActive[i]−1 specifies the maximum reference index for reference picture list i that may be used to decode the slice. When the value of NumRefIdxActive[i] is equal to 0, no reference index for reference picture list i may be used to decode the slice.

When the current slice is a P slice, the value of NumRefIdxActive[0] shall be greater than 0.

When the current slice is a B slice, both NumRefIdxActive[0] and NumRefIdxActive[1] shall be greater than 0.

cabac_init_flag specifies the method for determining the initialization table used in the initialization process for context variables. When cabac_init_flag is not present, it is inferred to be equal to 0.

slice_collocated_from_l0_flag equal to 1 specifies that the collocated picture used for temporal motion vector prediction is derived from reference picture list 0. slice_collocated_from_l0_flag equal to 0 specifies that the collocated picture used for temporal motion vector prediction is derived from reference picture list 1.

When slice_type is equal to B or P, ph_temporal_mvp_enabled_flag is equal to 1, and slice_collocated_from_l0_flag is not present, the following applies:
If rpl_info_in_ph_flag is equal to 1, slice_collocated_from_l0_flag is inferred to be equal to ph_collocated_from_l0_flag.
Otherwise (rpl_info_in_ph_flag is equal to 0 and slice_type is equal to P), the value of slice_collocated_from_l0_flag is inferred to be equal to 1.

slice_collocated_ref_idx specifies the reference index of the collocated picture used for temporal motion vector prediction.

When slice_type is equal to P or when slice_type is equal to B and slice_collocated_from_l0_flag is equal to 1, slice_collocated_ref_idx refers to an entry in reference picture list 0, and the value of slice_collocated_ref_idx shall be in the range of 0 to NumRefIdxActive[0]−1, inclusive.

When slice_type is equal to B and slice_collocated_from_l0_flag is equal to 0, slice_collocated_ref_idx refers to an entry in reference picture list 1, and the value of slice_collocated_ref_idx shall be in the range of 0 to NumRefIdxActive[1]−1, inclusive.

When slice_collocated_ref_idx is not present, the following applies:
If rpl_info_in_ph_flag is equal to 1, the value of slice_collocated_ref_idx is inferred to be equal to ph_collocated_ref_idx.
Otherwise (rpl_info_in_ph_flag is equal to 0), the value of slice_collocated_ref_idx is inferred to be equal to 0.

It is a requirement of bitstream conformance that the picture referred to by slice_collocated_ref_idx shall be the same for all slices of a coded picture.

It is a requirement of bitstream conformance that the values of pic_width_in_luma_samples and pic_height_in_luma_samples of the reference picture referred to by slice_collocated_ref_idx shall be equal to the values of pic_width_in_luma_samples and pic_height_in_luma_samples, respectively, of the current picture, and RprConstraintsActive[slice_collocated_from_l0_flag? 0:1][slice_collocated_ref_idx] shall be equal to 0.

slice_qp_delta specifies the initial value of $Qp_Y$ to be used for the coding blocks in the slice until modified by the value of CuQpDeltaVal in the coding unit layer.

When qp_delta_info_in_ph_flag is equal to 0, the initial value of the $Qp_Y$ quantization parameter for the slice, $SliceQp_Y$, is derived as follows:

$$SliceQp_Y = 26 + \text{init\_qp\_minus26} + \text{slice\_qp\_delta} \tag{144}$$

The value of $SliceQp_Y$ shall be in the range of −QpBdOffset to +63, inclusive.

When either of the following conditions is true:
The value of wp_info_in_ph_flag is equal to 1, pps_weighted_pred_flag is equal to 1, and slice_type is equal to P.
The value of wp_info_in_ph_flag is equal to 1, pps_weighted_bipred_flag is equal to 1, and slice_type is equal to B.
the following applies:
The value of NumRefIdxActive[0] shall be less than or equal to the value of NumWeightsL0.
For each reference picture index RefPicList[0][i] for i in the range of 0 to NumRefIdxActive[0]−1, inclusive, the luma weight, Cb weight, and Cr weight that apply to the reference picture index are Luma-WeightL0[i], ChromaWeightL0[0][i], and ChromaWeightL0[1][i], respectively.

When wp_info_in_ph_flag is equal to 1, pps_weighted_bipred_flag is equal to 1, and slice_type is equal to B, the following applies:

The value of NumRefIdxActive[1] shall be less than or equal to the value of NumWeightsL1.

For each reference picture index RefPicList[1][i] for i in the range of 0 to NumRefIdxActive[1]−1, inclusive, the luma weight, Cb weight, and Cr weight that apply to the reference picture index are LumaWeightL1[i], ChromaWeightL1[0][i], and ChromaWeightL1[1][i], respectively.

slice_cb_qp_offset specifies a difference to be added to the value of pps_cb_qp_offset when determining the value of the $Qp'_{Cb}$ quantization parameter. The value of slice_cb_qp_offset shall be in the range of −12 to +12, inclusive. When slice_cb_qp_offset is not present, it is inferred to be equal to 0. The value of pps_cb_qp_offset+slice_cb_qp_offset shall be in the range of −12 to +12, inclusive.

slice_cr_qp_offset specifies a difference to be added to the value of pps_cr_qp_offset when determining the value of the $Qp'_{Cr}$ quantization parameter. The value of slice_cr_qp_offset shall be in the range of −12 to +12, inclusive. When slice_cr_qp_offset is not present, it is inferred to be equal to 0. The value of pps_cr_qp_offset+slice_cr_qp_offset shall be in the range of −12 to +12, inclusive.

slice_joint_cbcr_qp_offset specifies a difference to be added to the value of pps_joint_cbcr_qp_offset_value when determining the value of the $Qp'_{CbCr}$. The value of slice_joint_cbcr_qp_offset shall be in the range of −12 to +12, inclusive. When slice_joint_cbcr_qp_offset is not present, it is inferred to be equal to 0. The value of pps_joint_cbcr_qp_offset_value+slice_joint_cbcr_qp_offset shall be in the range of −12 to +12, inclusive.

cu_chroma_qp_offset_enabled_flag equal to 1 specifies that the cu_chroma_qp_offset_flag may be present in the transform unit and palette coding syntax. cu_chroma_qp_offset_enabled_flag equal to 0 specifies that the cu_chroma_qp_offset_flag is not present in the transform unit or palette coding syntax. When not present, the value of cu_chroma_qp_offset_enabled_flag is inferred to be equal to 0.

slice_sao_luma_flag equal to 1 specifies that SAO is enabled for the luma component in the current slice; slice_sao_luma_flag equal to 0 specifies that SAO is disabled for the luma component in the current slice. When slice_sao_luma_flag is not present, it is inferred to be equal to ph_sao_luma_enabled_flag.

slice_sao_chroma_flag equal to 1 specifies that SAO is enabled for the chroma component in the current slice; slice_sao_chroma_flag equal to 0 specifies that SAO is disabled for the chroma component in the current slice. When slice_sao_chroma_flag is not present, it is inferred to be equal to ph_sao_chroma_enabled_flag.

slice_deblocking_filter_override_flag equal to 1 specifies that deblocking parameters are present in the slice header. slice_deblocking_filter_override_flag equal to 0 specifies that deblocking parameters are not present in the slice header. When not present, the value of slice_deblocking_filter_override_flag is inferred to be equal to ph_deblocking_filter_override_flag.

slice_deblocking_filter_disabled_flag equal to 1 specifies that the operation of the deblocking filter is not applied for the current slice. slice_deblocking_filter_disabled_flag equal to 0 specifies that the operation of the deblocking filter is applied for the current slice. When slice_deblocking_filter_disabled_flag is not present, it is inferred to be equal to ph_deblocking_filter_disabled_flag.

slice_beta_offset_div2 and slice_tc_offset_div2 specify the deblocking parameter offsets for R and tC (divided by 2) that are applied to the luma component for the current slice. The values of slice_beta_offset_div2 and slice_tc_offset_div2 shall both be in the range of −12 to 12, inclusive. When not present, the values of slice_beta_offset_div2 and slice_tc_offset_div2 are inferred to be equal to ph_beta_offset_div2 and ph_tc_offset_div2, respectively.

slice_cb_beta_offset_div2 and slice_cb_tc_offset_div2 specify the deblocking parameter offsets for β and tC (divided by 2) that are applied to the Cb component for the current slice. The values of slice_cb_beta_offset_div2 and slice_cb_tc_offset_div2 shall both be in the range of −12 to 12, inclusive. When not present, the values of slice_cb_beta_offset_div2 and slice_cb_tc_offset_div2 are inferred to be equal to ph_cb_beta_offset_div2 and ph_cb_tc_offset_div2, respectively.

slice_cb_beta_offset_div2 and slice_cb_tc_offset_div2 specify the deblocking parameter offsets for β and tC (divided by 2) that are applied to the Cr component for the current slice. The values of slice_cr_beta_offset_div2 and slice_cr_tc_offset_div2 shall both be in the range of −12 to 12, inclusive. When not present, the values of slice_cr_beta_offset_div2 and slice_cr_tc_offset_div2 are inferred to be equal to ph_cr_beta_offset_div2 and ph_cr_tc_offset_div2, respectively.

slice_ts_residual_coding_disabled_flag equal to 1 specifies that the residual_coding( ) syntax structure is used to parse the residual samples of a transform skip block for the current slice. slice_ts_residual_coding_disabled_flag equal to 0 specifies that the residual_ts_coding( ) syntax structure is used to parse the residual samples of a transform skip block for the current slice. When slice_ts_residual_coding_disabled_flag is not present, it is inferred to be equal to 0.

slice_lmcs_enabled_flag equal to 1 specifies that luma mapping with chroma scaling is enabled for the current slice. slice_lmcs_enabled_flag equal to 0 specifies that luma mapping with chroma scaling is not enabled for the current slice. When slice_lmcs_enabled_flag is not present, it is inferred to be equal to 0.

slice_scaling_list_present_flag equal to 1 specifies that the scaling list data used for the current slice is derived based on the scaling list data contained in the referenced scaling list APS with aps_params_type equal to SCALING_APS and adaptation_parameter_set_id equal to ph_scaling_list_aps_id. slice_scaling_list_present_flag equal to 0 specifies that the scaling list data used for the current picture is the default scaling list data derived specified in clause 7.4.3.21. When not present, the value of slice_scaling_list_present_flag is inferred to be equal to 0.

The variable NumEntryPoints, which specifies the number of entry points in the current slice, is derived as follows:

```
NumEntryPoints = 0
for( i = 1; i < NumCtusInCurrSlice; i++ ) {
   ctbAddrX = CtbAddrInCurrSlice[ i ] % PicWidthInCtbsY
   ctbAddrY = CtbAddrInCurrSlice[ i ] /
PicWidthInCtbsY                           (145)  prevCtbAddrX
= CtbAddrInCurrSlice[ i − 1 ] % PicWidthInCtbsY
   prevCtbAddrY = CtbAddrInCurrSlice[ i − 1 ] / PicWidthInCtbsY
   if( CtbToTileRowBd[ ctbAddrY ] !=
CtbToTileRowBd[ prevCtbAddrY ] ||
      CtbToTileColBd[ ctbAddrX ] !=
      CtbToTileColBd[ prevCtbAddrX ] ||
      ( ctbAddrY != prevCtbAddrY &&
sps_wpp_entry_point_offsets_present_flag ) )
         NumEntryPoints++
}
``` offset_len_minus1 plus 1 specifies the length, in bits, of the entry_point_offset_minus1[i] syntax elements. The value of offset_len_minus1 shall be in the range of 0 to 31, inclusive.

entry_point_offset_minus1[i] plus 1 specifies the i-th entry point offset in bytes, and is represented by offset_len_minus1 plus 1 bits. The slice data that follow the slice header consists of NumEntryPoints+1 subsets, with subset index values ranging from 0 to NumEntryPoints, inclusive. The first byte of the slice data is considered byte 0. When present, emulation prevention bytes that appear in the slice data portion of the coded slice NAL unit are counted as part of the slice data for purposes of subset identification. Subset 0 consists of bytes 0 to entry_point_offset_minus1[0], inclusive, of the coded slice data, subset k, with k in the range of 1 to NumEntryPoints−1, inclusive, consists of bytes firstByte[k] to lastByte[k], inclusive, of the coded slice data with firstByte[k] and lastByte[k] defined as:

$$\text{firstByte}[k] = \Sigma_{n=1}^{k}(\text{entry\_point\_offset\_minus1}[n-1] + 1) \quad (146)$$

$$\text{lastByte}[k] = \text{firstByte}[k] + \text{entry\_point\_offset\_minus1}[k] \quad (147)$$

The last subset (with subset index equal to NumEntryPoints) consists of the remaining bytes of the coded slice data.

When sps_entropy_coding_sync_enabled_flag is equal to 0 and the slice contains one or more complete tiles, each subset shall consist of all coded bits of all CTUs in the slice that are within the same tile, and the number of subsets (i.e., the value of NumEntryPoints+1) shall be equal to the number of tiles in the slice.

When sps_entropy_coding_sync_enabled_flag is equal to 0 and the slice contains a subset of CTU rows from a single tile, the NumEntryPoints shall be 0, and the number of subsets shall be 1. The subset shall consist of all coded bits of all CTUs in the slice.

When sps_entropy_coding_sync_enabled_flag is equal to 1, each subset k with k in the range of 0 to NumEntryPoints, inclusive, shall consist of all coded bits of all CTUs in a CTU row within a tile, and the number of subsets (i.e., the value of NumEntryPoints+1) shall be equal to the total number of tile-specific CTU rows in the slice.

slice_header_extension_length specifies the length of the slice header extension data in bytes, not including the bits used for signalling slice_header_extension_length itself. The value of slice_header_extension_length shall be in the range of 0 to 256, inclusive. When not present, the value of slice_header_extension_length is inferred to be equal to 0.

slice_header_extension_data_byte[i] may have any value. Decoders conforming to this version of this Specification shall ignore the values of all the slice_header_extension_data_byte[i] syntax elements. Its value does not affect decoder conformance to profiles specified in this version of specification.

3.4. Decoding Process for Inter Blocks—Fractional Sample Interpolation Process In the latest VVC draft text, the decoding process of fractional sample interpolation process are as follows:

Inputs to this process are:
  a luma location (xSb, ySb) specifying the top-left sample of the current coding subblock relative to the top-left luma sample of the current picture,
  a variable sbWidth specifying the width of the current coding subblock,
  a variable sbHeight specifying the height of the current coding subblock,
  a motion vector offset mvOffset,
  a refined motion vector refMvLX,
  the selected reference picture sample array refPicLX,
  the half sample interpolation filter index hpelIfIdx,
  the decoder-side motion vector refinement flag dmvrFlag,
  the bi-directional optical flow flag bdofFlag,
  a variable refPicIsScaled indicating whether the selected reference picture requires scaling,
  a variable cIdx specifying the colour component index of the current block,
  a list of two scaling ratios, horizontal and vertical, scalingRatio.

Outputs of this process are:
  an (sbWidth+brdExtSize)×(sbHeight+brdExtSize) array predSamplesLX of prediction sample values.

The prediction block border extension size brdExtSize is derived as follows:

$$\text{brdExtSize} = (bd\text{ofFlag} || (\text{inter\_affine\_flag}[xSb][ySb] \&\& !ph\_disable\_prof\_flag))?2:0 \quad (934)$$

The variable refWraparoundEnabledFlag is set equal to (pps_ref_wraparound_enabled_flag && !refPicIsScaled).

The variable fRefLeftOffset is set equal to ((SubWidthC*scaling_win_left_offset)<<10), where scaling_win_left_offset is the scaling_win_left_offset for the reference picture.

The variable fRefTopOffset is set equal to ((SubWidthC*scaling_win_top_offset)<<10), where scaling_win_top_offset is the scaling_win_top_offset for the reference picture.

The (sbWidth+brdExtSize)×(sbHeight+brdExtSize) array predSamplesLX of prediction sample values is derived as follows:

The motion vector mvLX is set equal to (refMvLX−mvOffset).

If cIdx is equal to 0, the following applies:
  Let ($xInt_L$, $yInt_L$) be a luma location given in full-sample units and ($xFrac_L$, $yFrac_L$) be an offset given in $\frac{1}{16}$-sample units. These variables are used only in this clause for specifying fractional-sample locations inside the reference sample arrays refPicLX.

The top-left coordinate of the bounding block for reference sample padding (xSbInt$_L$, ySbInt$_L$) is set equal to (xSb+(mvLX[0]>>4),ySb+(mvLX[1]>>4)).

For each luma sample location (x$_L$=0 . . . sbWidth−1+brdExtSize, y$_L$=0 . . . sbHeight−1+brdExtSize) inside the prediction luma sample array predSamplesLX, the corresponding prediction luma sample value predSamplesLX[x$_L$][y$_L$] is derived as follows:

Let (refxSb$_L$, refySb$_L$) and (refx$_L$, refy$_L$) be luma locations pointed to by a motion vector (refMvLX[0], refMvLX[1]) given in 1/16-sample units. The variables refxSb$_L$, refx$_L$, refySb$_L$, and refy$_L$ are derived as follows:

refxSb$_L$=(((xSb−(SubWidthC*scaling_win_left_offset))<<4)+refMvLX[0])*scalingRatio[0]  (935)

refx$_L$=((Sign(refxSb$_L$)*((Abs(refxSb$_L$)+128)>>8)+x$_L$*((scalingRatio[0]+8)>>4))+fRefLeftOffset+32)>>6  (936)

refySb$_L$=(((ySb−(SubWidthC*scaling_win_top_offset))<<4)+refMvLX[1])*scalingRatio[1]  (937)

refy$_L$=((Sign(refySb$_L$)*((Abs(refySb$_L$)+128)>>8)+yL*((scalingRatio[1]+8)>>4))+fRefTopOffset+32)>>6  (938)

The variables xInt$_L$, yInt$_L$, xFrac$_L$ and yFrac$_L$ are derived as follows:

xInt$_L$=refx$_L$>>4  (939)

yInt$_L$=refy$_L$>>4  (940)

xFrac$_L$=refx$_L$&15  (941)

yFrac$_L$=refy$_L$&15  (942)

The prediction luma sample value predSamplesLX[x$_L$][y$_L$] is derived as follows:
If bdofFlag is equal to TRUE or (ph_disable_prof_flag is equal to FALSE and inter_affine_flag[xSb][ySb] is equal to TRUE), and one or more of the following conditions are true, the prediction luma sample value predSamplesLX[x$_L$][y$_L$] is derived by invoking the luma integer sample fetching process as specified in clause 8.5.6.3.3 with (xInt$_L$+(xFrac$_L$>>3)−1), yInt$_L$+(yFrac$_L$>>3)−1), refPicLX, and refWraparoundEnabledFlag as inputs.
x$_L$ is equal to 0.
x$_L$ is equal to sbWidth+1.
y$_L$ is equal to 0.
y$_L$ is equal to sbHeight+1.
Otherwise, the prediction luma sample value predSamplesLX[x$_L$][y$_L$] is derived by invoking the luma sample 8-tap interpolation filtering process as specified in clause 8.5.6.3.2 with (xIntL−(brdExtSize>0? 1:0), yIntL−(brdExtSize>0? 1:0)), (xFracL, yFracL), (xSbInt$_L$, ySbInt$_L$), refPicLX, hpelIfIdx, sbWidth, sbHeight, dmvrFlag, refWraparoundEnabledFlag, scalingRatio[0], scalingRatio[1], and (xSb, ySb) as inputs.

Otherwise (cIdx is not equal to 0), the following applies:

Let (xIntC, yIntC) be a chroma location given in full-sample units and (xFracC, yFracC) be an offset given in 1/32 sample units. These variables are used only in this clause for specifying general fractional-sample locations inside the reference sample arrays refPicLX.

The top-left coordinate of the bounding block for reference sample padding (xSbIntC, ySbIntC) is set equal to ((xSb/SubWidthC)+(mvLX[0]>>5), (ySb/SubHeightC)+(mvLX[1]>>5)).

For each chroma sample location (xC=0 . . . sbWidth−1, yC=0 . . . sbHeight−1) inside the prediction chroma sample arrays predSamplesLX, the corresponding prediction chroma sample value predSamplesLX[xC][yC] is derived as follows:
Let (refxSb$_C$, refySb$_C$) and (refx$_C$, refy$_C$) be chroma locations pointed to by a motion vector (refMvLX[0], refMvLX[1]) given in 1/32-sample units. The variables refxSb$_C$, refySb$_C$, refx$_C$ and refy$_C$ are derived as follows:

addX=sps_chroma_horizontal_collocated_flag?0:8*(scalingRatio[0]−(1<<14))  (943)

addY=sps_chroma_vertical_collocated_flag?0:8*(scalingRatio[1]−(1<<14))  (944)

refxSb$_C$=(((xSb−(SubWidthC*scaling_win_left_offset))/SubWidthC<<refMvLX[0])*scalingRatio[0]+addX  (945)

refx$_C$=((Sign(refxSb$_C$)*((Abs(refxSb$_C$)+256)>>9)+xC*((scalingRatio[0]+8)>>4))+fRefLeftOffset/SubWidthC+16)>>5  (946)

refySb$_C$=(((ySb−(SubWidthC*scaling_win_top_offset))/SubHeightC<<5)+refMvLX[1])*scalingRatio[1]+addY  (947)

refy$_C$=((Sign(refySb$_C$)*((Abs(refySb$_C$)+256)>>9)+yC*((scalingRatio[1]+8)>>4))+fRefTopOffset/SubHeightC+16)>>5  (948)

The variables xInt$_C$, yInt$_C$, xFrac$_C$ and yFrac$_C$ are derived as follows:

xInt$_C$=refx$_C$>>5  (949)

yInt$_C$=refy$_C$>>5  (950)

xFrac$_C$=refx$_C$&31  (951)

yFrac$_C$=refy$_C$&31  (952)

The prediction sample value predSamplesLX[xC][yC] is derived by invoking the process specified in clause 8.5.6.3.4 with (xIntC, yIntC), (xFracC, yFracC), (xSbIntC, ySbIntC), sbWidth, sbHeight, refPicLX, dmvrFlag, refWraparoundEnabledFlag, scalingRatio[0], and scalingRatio[1] as inputs.

NOTE—Unlike the process specified in clause 8.4.5.2.13, this process uses both sps_chroma_vertical_collocated_flag and sps_chroma_horizontal_collocated_flag.

4. TECHNICAL PROBLEMS SOLVED BY TECHNICAL SOLUTIONS AND EMBODIMENTS

The existing designs for deblocking, scaling, and PROF have the following problems:

1) Currently, the design logic of deblocking (DB) controlling in PPS, PH, and Slice Header (SH) syntax elements has some problems.
   a. Firstly, according to the current semantics of the PPS syntax element pps_deblocking_filter_disabled_flag, which is used to specify whether the deblocking filter is applied or not for slices referring to PPS, the SH syntax element slice_deblocking_filter_disabled_flag would be checked. However, in addition to slice_deblocking_filter_disabled_flag, the PH syntax element ph_deblocking_filter_disabled_flag should also be checked together with pps_deblocking_filter_disabled_flag. Therefore, the current semantics of pps_deblocking_filter_disabled_flag is not correct.
   b. Secondly, according to the current draft text, when the SH syntax element slice_deblocking_filter_override_flag is not present, it is inferred to be equal to ph_deblocking_filter_override_flag. However, besides implicit or explicit signalling in PPS, the deblocking parameters can only be signalled either in PH or SH according to dbf_info_in_ph_flag, never both. Therefore, when dbf_info_in_ph_flag is true, the intention is to allow to signal the overriding deblocking filter parameters in PH. In this case, if the PH override flag is true and SH override flag is not signalled, but inferred to be equal to the PH override flag, additional deblocking filter parameters will still be signalled in SH which is conflicting with the intention.
   c. Thirdly, according to the current draft text, if the PPS syntax element deblocking_filter_override_enabled_flag is equal to 1, and meanwhile the pps_deblocking_filter_disabled_flag is equal to 1, the ph_deblocking_filter_disabled_flag or slice_deblocking_filter_disabled_flag may be still explicitly signalled to be equal to 1. However, such case means that deblocking is disabled in PPS and it is going to be overridden, but the overriding process doesn't change anything (e.g., deblocking remains disabled in PH/SH) but waste bits for signalling.
   d. Fourthly, the current design logic for deblocking allows the possibility that deblocking can be enabled in PH/SH even if it is disabled in PPS. Such design logic is quite different from the design logic of most other coding tools like ALF, SAO, LMCS, Temporal Motion Vector Prediction (TMVP), Weighted Prediction (WP), and etc.
   e. The PPS DB disabling flag (i.e., pps_deblocking_filter_disabled_flag) is signalled only when deblocking_filter_control_present_flag is equal to 1, and if the flag is not present, it is inferred to be equal to 0. That is, the intention is to enable DB by default. The two syntax elements (i.e., the PPS DB disabling flag and deblocking_filter_control_present_flag) are somewhat redundant. Better design is necessary.
2) According to the latest VVC draft text, the size of prediction block generated for PROF is dependent on whether it is affine AMVP or affine MERGE mode. Assuming sbWidth and sbHeight are the width and height of a sub-block for an affine coded block, in the current text, according to the condition "inter_affine_flag[xSb][ySb]&& !ph_disable_prof_flag", a prediction block with extended samples such as (sbWidth+2)×(sbHeight+2) is used for PROF when PROF is applied to an affine AMVP block, however, a prediction block of sbWidth×sbHeight is used for PROF when PROF is applied to an affine MERGE block. Such design causes different handling mechanisms between PROF with affine AMVP and PROF with affine MERGE.
   a. Moreover, 8-tap interpolation filter is used for generating internal prediction samples inside a sub-block for PROF, and integer samples other than 8-tap filters are used for generating extended prediction samples outside the sub-block for PROF. However, according to current text, there is no extended samples for PROF with affine MERGE, which causes discrepancies between PROF with affine AMVP and PROF with affine MERGE.
3) Currently, picture-level or slice-level luma qp delta is always signalled, either in PH or in SH, never both. Whereas the slice-level chroma qp offset is optionally signalled in SH, and there is no PH signalling for picture-level chroma qp offset. Such design may be not consistent/efficient/flexible.
4) In the latest VVC draft text, the definition of allowed value range for the delta QP signalling related PH syntax elements (such as ph_cu_qp_delta_subdiv_intra_slice, ph_cu_qp_delta_subdiv_inter_slice, ph_cu_chroma_qp_offset_subdiv_intra_slice, and ph_cu_chroma_qp_offset_subdiv_inter_slice) may be not precise.

5. EXAMPLE LISTING OF SOLUTIONS AND EMBODIMENTS

To solve the above problems and some other problems not mentioned, methods as summarized below are disclosed. The items should be considered as examples to explain the general concepts and should not be interpreted in a narrow way. Furthermore, these items can be applied individually or combined in any manner.

In the following discussions, the Deblocking Filter (DBF) parameters may include DBF on/off controlling parameter and DBF filter parameters (e.g., indications of beta/Tc offsets, such as pps_beta_offset_div2).

In the following discussion, an SH may be associated with a PH, i.e., the SH is associated with a slice, which is in the picture associated with the PH. An SH may be associated with a PPS, i.e., the SH is associated with a slice, which is in the picture associated with the PPS. A PH may be associated with a PPS, i.e., the PH is associated with a picture, which is associated with the PPS.

In the following discussion, a SPS may be associated with a PPS, i.e., the PPS may refer to the SPS.

1. Regarding the design of deblocking controlling in PPS, PH, and SH for solving the first problem, one or more of the following approaches are disclosed, for example, as in the first set of embodiments:
   a. In one example, whether the operation of deblocking filter is applied or not applied for slices referring to a PPS may be dependent on the deblocking on/off flag of the associated PH (e.g., ph_deblocking_filter_disabled_flag).
      i. For example, whether the operation of deblocking filter is applied or not applied for slices referring to a PPS may be dependent on whether the deblocking is disabled in PPS (e.g., pps_deblocking_filter_disabled_flag is equal to 1) and whether the deblocking is disabled at picture-level (e.g., ph_deblocking_filter_disabled_flag is equal to 1) and whether the deblocking is disabled at slice-level (e.g., slice_deblocking_filter_disabled_flag is equal to 1).

ii. Alternatively, whether the operation of deblocking filter is applied or not applied for slices referring to a PPS may be dependent on whether the deblocking is disabled in PPS (e.g., pps_deblocking_filter_disabled_flag is equal to 1) and whether the deblocking override is disabled at picture-level and slice-level (e.g., deblocking_filter_override_enabled_flag is equal to 0).
iii. Alternatively, whether the operation of deblocking filter is applied or not applied for slices referring to a PPS may be only dependent on whether the deblocking is disabled in PPS (e.g., pps_deblocking_filter_disabled_flag is equal to 1).
b. Additionally, when the slice_deblocking_filter_override_flag is not present, the value of slice_deblocking_filter_override_flag may be independent of ph_deblocking_filter_override_flag (may be inferred to a certain value such as 0).
c. Additionally, alternatively, whether the PH syntax element ph_deblocking_filter_disabled_flag and/or the SH syntax element slice_deblocking_filter_disabled_flag is explicitly signalled or implicitly inferred may be dependent on the value of the PPS/deblocking on/off flag such as pps_deblocking_filter_disabled_flag
d. It is proposed that if the DBF is disabled at a first level (e.g., in PPS), then it is not allowed to be enabled at lower level (e.g., PH/SH).
i. For example, the presence of picture/slice-level DBF on/off controlling parameters in PH/SH may be directly dependent on the value of the DBF on/off flag signalled in PPS (e.g., pps_deblocking_filter_disabled_flag) other than the value of the DBF override flag signalled in PH/SH.
1) For example, when the PPS DBF on/off controlling parameter specifies that the deblocking is disabled for slices referring to the PPS (pps_deblocking_filter_disabled_flag is equal to 1), then the PH/SH DBF on/off controlling parameters may be not signalled.
ii. Additionally, the presence of DBF on/off controlling parameters at PPS/PH/SH may be directly conditioned based on the DBF global control flag (e.g., deblocking_filter_control_present_flag in PPS) that specifies the presence of both the DBF on/off controlling parameters and the DBF filter parameters in PPS, PH, and SH.
1) For example, when the DBF global control flag specifies that neither DBF on/off controlling parameters nor DBF filter parameters is signalled (deblocking_filter_control_present_flag is equal to 0), then the PPS/PH/SH DBF on/off controlling parameters may be not signalled.
iii. Additionally, when the PPS deblocking on/off flag is not present, it may be inferred to be equal to a certain value such as 0 or 1.
iv. Additionally, when the PH deblocking on/off flag is not present, it may be inferred to be equal to the value of the PPS deblocking on/off flag.
v. Additionally, when the SH deblocking on/off flag is not present, it may be inferred to be equal to the value of the PPS/PH deblocking on/off flag.
e. It is proposed that if the DBF is enabled at a first level (e.g., in PH), it can be disabled at a lower level (e.g., SH).
i. For example, for multiple slices in a picture, it is allowed that some of the slices are using deblocking filter, and some of the slices are not using deblocking filter.
ii. For example, the signalling of the DBF on/off controlling flag at SH may be dependent on when the PH DBF on/off controlling flag.
1) For example, when the DBF is enabled for the current picture, then a DBF on/off controlling flag at slice level may be further signalled to specify whether the current slice is using deblocking filter or not.
f. The signalling of the PPS syntax element "dbf_info_in_ph_flag" that specifies whether the DBF on/off controlling parameters and/or DBF filter parameters are present in PH or SH may be independent of other syntax elements such as deblocking_filter_override_enabled_flag.
i. Additionally, alternatively, the signalling of picture/slice level DBF on/off flag in PH/SH may be directly conditioned based on dbf_info_in_ph_flag and/or pps_deblocking_filter_enabled_flag other than the PH/SH DBF override flag.
g. It is proposed that the DBF override flag in PPS/PH/SH is only used for overriding the DBF filter parameters other than the DBF on/off controlling parameters.
i. For example, the DBF on/off controlling flag is firstly signalled, then the DBF override flag is signalled afterwards with conditioning based on the DBF on/off controlling flag at the same level (e.g., PPS/PH/SH).
1) For example, the picture/slice-level DBF on/off controlling parameters may be signalled in PH/SH regardless whether the PH/SH DBF override flag is equal to true.
2) For example, the picture/slice-level DBF on/off controlling parameters may be signalled in PH/SH regardless whether the PPS DBF override flag is equal to true.
3) For example, the DBF override flag is conditionally signalled based on the DBF on/off controlling flag at the same level (e.g., PPS/PH/SH).
a. For example, the signalling of PPS deblocking override enable flag (e.g., deblocking_filter_override_enabled_flag) may be dependent on whether the deblocking is enabled at PPS (e.g., pps_deblocking_filter_disabled_flag in PPS is equal to 0).
i. For example, when the deblocking is disabled in PPS, the PPS syntax element deblocking_filter_override_enabled_flag is not signalled.
b. For example, the signalling of the PH deblocking override flag (e.g., ph_deblocking_filter_override_flag) may be dependent on whether the deblocking is enabled in PH (e.g., ph_deblocking_filter_disabled_flag is equal to 0).
i. For example, when the deblocking is disabled in PH, the PH syntax element ph_deblocking_filter_override_flag is not signalled.
c. For example, the signalling of the SH deblocking override flag (e.g., slice_deblocking_filter_override_flag) may be dependent on whether the deblocking is enabled in SH (e.g., slice_deblocking_filter_disabled_flag is equal to 0).
   i. For example, when the deblocking is disabled in SH, the SH syntax element slice_deblocking_filter_override_flag is not signalled.
   d. Additionally, when the PPS/PH/SH deblocking override flag is not present, it may be inferred to be equal to a certain value (such as 0).
4) For example, the signalling of DBF filter parameters may be directly conditioned on the DBF override flag other than the DBF on/off controlling flag.
   a. For example, the presence of the DBF filter parameters in PH (e.g., ph_beta_offset_div2, ph_tc_offset_div2, ph_cb_beta_offset_div2, ph_cb_tc_offset_div2, ph_cr_beta_offset_div2, ph_cr_tc_offset_div2) may be directly conditioned based on the DBF override flag in PH (e.g., ph_deblocking_filter_override_flag) other than the DBF on/off flag in PH (e.g., ph_deblocking_filter_disabled_flag).
   b. For example, the presence of the DBF filter parameters in SH (e.g., slice_beta_offset_div2, slice_tc_offset_div2, slice_cb_beta_offset_div2, slice_cb_tc_offset_div2, slice_cr_beta_offset_div2, slice_cr_tc_offset_div2) may be directly conditioned based on the DBF override flag in SH (e.g., slice_deblocking_filter_override_flag) other than the DBF on/off flag in SH (e.g., slice_deblocking_filter_disabled_flag).
h. It is proposed that the DBF on/off controlling in PPS/PH/SH may be dependent on DBF "enable" flags other than DBF "disable" flags.
   i. For example, DBF enable flags (e.g., named pps_deblocking_filter_enabled_flag) may be signalled at PPS to specify whether the deblocking is enabled for slices referring to the PPS.
   ii. For example, the PPS DBF enable flag may be signalled independent of other syntax elements such as the DBF global control flag (e.g., deblocking_filter_control_present_flag in PPS).
   iii. For example, if the DBF is disabled at a higher level (e.g., PPS or PH), then the signalling of DBF enabling flags at a lower level (e.g., PH and/or SH) are absent and inferred to be equal to the value of the on/off controlling flag at the higher level (e.g., PPS/PH).
   iv. For example, the DBF global control flag (e.g., deblocking_filter_control_present_flag in PPS) may be only used to control the presence of the DBF override flags at PPS/PH/SH and the DBF filter parameters at PPS/PH/SH.
      1) For example, the DBF global control flag (e.g., deblocking_filter_control_present_flag in PPS) is not used to control the presence of the DBF on/off controlling parameters at PPS/PH/SH.
      2) For example, only if the DBF is enabled in PPS (e.g., pps_deblocking_filter_enabled_flag is equal to 1), the DBF global control flag is signalled.
         a. For example, when DBF is disabled at PPS (e.g., pps_deblocking_filter_enabled_flag is equal to 0), the DBF global control flag is not signalled.
         b. Additionally, deblocking_filter_control_present_flag is inferred to be equal to 0 when the deblocking is disabled in PPS.
      3) For example, the signalling of DBF override enabled/disabled flag in PPS (e.g., deblocking_filter_override_enabled_flag in PPS) may be directly conditioned based on the DBF global control flag other than the DBF on/off flag in PPS.
      4) For example, the signalling of PPS DBF parameters such as beta and tc values may be directly conditioned based on the DBF global control flag other than the DBF on/off flag in PPS.
i. It is proposed to allow overriding either the DBF on/off controlling parameter or the DBF filter parameters, but not both.
   i. In one example, the overriding mechanism may be allowed at PPS/PH/SH.
   ii. In one example, if only the DBF on/off controlling parameter can be override at different levels (e.g., PPS/PH/SH), then following may further apply:
      1) The DBF filter parameters may be signalled only at a first level (e.g., in PPS) and all smaller video units (e.g., picture/slice) are inhering from the parameters associated with the first level, if DBF is enabled for the smaller video unit.
   iii. In one example, if only the DBF filter parameter can be override at different levels (e.g., PPS/PH/SH), then following may further apply:
      1) The DBF on/off controlling parameters may be signalled only at a first level (e.g., in PPS) and all smaller video units (e.g., picture/slice) are inhering from the parameters associated with the first level, if DBF is enabled for the smaller video unit.
j. It is proposed to disallow overriding the DBF on/off controlling parameter in a smaller video unit (e.g., in PH/SH) when the DBF is disabled at a higher level (e.g., in PPS).
   i. Alternatively, furthermore, signalling of DBF on/off controlling parameters at the smaller video unit level (e.g., in PH/SH) may be under the condition check of the DBF on/off controlling parameter at the higher level (e.g., in PPS) being on.
      1) Alternatively, furthermore, when not present at the smaller video unit level, DBF is inferred to be disabled, or enabled, or be equal to the on/off status at the higher video unit level.
k. In PPS, the 'deblocking_filter_control_present_flag' may be removed and a first syntax element which indicates the enabling/disabling DBF, may be directly signalled instead of being controlled by the 'deblocking_filter_control_present_flag'.
   i. Alternatively, furthermore, a second syntax element which tells whether overriding the DBF filter parameters is allowed, may be further signalled according to the first syntax element corresponding to enabling DBF.
      1) Alternatively, furthermore, the DBF filter parameters may be signalled according to the second syntax element telling overriding is allowed.
l. In PPS, the 'deblocking_filter_control_present_flag' may be removed and a first syntax element which tells whether overriding the DBF parameters is allowed, may be directly signalled instead of being controlled by the 'deblocking_filter_control_present_flag'.
  i. Alternatively, furthermore, a second syntax element which tells enabling/disabling DBF, may be further signalled according to the first syntax element corresponding to allowing overriding.
    1) Alternatively, furthermore, the DBF filter parameters may be signalled according to the second syntax element telling DBF is enabled.
m. A syntax element indicating whether the DBF on/off control flag and/or DBF parameters are signalled in PH or SH (e.g. dbf_info_in_ph_flag) may be signalled in PH, instead of PPS.
n. In one example, the DBF on/off control flag and/or DBF parameters may be signalled in both PH and SH.
  i. For example, the DBF on/off control flag and/or DBF parameters signalled in the SH may override those signalled in PH.
o. It is proposed that DBF on/off control flag and/or DBF parameters may be signalled in SPS.
  i. The DBF on/off control flag signalled in SPS may be overridden by a DBF on/off control flag signalled in a low-level video unit, such as PPS, PH or SH.
  ii. The DBF parameters signalled in SPS may be overridden by DBF parameters signalled in a low-level video unit, such as PPS, PH or SH.
p. A syntax with non-binary value (e.g., an indicator other than a flag) may be signalled in a video unit level (e.g., PPS/SPS) to specify the deblocking mode, for example, as in the first set of embodiments such as the embodiment in Subsection 6.1.4 of this document. In one example, an N-bit mode indicator may be signalled at PPS to specify the deblocking filter mode.
  i. For example, N=2.
  ii. For example, a 2-bit mode indicator (e.g., named deblocking_filter_mode_idc) is added to PPS, and with below semantics:
    deblocking_filter_mode_idc equal to 0 specifies that the deblocking filter is not applied for all slices referring to the PPS. deblocking_filter_mode_idc equal to 1 specifies that the deblocking filter is applied for all slices referring to the PPS, using 0-valued deblocking parameter offsets for β and tC. deblocking_filter_mode_idc equal to 2 specifies that the deblocking filter is applied for all slices referring to the PPS, using deblocking parameter offsets for β and tC explicitly signalled in the PPS. deblocking_filter_mode_idc equal to 3 specifies that whether the deblocking filter is applied for a slice referring to the PPS is controlled by parameters present either in the PH or the slice header of the slice.
  iii. Additionally, the signalling of DBF filter parameters in PPS are dependent on the value of the mode indicator.
    a. For example, if the mode indicator meets a certain condition (e.g., larger than a certain value X, such as X=1), then the DBF filter parameters are signalled in PPS. Otherwise, the PPS DBF filter parameters are inferred to be 0.
  iv. Additionally, the signalling of the PPS syntax element "dbf_info_in_ph_flag" that specifies whether the DBF on/off controlling parameters and/or the DBF filter parameters are present in PH or SH may be dependent on the value of the mode indicator.
    a. For example, if the mode indicator meets a certain condition (e.g., equal to a certain value Y, such as Y=3), then the PPS syntax element "dbf_info_in_ph_flag" is signalled.
      i. Additionally, if the PPS syntax element "dbf_info_in_ph_flag" is not signalled, it is inferred to be equal to a certain value (such as 0 or 1).
  v. Additionally, the signalling of the DBF on/off controlling parameters and/or the DBF filter parameters in PH or SH may be dependent on the value of the mode indicator.
    a. For example, if the mode indicator meets a certain condition (e.g., equal to a certain value Y, such as Y=3), then the picture-level DBF on/off controlling flag may be signalled in PH.
    b. For example, if the mode indicator meets a certain condition (e.g., equal to a certain value Y, such as Y=3), then the slice-level DBF on/off controlling flag at SH may be signalled in SH.
q. DBF may be enabled at pic/slice level and use 0-valued beta/tc offsets for the DBF parameters.
  i. In one example, one or more syntax elements (e.g., named explicit_default_deblocking_params_flag) may be signalled in the PPS to specify whether the default DBF parameters have 0-valued beta/tc offsets or explicitly signalled beta/tc offsets, and only in the latter case, the beta/tc offsets are explicitly signalled. The DBF parameters determined by the PPS, and the default DBF parameters may or may not be overridden at the picture or slice level.
  ii. In one example, one or more syntax elements (e.g., named explicit_default_deblocking_params_flag) may be signalled at a video unit level (e.g., SPS/PPS/PH/SH) to specify whether 0-valued beta/tc offsets or explicitly signalled beta/tc offsets are used, and in the latter case, the beta/tc offsets are explicitly signalled.
2. Regarding the handling mechanisms for PROF with affine AMVP and PROF with affine MERGE for solving the second problem, one or more of the following approaches are disclosed, for example, as in the second set of embodiments:
a. For affine MERGE-coded blocks, PROF may be still applied and the prediction block size corresponding to a M*N sub-block (or block) may be larger than M*N, i.e., denoted by (M+M0)*(N+N0) wherein M0 and N0 are not both equal to 0.
  i. In one example, M0 and N0 are set to 2.
b. Whether to use extended samples for generating a PROF prediction block (subblock) and/or how many extended samples are generated for a PROF prediction block (subblock) may be dependent on the prediction refinement utility flag, for example, cbProfFlagLX and X being 0 or 1.
  i. A certain value of prediction block border extension size (such as extended width and/or extended height and/or number of extended samples) may be used, no matter it is a PROF subblock with affine AMVP or a PROF subblock with affine MERGE.

a) For example, for an M×N subblock that applying PROF, with M as the subblock width and N as the subblock height, X (e.g., X=2) extended samples in width and Y (e.g., Y=2) extended samples in height may be used to construct (M+X)×(N+Y) prediction samples for a PROF subblock, no matter it is a PROF subblock with affine AMVP or a PROF subblock with affine MERGE.

ii. Integer samples are used for generating extended samples for PROF prediction, no matter it is a PROF subblock with affine AMVP or a PROF subblock with affine MERGE.

3. Regarding the PH and SH qp delta/offset signalling for solving the third problem, one or more of the following approaches are disclosed:

a. In one example, a first syntax element may be signalled in higher level compared to the PH/SH (e.g., SPS/PPS) to indicate whether luma/chroma delta QP signalling is enabled.

i. In one example, the presence of luma qp delta in PH and/or SH may be dependent on a SPS/PPS luma qp delta present flag (e.g., pps_pic_slice_luma_qp_delta_present_flag), for example, as in the third embodiment.

a) For example, if the SPS/PPS luma qp delta present flag specifies that neither PH luma qp delta nor SH luma qp delta is signalled, then the luma qp delta is required to be not signalled in PH and not signalled in SH.

a. Alternatively, if the SPS/PPS luma qp delta present flag specifies that the PH/SH luma qp delta is not present, then the luma qp delta is required to be not signalled in PH/SH.

b. Additionally, if the PH luma qp delta is not present, it may be inferred to be a certain value (such as 0).

c. Additionally, if the SH luma qp delta is not present, it may be inferred to be a certain value (such as 0 or equal to the PH luma qp delta).

b) Additionally, the presence of PPS switch flag (e.g., qp_delta_info_in_ph_flag) that specifies whether luma qp delta is signalled in PH or SH may be dependent on the above-mentioned SPS/PPS luma qp delta present flag.

a. For example, if the SPS/PPS luma qp delta present flag specifies that neither PH luma qp delta nor SH luma qp delta is signalled, then the PPS switch flag is required to be not signalled.

i. Additionally, if the PPS switch flag is not present, it may be inferred to be equal to a certain value (such as 0).

b. In one example, chroma (such as Cb, Cr, joint CbCr) qp offset may be signalled at a higher level compared to SH (e.g., in PH, e.g., as in the third embodiment).

i. For example, whether to signal chroma qp offset in PH or SH may be dependent on a PPS switch flag (e.g., qp_offset_info_in_ph_flag).

a) For example, if the PPS switch flag specifies that the chroma qp offset is signalled in PH, then the chroma qp offset is not signalled in SH.

a. Alternatively, if the PPS switch flag specifies that the chroma qp offset is not signalled in PH, then the chroma qp offset may be signalled in SH.

b. Additionally, if the PH chroma qp offset is not present, it may be inferred to be a certain value (such as 0).

c. Additionally, if the SH chroma qp offset is not present, it may be inferred to be a certain value (such as 0 or equal to the PH chroma qp offset).

b) In one example, the flag is the same as the flag to control whether luma delta qp is signalled in PH or SH.

ii. Additionally, alternatively, the presence of chroma qp offset in PH and/or SH may be dependent on a SPS/PPS chroma qp offset present flag (e.g., pps_pic_slice_chroma_qp_offset_present_flag).

a) For example, if the SPS/PPS chroma qp offset present flag specifies that neither PH nor SH chroma qp offset is signalled, then chroma qp offset is required to be not signalled in PH and not signalled in SH.

b) Additionally, the presence of PPS switch flag (e.g., qp_offset_info_in_ph_flag) that specifies whether chroma qp offset is signalled in PH or SH may be dependent on the above-mentioned SPS/PPS chroma qp offset present flag.

a. If the SPS/PPS chroma qp offset present flag specifies that neither PH nor SH chroma qp offset is signalled, then the PPS switch flag is required to be not signalled.

i. Additionally, if the PPS switch flag is not present, it may be inferred to be equal to a certain value (such as 0).

iii. Signalling of qp_delta and chroma qp offsets may always in the same header.

a) For example, when qp_delta is signalled in PH, chroma qp offsets should not be signalled in SH.

b) For example, when qp_delta is signalled in SH, chroma qp offsets should not be signalled in PH.

4. Regarding the range of the PH syntax elements ph_cu_qp_delta_subdiv_intra_slice, ph_cu_qp_delta_subdiv_inter_slice, ph_cu_chroma_qp_offset_subdiv_intra_slice, and ph_cu_chroma_qp_offset_subdiv_inter_slice for solving the second problem, one or more of the following approaches are disclosed, for example, as in the fourth embodiment:

a. The range of the maximum cbSubdiv value of coding units in intra slice that convey cu_qp_delta_abs and cu_qp_delta_sign_flag (e.g., ph_cu_qp_delta_subdiv_intra_slice) may be not dependent on ph_max_mtt_hierarchy_depth_intra_slice_luma, e.g., it may be in the range of 0 to 2*(Ctb Log 2SizeY−MinQt Log 2SizeIntraY)+2*(Ctb Log 2SizeY−MinCb Log 2SizeY), inclusive.

i. Alternatively, it may be in the range of 0 to 2*(Ctb Log 2SizeY−MinQt Log 2SizeIntraY)+2*min (ph_max_mtt_hierarchy_depth_intra_slice_luma, Ctb Log 2SizeY−MinCb Log 2SizeY), inclusive.

b. The range of the maximum cbSubdiv value of coding units in intra slice that convey cu_chroma_qp_offset_flag (e.g., ph_cu_chroma_qp_offset_subdiv_intra_slice) may be not dependent on ph_max_mtt_hierarchy_depth_intra_slice_luma, for example, it may be in the range of 0 to 2*(Ctb Log 2SizeY−MinQt Log 2SizeIntraY)+2*(Ctb Log 2SizeY−MinCb Log 2SizeY), inclusive.

i. Alternatively, it may be in the range of 0 to 2*(Ctb Log 2SizeY−MinQt Log 2SizeIntraY)+2*min (ph_max_mtt_hierarchy_depth_intra_slice_luma, Ctb Log 2SizeY−MinCb Log 2SizeY), inclusive.

c. The range of the maximum cbSubdiv value of coding units that in inter slice convey cu_qp_delta_abs and cu_qp_delta_sign_flag (e.g., ph_cu_qp_delta_subdiv_inter_slice) may be not dependent on ph_max_mtt_hierarchy_depth_inter_slice, for example, it may be in the range of 0 to 2*(Ctb Log 2SizeY−MinQt Log 2SizeInterY)+2*(Ctb Log 2SizeY−MinCb Log 2SizeY), inclusive.
  i. Alternatively, it may be in the range of 0 to 2*(Ctb Log 2SizeY−MinQt Log 2SizeIntraY)+2*min (ph_max_mtt_hierarchy_depth_inter_slice, Ctb Log 2SizeY−MinCb Log 2SizeY), inclusive.
d. The range of the maximum cbSubdiv value of coding units in inter slice that convey cu_chroma_qp_offset_flag (e.g., ph_cu_chroma_qp_offset_subdiv_inter_slice) may be not dependent on ph_max_mtt_hierarchy_depth_inter_slice, for example, it may be in the range of 0 to 2*(Ctb Log 2SizeY−MinQt Log 2SizeInterY)+2*(Ctb Log 2SizeY−MinCb Log 2Si zeY), inclusive.
  i. Alternatively, it may be in the range of 0 to 2*(Ctb Log 2SizeY−MinQt Log 2SizeIntraY)+2*min (ph_max_mtt_hierarchy_depth_inter_slice, Ctb Log 2SizeY−MinCb Log 2SizeY), inclusive.

6. EMBODIMENTS

Below are some example embodiments for some of the aspects summarized above in Section 5, which can be applied to the VVC specification. The changed texts are based on the latest VVC text in JVET-Q2001-vD. Most relevant parts that have been added or modified are highlighted in boldface italics, and some of the deleted parts are highlighted in open and close double brackets (e.g., [[ ]]) with deleted text in between the double brackets.

6.1. First Set of Embodiments

This is a set of embodiments for items 1 (from 1.a to 1.o) summarized above in Section 5.

6.1.1. Embodiment of Item 1.a

In one example, the semantics of pps_deblocking_filter_disabled_flag is changed as follows:
  pps_deblocking_filter_disabled_flag equal to 1 specifies that the operation of deblocking filter is not applied for slices referring to the PPS in which ph_deblocking_filter_disabled_flag and slice_deblocking_filter_disabled_flag [[is not present]] are equal to 1.
  pps_deblocking_filter_disabled_flag equal to 0 specifies that the operation of the deblocking filter is applied for slices referring to the PPS in whichph_deblocking_filter_disabled_flag and slice_deblocking_filter_disabled_flag [[is]] are equal to 1 [[not present]]. When not present, the value of pps_deblocking_filter_disabled_flag is inferred to be equal to 0.

6.1.2. Embodiment of Item 1.b

In one example, the semantics of slice_deblocking_filter_override_flag is changed as follows:
  slice_deblocking_filter_override_flag equal to 1 specifies that deblocking parameters are present in the slice header. slice_deblocking_filter_override_flag equal to 0 specifies that deblocking parameters are not present in the slice header. When not present, the value of slice_deblocking_filter_override_flag is inferred to be equal to [[ph_deblocking_filter_override_flag]] 0.

6.1.3. Embodiment of Item 1.c

In one example, the syntax structure picture_header_structure( ) is changed as follows:

|  | Descriptor |
|---|---|
| picture_header_structure( ) { |  |
|   gdr_or_irap_pic_flag | u(1) |
| ... |  |
|   if( deblocking_filter_override_enabled_flag && dbf_info_in_ph_flag ) { |  |
|     ph_deblocking_filter_override_flag | u(1) |
|     if( ph_deblocking_filter_override_flag ) { |  |
|       *if( !pps_deblocking_filter_disabled_flag )* |  |
|       ph_deblocking_filter_disabled_flag | u(1) |
|       if( !ph_deblocking_filter_disabled_flag ) { |  |
|         ph_beta_offset_div2 | se(v) |
|         ph_tc_offset_div2 | se(v) |
|         ph_cb_beta_offset_div2 | se(v) |
|         ph_cb_tc_offset_div2 | se(v) |
|         ph_cr_beta_offset_div2 | se(v) |
|         ph_cr_tc_offset_div2 | se(v) |
|       } |  |
|     } |  |
|   } |  |
| ... |  | ph_deblocking_filter_disabled_flag equal to 1 specifies that the operation of the deblocking filter is not applied for the slices associated with the PH. ph_deblocking_filter_disabled_flag equal to 0 specifies that the operation of the deblocking filter is applied for the slices associated with the PH. When ph_deblocking_filter_disabled_flag is not present and ph_deblocking_filter_override_flag is equal to 1 (in this case pps_deblocking_filter_disabled_flag is equal to 1), it is inferred to be equal to 0. Otherwise, w[[W]]hen ph_deblocking_filter_disabled_flag is not present and ph_deblocking_filter_override_flag is equal to 0, it is inferred to be equal to pps_deblocking_filter_disabled_flag.

And the syntax structure slice_header ( ) is changed as follows:

|  | Descriptor |
|---|---|
| slice_header( ) { |  |
|   picture_header_in_slice_header_flag | u(1) |
| ... |  |
|   if( deblocking_filter_override_enabled_flag && !dbf_info_in_ph_flag ) |  |
|     slice_deblocking_filter_override_flag | u(1) |
|   if( slice_deblocking_filter_override_flag ) { |  |
|     *if(!pps_deblocking_filter_disabled_flag)* |  |
|     slice_deblocking_filter_disabled_flag | u(1) |
|     if( !slice_deblocking_filter_disabled_flag ) { |  |
|       slice_beta_offset_div2 | se(v) |
|       slice_tc_offset_div2 | se(v) |
|       slice_cb_beta_offset_div2 | se(v) |
|       slice_cb_tc_offset_div2 | se(v) |
|       slice_cr_beta_offset_div2 | se(v) |
|       slice_cr_tc_offset_div2 | se(v) |
|     } |  |
|   } |  |
| ... |  | slice_deblocking_filter_override_flag equal to 1 specifies that deblocking parameters are present in the slice header. slice_deblocking_filter_override_flag equal to 0 specifies that deblocking parameters are not present in the slice header. When not present, the value of slice_deblocking_filter_override_flag is inferred to be equal to [[ph_deblocking_filter_override_flag]] 0.

slice_deblocking_filter_disabled_flag equal to 1 specifies that the operation of the deblocking filter is not applied for the current slice. slice_deblocking_filter_disabled_flag equal to 0 specifies that the operation of the deblocking filter is applied for the current slice. When ph_deblocking_filter_disabled_flag is not present and slice_deblocking_filter_override_flag is equal to 1 (in this case pps_deblocking_filter_disabled_flag is equal to 1), it is inferred to be equal to 0. Otherwise, w[[W]]hen slice_deblocking_filter_disabled_flag is not present and slice_deblocking_filter_override_flag is equal to 0, it is inferred to be equal to ph_deblocking_filter_disabled_flag.

6.1.4. Embodiment of Item 1.p

In one example, the syntax structure pic_parameter_set_rbsp( ) is changed as follows:

|  | Descriptor |
|---|---|
| pic_parameter_set_rbsp( ) { |  |
|   pps_pic_parameter_set_id | ue(v) |
| ... |  |
|   [[deblocking_filter_control_present_flag]] *deblocking_filter_mode_idc* | u(1) |
|   if([[deblocking_filter_control_present_flag]] *deblocking_filter_mode_idc > 1* ) { |  |
|     [[deblocking_filter_override_enabled_flag]] | [[u(1)]] |
|     [[pps_deblocking_filter_disabled_flag]] | [[u(1)]] |
|     [[if( !pps_deblocking_filter_disabled_flag ) {]] |  |
|       pps_beta_offset_div2 | se(v) |
|       pps_tc_offset_div2 | se(v) |
|       pps_cb_beta_offset_div2 | se(v) |
|       pps_cb_tc_offset_div2 | se(v) |
|       pps_cr_beta_offset_div2 | se(v) |
|       pps_cr_tc_offset_div2 | se(v) |
|     } |  |
| [[ }]] |  |
| [[   rpl_info_in_ph_flag]] | u(1) |
|   if( [[deblocking_filter_override_enabled_flag]]*deblocking_filter_mode_idc == 3* ) |  |
|     dbf_info_in_ph_flag | u(1) |
|   *rpl_info_in_ph_flag* |  |
| ... |  | deblocking_filter_mode_idc equal to 0 specifies that the deblocking filter is not applied for any slice referring to the PPS. deblocking_filter_mode_idc equal to 1 specifies that the deblocking filter is applied for all slices referring to the PPS, using 0-valued deblocking parameter offsets for β and tC. deblocking_filter_mode_idc equal to 2 specifies that the deblocking filter is applied for all slices referring to the PPS, using deblocking parameter offsets for fi and tC explicitly signalled in the PPS. deblocking_filter_mode_idc equal to 3 specifies that whether the deblocking filter is applied for a slice referring to the PPS is controlled by parameters present either in the PH or the slice header of the slice.

[[deblocking_filter_control_present_flag equal to 1 specifies the presence of deblocking filter control syntax elements in the PPS. deblocking_filter_control_present_flag equal to 0 specifies the absence of deblocking filter control syntax elements in the PPS.]]

[[deblocking_filter_override_enabled_flag equal to 1 specifies the presence of ph_deblocking_filter_override_flag in the PHs referring to the PPS or slice_deblocking_filter_override_flag in the slice headers referring to the PPS. deblocking_filter_override_enabled_flag equal to 0 specifies the absence of ph_deblocking_filter_override_flag in PHs referring to the PPS or slice_deblocking_filter_override_flag in slice headers referring to the PPS. When not present, the value of deblocking_filter_override_enabled_flag is inferred to be equal to 0.]]

[[pps_deblocking_filter_disabled_flag equal to 1 specifies that the operation of deblocking filter is not applied for slices referring to the PPS in which slice_deblocking_filter_disabled_flag is not present. pps_deblocking_filter_disabled_flag equal to 0 specifies that the operation of the deblocking filter is applied for slices referring to the PPS in which slice_deblocking_filter_disabled_flag is not present. When not present, the value of pps_deblocking_filter_disabled_flag is inferred to be equal to 0.]]

dbf_info_in_ph_flag equal to 1 specifies that deblocking filter information is present in the PH syntax structure and not present in slice headers referring to the PPS that do not contain a PH syntax structure. dbf_info_in_ph_flag equal to 0 specifies that deblocking filter information is not present in the PH syntax structure and may be present in slice headers referring to the PPS that do not contain a PH syntax structure. [[When not present, the value of dbf_info_in_ph_flag is inferred to be equal to 0.]]

...

And the syntax structure picture_header_structure( ) is changed as follows:

|  | Descriptor |
|---|---|
| picture_header_structure( ) { |  |
|   gdr_or_irap_pic_flag | u(1) |
| ... |  |
|   if( [[deblocking_filter_override_enabled_flag]] *deblocking_filter_mode_idc == 3* == 3 && dbf_info_in_ph_flag) { |  |
|     ph_deblocking_filter_[[override]]*used*_flag | u(1) |
|     if( ph_deblocking_filter_[[override]]*used*_flag ) { |  |
|       ph_deblocking_[[filter_disabled]] *parameters_override*_flag | u(1) |
|       if( [[!]]ph_deblocking_[[filter_disabled]] *parameters_override*_flag ) { |  |
|         ph_beta_offset_div2 | se(v) |
|         ph_tc_offset_div2 | se(v) |
|         ph_cb_beta_offset_div2 | se(v) |
|         ph_cb_tc_offset_div2 | se(v) |
|         ph_cr_beta_offset_div2 | se(v) |
|         ph_cr_tc_offset_div2 | se(v) |
|       } |  |
|     } |  |
|   } |  |
| ... |  | ph_deblocking_filter_used_flag equal to 1 specifies that the deblocking filter is applied for the slices in the current picture. ph_deblocking_filter_used_flag equal to 0 specifies that the deblocking filter is not applied for the slices in the current picture. When not present, the value of ph_deblocking_filter_used_flag is inferred to be equal to (deblocking_filter_mode_idc>0).

ph_deblocking_[[filter]]parameters_override_flag equal to 1 specifies that deblocking parameters are present in the PH. ph_deblocking_[[filter]]parameters_override_flag equal to 0 specifies that deblocking parameters are not present in the PH. [[When not present, the value of ph_deblocking_filter_override_flag is inferred to be equal to 0.]]

[[ph_deblocking_filter_disabled_flag equal to 1 specifies that the operation of the deblocking filter is not applied for the slices associated with the PH. ph_deblocking_filter_disabled_flag equal to 0 specifies that the operation of the deblocking filter is applied for the slices associated with the PH. When ph_deblocking_filter_disabled_flag is not present, it is inferred to be equal to pps_deblocking_filter_disabled_flag.]]

. . .

And the syntax structure slice_header( ) is changed as follows:

|  | Descriptor |
|---|---|
| slice_header( ) { |  |
|   picture_header_in_slice_header_flag | u(1) |
| ... |  |
|   if( [[deblocking_filter_override_enabled_flag]] |  |
|   *deblocking_filter_mode_idc == 3* && !dbf_info_in_ph_flag ) |  |
|   { |  |
|     slice_deblocking_filter_[[override]]*used*_flag | u(1) |
|     if( slice_deblocking_filter_[[override]]*used*_flag ) { |  |
|       slice_deblocking_[[filter_disabled]] | u(1) |
|       *parameters_override*_flag |  |
|       if( |  |
|     [[!]]slice_deblocking_[[filter_disabled]] |  |
|     *parameters_override*_flag ) { |  |
|       slice_beta_offset_div2 | se(v) |
|       slice_tc_offset_div2 | se(v) |
|       slice_cb_beta_offset_div2 | se(v) |
|       slice_cb_tc_offset_div2 | se(v) |
|       slice_cr_beta_offset_div2 | se(v) |
|       slice_cr_tc_offset_div2 | se(v) |
|     } |  |
|   } |  |
| } |  |
| ... |  | slice_deblocking_filter_used_flag equal to 1 specifies that the deblocking filter is applied for the current slice, slice_deblocking_filter_used_flag equal to 0 specifies that the deblocking filter is not applied for the current slice. When not present, the value of slice_deblocking_filter_used_flag is inferred to be equal to ph_deblocking_filter_used_flag.

slice_deblocking_[[filter]]parameters_override_flag equal to 1 specifies that deblocking parameters are present in the slice header. slice_deblocking_[[filter]]parameters_override_flag equal to 0 specifies that deblocking parameters are not present in the slice header. [[When not present, the value of slice_deblocking_filter_override_flag is inferred to be equal to ph_deblocking_filter_override_flag.]]

[[slice_deblocking_filter_disabled_flag equal to 1 specifies that the operation of the deblocking filter is not applied for the current slice. slice_deblocking_filter_disabled_flag equal to 0 specifies that the operation of the deblocking filter is applied for the current slice. When slice_deblocking_filter_disabled_flag is not present, it is inferred to be equal to ph_deblocking_filter_disabled_flag.]]

. . .

And the decoding process of deblocking filter process is changed as follows:

8.8.3 Deblocking Filter Process

8.8.3.1 General

The deblocking filter process is applied to all coding subblock edges and transform block edges of a picture, except the following types of edges:
- Edges that are at the boundary of the picture,
- Edges that coincide with the boundaries of a subpicture with subpicture index subpicIdx and loop_filter_across_subpic_enabled_flag[subpicIdx] is equal to 0,
- Edges that coincide with the virtual boundaries of the picture when VirtualBoundariesPresentFlag is equal to 1,
- Edges that coincide with tile boundaries when loop_filter_across_tiles_enabled_flag is equal to 0,
- Edges that coincide with slice boundaries when loop_filter_across_slices_enabled_flag is equal to 0,
- Edges that coincide with upper or left boundaries of slices with slice_deblocking_filter_used[[disabled]]_flag equal to [[1]]0,
- Edges within slices with slice_deblocking_filter_used[[disabled]]_flag equal to [[1]]0,
- Edges that do not correspond to 4×4 sample grid boundaries of the luma component,
- Edges that do not correspond to 8×8 sample grid boundaries of the chroma component,
- Edges within the luma component for which both sides of the edge have intra_bdpcm_luma_flag equal to 1,
- Edges within the chroma components for which both sides of the edge have intra_bdpcm_chroma_flag equal to 1,
- Edges of chroma subblocks that are not edges of the associated transform unit.

The edge type, vertical or horizontal, is represented by the variable edgeType as specified in Table 42.

TABLE 42

| Name of association to edgeType | |
|---|---|
| edgeType | Name of edgeType |
| 0 (vertical edge) | EDGE_VER |
| 1 (horizontal edge) | EDGE_HOR |

When slice_deblocking_filter_used[[disabled]]_flag of the current slice is equal to [[0]]1, the following applies:
- The variable treeType is set equal to DUAL_TREE_LUMA.
- The vertical edges are filtered by invoking the deblocking filter process for one direction as specified in clause 8.8.3.2 with the variable treeType, the reconstructed picture prior to deblocking, i.e., the array recPicture$_L$ and the variable edgeType set equal to EDGE_VER as inputs, and the modified reconstructed picture after deblocking, i.e., the array recPicture$_L$ as outputs.
- The horizontal edge are filtered by invoking the deblocking filter process for one direction as specified in clause 8.8.3.2 with the variable treeType, the modified reconstructed picture after deblocking, i.e., the array recPicture$_L$ and the variable edgeType set equal to EDGE_HOR as inputs, and the modified reconstructed picture after deblocking, i.e., the array recPicture$_L$ as outputs.

When ChromaArrayType is not equal to 0, the following applies:
- The variable treeType is set equal to DUAL_TREE_CHROMA The vertical edges are filtered by invoking the deblocking filter process for one direction as specified in clause 8.8.3.2 with the variable treeType, the reconstructed picture prior to deblocking, i.e., the arrays recPicture$_{Cb}$ and recPicture$_{Cr}$, and the variable edgeType set equal to EDGE_VER as inputs, and the modified reconstructed picture after deblocking, i.e., the arrays recPicture$_{Cb}$ and recPicture$_{Cr}$ as outputs.

The horizontal edge are filtered by invoking the deblocking filter process for one direction as specified in clause 8.8.3.2 with the variable treeType, the modified reconstructed picture after deblocking, i.e., the arrays recPicture$_{Cb}$ and recPicture$_{Cr}$, and the variable edgeType set equal to EDGE_HOR as inputs, and the modified reconstructed picture after deblocking, i.e., the arrays recPicture$_{Cb}$ and recPicture$_{Cr}$ as outputs.

6.1.5. Embodiment of Items 1.d, 1.g, 1.j, and 1.f

In one example, the syntax structure pic_parameter_set_rbsp( ) is changed as follows:

|  | Descriptor |
| --- | --- |
| pic_parameter_set_rbsp( ) { |  |
|   pps_pic_parameter_set_id | ue(v) |
|   ... |  |
|   deblocking_filter_control_present_flag | u(1) |
|   if( deblocking_filter_control_present_flag ) { |  |
|     [[deblocking_filter_override_enabled_flag]] | [[u(1)]] |
|     pps_deblocking_filter_disabled_flag | u(1) |
|     if( !pps_deblocking_filter_disabled_flag ) { |  |
|       pps_beta_offset_div2 | se(v) |
|       pps_tc_offset_div2 | se(v) |
|       pps_cb_beta_offset_div2 | se(v) |
|       pps_cb_tc_offset_div2 | se(v) |
|       pps_cr_beta_offset_div2 | se(v) |
|       pps_cr_tc_offset_div2 | se(v) |
|       *deblocking_filter_override_enabled_flag* |  |
|     } |  |
|   } |  |
|   rpl_info_in_ph_flag | u(1) |
|   [[if( deblocking_filter_override_enabled_flag )]] |  |
|   dbf_info_in_ph_flag | u(1) | deblocking_filter_override_enabled_flag equal to 1 specifies the presence of ph_deblocking_filter_override_flag in the PHs referring to the PPS or slice_deblocking_filter_override_flag in the slice headers referring to the PPS. deblocking_filter_override_enabled_flag equal to 0 specifies the absence of ph_deblocking_filter_override_flag in PHs referring to the PPS [[or]] and slice_deblocking_filter_override_flag in slice headers referring to the PPS. When not present, the value of deblocking_filter_override_enabled_flag is inferred to be equal to 0.

pps_deblocking_filter_disabled_flag equal to 1 specifies that the operation of deblocking filter is not applied for slices referring to the PPS [[in which slice_deblocking_filter_disabled_flag is not present]]. pps_deblocking_filter_disabled_flag equal to 0 specifies that the operation of the deblocking filter is applied for slices referring to the PPS [[in which slice_deblocking_filter_disabled_flag is not present]]. When not present, the value of pps_deblocking_filter_disabled_flag is inferred to be equal to 0.

And the syntax structure picture_header_structure( ) is changed as follows:

|  | Descriptor |
| --- | --- |
| picture_header_structure( ) { |  |
|   gdr_or_irap_pic_flag | u(1) |
|   ... |  |
|   if( deblocking_filter_[[override_enabled]] *control_present* _flag |  |
|   && dbf_info_in_ph_flag |  |
|   *&& !pps_deblocking_filter_disabled_flag*) { |  |
|     ph_deblocking_filter_[[override]]*disabled* _flag | u(1) |
|     if(!ph_deblocking_filter_[[override]]*disabled* _flag && |  |
|     *deblocking_filter_override_enabled_flag* ) { |  |
|       ph_deblocking_filter_[[disabled]]*override* _flag | u(1) |
|       if( !ph_deblocking_filter_[[disabled]]*override* _flag ) { |  |
|         ph_beta_offset_div2 | se(v) |
|         ph_tc_offset_div2 | se(v) |
|         ph_cb_beta_offset_div2 | se(v) |
|         ph_cb_tc_offset_div2 | se(v) |
|         ph_cr_beta_offset_div2 | se(v) |
|         ph_cr_tc_offset_div2 | se(v) |
|       } |  |
|     } |  |
|   } |  |

And the syntax structure slice_header( ) is changed as follows:

|  | Descriptor |
| --- | --- |
| slice_header( ) { |  |
|   picture_header_in_slice_header_flag | u(1) |
|   ... |  |
|   if( deblocking_filter_[[override_enabled]] *control_present* _flag && |  |
|   !dbf_info_in_ph_flag |  |
|   *&& !pps_deblocking_filter_disable_flag* ) { |  |
|     slice_deblocking_filter_[[override]]*disabled* _flag | u(1) |
|     if( !slice_deblocking_filter_[[override]]*disabled* _flag |  |
|     && |  |
|   *deblocking_filter_override_enabled_flag* ) { |  |
|     slice_deblocking_filter_[[disabled]] *override* _flag | u(1) |
|     if( !slice_deblocking_filter_[[disabled]] *override* _flag ) { |  |
|       slice_beta_offset_div2 | se(v) |
|       slice_tc_offset_div2 | se(v) |
|       slice_cb_beta_offset_div2 | se(v) |
|       slice_cb_tc_offset_div2 | se(v) |
|       slice_cr_beta_offset_div2 | se(v) |
|       slice_cr_tc_offset_div2 | se(v) |
|     } |  |
|   } |  |
| } |  | slice_deblocking_filter_override_flag equal to 1 specifies that deblocking parameters are present in the slice header. slice_deblocking_filter_override_flag equal to 0 specifies that deblocking parameters are not present in the slice header. When not present, the value of slice_deblocking_filter_override_flag is inferred to be equal to [[ph_deblocking_filter_override_flag]]0.

6.1.6. Another Embodiment of Items 1.d, 1.g, 1.j, 1.e, and 1.n

In one example, the syntax structure pic_parameter_set_rbsp( ) is changed as follows:

|  | Descriptor |
| --- | --- |
| pic_parameter_set_rbsp( ) { |  |
|   pps_pic_parameter_set_id | ue(v) |
|   ... |  |
|   deblocking_filter_control_present_flag | u(1) |

-continued

| | Descriptor |
|---|---|
| if( deblocking_filter_control_present_flag ) { | |
|   [[deblocking_filter_override_enabled_flag]] | [[u(1)]] |
|   pps_deblocking_filter_disabled_flag | u(1) |
|   if( !pps_deblocking_filter_disabled_flag ) { | |
|     pps_beta_offset_div2 | se(v) |
|     pps_tc_offset_div2 | se(v) |
|     pps_cb_beta_offset_div2 | se(v) |
|     pps_cb_tc_offset_div2 | se(v) |
|     pps_cr_beta_offset_div2 | se(v) |
|     pps_cr_tc_offset_div2 | se(v) |
|     *deblocking_filter_override_enabled_flag* | *u(1)* |
|   } | |
| } | |
| rpl_info_in_ph_flag | u(1) |
| if( deblocking_filter_override_enabled_flag ) | |
|   dbf_info_in_ph_flag | u(1) | deblocking_filter_override_enabled_flag equal to 1 specifies the presence of ph_deblocking_filter_override_flag in the PHs referring to the PPS or slice_deblocking_filter_override_flag in the slice headers referring to the PPS. deblocking_filter_override_enabled_flag equal to 0 specifies the absence of ph_deblocking_filter_override_flag in PHs referring to the PPS [[or]] and slice_deblocking_filter_override_flag in slice headers referring to the PPS. When not present, the value of deblocking_filter_override_enabled_flag is inferred to be equal to 0.

pps_deblocking_filter_disabled_flag equal to 1 specifies that the operation of deblocking filter is not applied for slices referring to the PPS [[in which slice_deblocking_filter_disabled_flag is not present]]. pps_deblocking_filter_disabled_flag equal to 0 specifies that the operation of the deblocking filter is applied for slices referring to the PPS [[in which slice_deblocking_filter_disabled_flag is not present]]. When not present, the value of pps_deblocking_filter_disabled_flag is inferred to be equal to 0.

And the syntax structure picture_header_structure( ) is changed as follows:

| | Descriptor |
|---|---|
| picture_header_structure( ) { | |
|   gdr_or_irap_pic_flag | u(1) |
| ... | |
|   if( *!pps* _deblocking_filter_[[override_enabled]] *disabled* _flag | |
| && [[dbf_info_in_ph_flag]] | |
| *deblocking_filter_control_present_flag* ) { | |
|     ph_deblocking_filter_[[override]]*disabled* _flag | u(1) |
|     if( *!* ph_deblocking_filter_[[override]]*disabled* _flag | |
| &&  | |
| *dbf_info_in_ph_flag* ) { | |
|     ph_deblocking_filter_[[disabled]] *override* _flag | u(1) |
|     if( [[!]]ph_deblocking_filter_[[disabled]] *override* _flag ) | |
| { | |
|       ph_beta_offset_div2 | se(v) |
|       ph_tc_offset_div2 | se(v) |
|       ph_cb_beta_offset_div2 | se(v) |
|       ph_cb_tc_offset_div2 | se(v) |
|       ph_cr_beta_offset_div2 | se(v) |
|       ph_cr_tc_offset_div2 | se(v) |
|     } | |
|   } | |
| } | |

And the syntax structure slice_header( ) is changed as follows:

| | Descriptor |
|---|---|
| slice_header( ) { | |
|   picture_header_in_slice_header_flag | u(1) |
| ... | |
|   if(*!pps*_deblocking_filter_[[override_enabled]]*disabled*_flag && [[!dbf_info_in_ph_flag]] *deblocking_filter_control_present_flag* && *!ph_deblocking_filter_disable_flag* ) | |
|     slice_deblocking_filter_[[override]]*disabled*_flag | u(1) |
|     if( !slice_deblocking_filter_[[override]]*disabled*_flag && *!dbf_info_in_ph_flag&& deblocking_filter_override_enabled_flag* ) | |
| { | |
|     slice_deblocking_filter_[[disabled]] *override* _flag | u(1) |
|     if( !slice_deblocking_filter_[[disabled]] *override* _flag ) { | |
|       slice_beta_offset_div2 | se(v) |
|       slice_tc_offset_div2 | se(v) |
|       slice_cb_beta_offset_div2 | se(v) |
|       slice_cb_tc_offset_div2 | se(v) |
|       slice_cr_beta_offset_div2 | se(v) |
|       slice_cr_tc_offset_div2 | se(v) |
|     } | |
|   } | |
| } | | slice_deblocking_filter_override_flag equal to 1 specifies that deblocking parameters are present in the slice header. slice_deblocking_filter_override_flag equal to 0 specifies that deblocking parameters are not present in the slice header. When not present, the value of slice_deblocking_filter_override_flag is inferred to be equal to [[ph_deblocking_filter_override_flag]] 0.

6.1.7. Another Embodiment of Items 1.d, 1.g, 1.j, 1.f, 1.h, and 1.k

In one example, the syntax structure pic_parameter_set_rbsp( ) is changed as follows:

| | Descriptor |
|---|---|
| pic_parameter_set_rbsp( ) { | |
|   pps_pic_parameter_set_id | ue(v) |
| ... | |
|   pps_weighted_pred_flag | u(1) |
|   pps_weighted_bipred_flag | u(1) |
|   *pps_deblocking_filter_override_enabled_flag* | |
|   *if( pps_deblocking_filter_override_enabled_flag )* | |
|     deblocking_filter_control_present_flag | u(1) |
|   if( deblocking_filter_control_present_flag ) { | |
|     deblocking_filter_override_enabled_flag | u(1) |
|     [[pps_deblocking_filter_disabled_flag]] | |
|   [[ if( !pps_deblocking_filter_disabled_flag ) {]] | |
|     pps_beta_offset_div2 | se(v) |
|     pps_tc_offset_div2 | se(v) |
|     pps_cb_beta_offset_div2 | se(v) |
|     pps_cb_tc_offset_div2 | se(v) |
|     pps_cr_beta_offset_div2 | se(v) |
|     pps_cr_tc_offset_div2 | se(v) |
|     [[}]] | |
|   } | |
|   rpl_info_in_ph_flag | u(1) |
|   [[if( deblocking_filter_override_enabled_flag )]] | |
|   dbf_info_in_ph_flag | u(1) | pps_deblocking_filter_enabled_flag equal to 0 specifies that the operation of deblocking filter is not applied for slices referring to the PPS. pps_deblocking_filter_enabled_flag equal to specifies that the operation of the deblocking filter is applied for slices referring to the PPS.

deblocking_filter_control_present_flag equal to 1 specifies the presence of deblocking filter control syntax elements in the PPS. deblocking_filter_control_present_flag equal to 0 specifies the absence of deblocking filter control syntax elements in the PPS. When sps_dbf_enabled_flag is equal to 0, the value of deblocking_filter_control_present_flag is required to be equal to 0. [[pps_deblocking_filter_disabled_flag equal to 1 specifies that the operation of deblocking filter is not applied for slices referring to the PPS in which slice_deblocking_filter_disabled_flag is not present. pps_deblocking_filter_disabled_flag equal to 0 specifies that the operation of the deblocking filter is applied for slices referring to the PPS in which slice_deblocking_filter_disabled_flag is not present. When not present, the value of pps_deblocking_filter_disabled_flag is inferred to be equal to 0.]]
And the syntax structure picture_header_structure( ) is changed as follows:

| | Descriptor |
|---|---|
| picture_header_structure( ) { | |
|   gdr_or_irap_pic_flag | u(1) |
| ... | |
|   if( *pps*_deblocking_filter_[[override]]*enabled*_enabled_flag && dbf_info_in_ph_flag) { | |
|     ph_deblocking_filter_[[override]]*enabled*_flag | u(1) |
|     if( ph_deblocking_filter_[[override]]*enabled*_flag && *deblocking_filter_override_enabled_flag* ) { | |
|       ph_deblocking_filter_[[disabled]]*override*_flag | u(1) |
|       if( !ph_deblocking_filter_[[disabled]]*override*_flag ) { | |
|         ph_beta_offset_div2 | se(v) |
|         ph_tc_offset_div2 | se(v) |
|         ph_cb_beta_offset_div2 | se(v) |
|         ph_cb_tc_offset_div2 | se(v) |
|         ph_cr_beta_offset_div2 | se(v) |
|         ph_cr_tc_offset_div2 | se(v) |
|       } | |
|     } | |
|   } | |
| } | | ph_deblocking_filter_[[disabled]]enabled_flag equal to [[1]] 0 specifies that the operation of the deblocking filter is not applied for the slices associated with the PH. ph_deblocking_filter_[[disabled]]enabled_flag equal to [[0]] 1 specifies that the operation of the deblocking filter is applied for the slices associated with the PH. When ph_deblocking_filter_[[disabled]]enabled_flag is not present, it is inferred to be equal to pps_deblocking_filter_[[disabled]]enabled_flag.
And the syntax structure slice_header( ) is changed as follows:

| | Descriptor |
|---|---|
| slice_header( ) { | |
|   picture_header_in_slice_header_flag | u(1) |
| ... | |
|   if( *pps*_deblocking_filter_[[override]]*enabled*_enabled_flag && !dbf_info_in_ph_flag) { | |
|     slice_deblocking_filter_[[override]]*enabled*_flag | u(1) |
|     if( slice_deblocking_filter_[[override]]*enabled*_flag && *deblocking_filter_override_enabled_flag* ) { | |
|       slice_deblocking_filter_[[disabled]]*override*_flag | u(1) |
|       if( !slice_deblocking_filter_[[disabled]]*override*_flag ) { | |
|         slice_beta_offset_div2 | se(v) |
|         slice_tc_offset_div2 | se(v) |
|         slice_cb_beta_offset_div2 | se(v) |
|         slice_cb_tc_offset_div2 | se(v) |
|         slice_cr_beta_offset_div2 | se(v) |
|         slice_cr_tc_offset_div2 | se(v) |
|       } | |
|     } | |
|   } | |
| } | | slice_deblocking_filter_override_flag equal to 1 specifies that deblocking parameters are present in the slice header. slice_deblocking_filter_override_flag equal to 0 specifies that deblocking parameters are not present in the slice header. When not present, the value of slice_deblocking_filter_override_flag is inferred to be equal to [[ph_deblocking_filter_override_flag]] 0.

slice_deblocking_filter_[[disabled]]enabled_flag equal to [[1]] 0 specifies that the operation of the deblocking filter is not applied for the current slice. slice_deblocking_filter_[[disabled]]enabled_flag equal to [[0]] 1 specifies that the operation of the deblocking filter is applied for the current slice. When slice_deblocking_filter_[[disabled]]enabled_flag is not present, it is inferred to be equal to [[pps]]ph_deblocking_filter_[[disabled]]enabled_flag.

6.2. Second Set of Embodiments

This is a set of embodiments for items 2, 2.a, and 2.b summarized above in Section 5.

8.5.6.3 Fractional Sample Interpolation Process

8.5.6.3.1 General

Inputs to this process are:
a luma location (xSb, ySb) specifying the top-left sample of the current coding subblock relative to the top-left luma sample of the current picture,
a variable sbWidth specifying the width of the current coding subblock,
a variable sbHeight specifying the height of the current coding subblock,
a motion vector offset mvOffset,
a refined motion vector refMvLX,
the selected reference picture sample array refPicLX,
the half sample interpolation filter index hpelIfIdx,
the prediction refinement utilization flag cbProfFlagLX,
the decoder-side motion vector refinement flag dmvrFlag,
the bi-directional optical flow flag bdofFlag,
a variable refPicIsScaled indicating whether the selected reference picture requires scaling,
a variable cIdx specifying the colour component index of the current block,
a list of two scaling ratios, horizontal and vertical, scalingRatio.
Outputs of this process are:
an (sbWidth+brdExtSize)×(sbHeight+brdExtSize) array predSamplesLX of prediction sample values.
The prediction block border extension size brdExtSize is derived as follows:

$$brdExtSize=(bdofFlag[[(inter\_affine\_flag[xSb][ySb]\\ \&\& \;!ph\_disable\_prof\_flag)]]cbProfFlagLX)?2:0 \quad (934)$$

The variable refWraparoundEnabledFlag is set equal to (pps_ref_wraparound_enabled_flag && !refPicIsScaled).

The variable fRefLeftOffset is set equal to ((SubWidthC*scaling_win_left_offset)<<10), where scaling_win_left_offset is the scaling_win_left_offset for the reference picture.
The variable fRefTopOffset is set equal to ((SubWidthC*scaling_win_top_offset)<<10), where scaling_win_top_offset is the scaling_win_top_offset for the reference picture.
The (sbWidth+brdExtSize)×(sbHeight+brdExtSize) array predSamplesLX of prediction sample values is derived as follows:

The motion vector mvLX is set equal to (refMvLX−mvOffset).
If cIdx is equal to 0, the following applies:
Let ($xInt_L$, $yInt_L$) be a luma location given in full-sample units and ($xFrac_L$, $yFrac_L$) be an offset given in 1/16-sample units. These variables are used only in this clause for specifying fractional-sample locations inside the reference sample arrays refPicLX.
The top-left coordinate of the bounding block for reference sample padding ($xSbInt_L$, $ySbInt_L$) is set equal to (xSb+(mvLX[0]>>4),ySb+(mvLX[1]>>4)).
For each luma sample location ($x_L$=0 . . . sbWidth−1+brdExtSize, $y_L$=0 . . . sbHeight−1+brdExtSize) inside the prediction luma sample array predSamplesLX, the corresponding prediction luma sample value predSamplesLX[$x_L$][$y_L$] is derived as follows:
Let ($refxSb_L$, $refySb_L$) and ($refx_L$, $refy_L$) be luma locations pointed to by a motion vector (refMvLX[0], refMvLX[1]) given in 1/16-sample units. The variables $refxSb_L$, $refx_L$, $refySb_L$, and $refy_L$ are derived as follows:

$$refxSb_L=(((xSb-(SubWidthC*scaling\_win\_left\_offset))<<4)+refMvLX[0])*scalingRatio[0] \quad (935)$$

$$refx_L=((Sign(refxSb_L)*((Abs(refxSb_L)+128)>>8)+x_L*((scalingRatio[0]+8)>>4))+fRefLeftOffset+32)>>6 \quad (936)$$

$$refySb_L=(((ySb-(SubWidthC*scaling\_win\_top\_offset))<<4)+refMvLX[1])*scalingRatio[1] \quad (937)$$

$$refy_L=((Sign(refySb_L)*((Abs(refySb_L)+128)>>8)+y_L*((scalingRatio[1]+8)>>4))+fRefTopOffset+32)>>6 \quad (938)$$

The variables $xInt_L$, $yInt_L$, $xFrac_L$ and $yFrac_L$ are derived as follows:

$$xInt_L=refx_L>>4 \quad (939)$$

$$yInt_L=refy_L>>4 \quad (940)$$

$$xFrac_L=refx_L\&15 \quad (941)$$

$$yFrac_L=refy_L\&15 \quad (942)$$

The prediction luma sample value predSamplesLX[$x_L$][$y_L$] is derived as follows:
If bdofFlag is equal to TRUE or [[(ph_disable_prof_flag is equal to FALSE and inter_affine_flag[xSb][ySb]]] cbProfFlagLX is equal to TRUE [[)]], and one or more of the following conditions are true, the prediction luma sample value predSamplesLX[$x_L$][$y_L$] is derived by invoking the luma integer sample fetching process as specified in clause 8.5.6.3.3 with ($xInt_L$+($xFrac_L$>>3)−1), $yInt_L$+($yFrac_L$>>3)−1), refPicLX, and refWraparoundEnabledFlag as inputs.
$x_L$ is equal to 0.
$x_L$ is equal to sbWidth+1.
$y_L$ is equal to 0.
$y_L$ is equal to sbHeight+1.
Otherwise, the prediction luma sample value predSamplesLX[$x_L$][$y_L$] is derived by invoking the luma sample 8-tap interpolation filtering process as specified in clause 8.5.6.3.2 with (xIntL−(brdExtSize>0? 1:0), yIntL−(brdExtSize>0? 1:0)), (xFracL, yFracL), ($xSbInt_L$, $ySbInt_L$), refPicLX, hpelIfIdx, sbWidth, sbHeight, dmvrFlag, refWraparoundEnabledFlag, scalingRatio[0], scalingRatio[1], and (xSb, ySb) as inputs.
Otherwise (cdx is not equal to 0), the following applies:
. . .

6.3. Third Set of Embodiments

This is a set of embodiments for items 3, 3.a, 3.b and 3.c summarized above in Section 5.

6.3.1. Embodiment of Item 3.a

In one example, the syntax structure pic_parameter_set_rbspo is changed as follows:

| | Descriptor |
|---|---|
| pic_parameter_set_rbsp( ) { | |
|   pps_pic_parameter_set_id | ue(v) |
|   ... | u(4) |
|   init_qp_minus26 | se(v) |
|   cu_qp_delta_enabled_flag | u(1) |
|   pps_pic_slice_luma_qp_delta_present_flag | u(1) |
|   pps_chroma_tool_offsets_present_flag | u(1) |
|   init_qp_minus26 | se(v) |
|   cu_qp_delta_enabled_flag | u(1) |
|   ... | |
|   if( pps_pic_slice_luma_qp_delta_present_flag ) | |
|     qp_delta_info_in_ph_flag | u(1) |
|   pps_ref_wraparound_enabled_flag | u(1) | pps_pic_slice_luma_qp_delta_present_flag equal to 1 specifies the presence of ph_qp_delta in the PHs referring to the PPS or slice_qp_delta syntax elements in the slice headers referring to the PPS. pps_pic_slice_luma_qp_delta_present_flag equal to 0 specifies the absence of ph_qp_delta in the PHs referring to the PPS and slice_qp_delta syntax elements in the slice headers referring to the PPS.
And the syntax structure picture_header_structure( ) is changed as follows:

| | Descriptor |
|---|---|
| picture_header_structure( ) { | |
|   gdr_or_irap_pic_flag | u(1) |
|   ... | |
|   if( pps_pic_slice_luma_qp_delta_present_flag && qp_delta_info_in_ph_flag ) | |
|     ph_qp_delta | se(v) |
|   ... | |

And the syntax structure slice_header ( ) is changed as follows:

6.3.2. Embodiment of Item 3.b

In one example, the syntax structure pic_parameter_set_rbsp( ) is changed as follows:

| | Descriptor |
|---|---|
| pic_parameter_set_rbsp( ) { | |
|    pps_pic_parameter_set_id | ue(v) |
|    ... | u(4) |
|    pps_chroma_tool_offsets_present_flag | u(1) |
|    if( pps_chroma_tool_offsets_present_flag ) { | |
|       pps_cb_qp_offset | se(v) |
|       pps_cr_qp_offset | se(v) |
|       pps_joint_cbcr_qp_offset_present_flag | u(1) |
|       if( pps_joint_cbcr_qp_offset_present_flag ) | |
|          pps_joint_cbcr_qp_offset_value | se(v) |
|       pps_*pic*_slice_chroma_qp_offsets_present_flag | u(1) |
|       pps_cu_chroma_qp_offset_list_enabled_flag | u(1) |
|    } | |
|    ... | |
|    qp_delta_info_in_ph_flag | u(1) |
|    if( pps_pic_slice_chroma_qp_offsets_present_flag ) | |
|       qp_offset_info_in_ph_flag | u(1) |
|    pps_ref_wraparound_enabled_flag | u(1) | pps_pic_slice_chroma_qp_offsets_present_flag equal to 1 specifies that the ph_cb_qp_offset and ph_cr_qp_offset syntax elements are present in the associated picture headers, or, the slice_cb_qp_offset and slice_cr_qp_offset syntax elements are present in the associated slice headers. pps_slice_chroma_qp_offsets_present_flag equal to 0 specifies that the ph_cb_qp_offset and ph_cr_qp_offset syntax elements are not present in the associated picture headers, and, slice_cb_qp_offset and slice_cr_qp_offset syntax elements are not present in the associated slice headers. When not present, the value of pps_slice_chroma_qp_offsets_present_flag is inferred to be equal to 0.

qp_offset_info_in_ph_flag equal to specifies that QP offset information is present in the PH syntax structure and not present in slice headers referring to the PPS that do not contain a PH syntax structure. qp_offset_info_in_ph_flag equal to 0 specifies that QP offset information is not present in the PH syntax structure and may be present in slice headers referring to the PPS that do not contain a PH syntax structure.

And the syntax structure picture_header_structure( ) is changed as follows:

| | Descriptor |
|---|---|
| picture_header_structure( ) { | |
|    gdr_or_irap_pic_flag | u(1) |
|    ... | |
|    ph_qp_delta | se(v) |
|    if( pps_pic_slice_chroma_qp_offsets_present_flag && | |
|    qp_offset_info_in_ph_flag ) { | |
|       ph_cb_qp_offset | se(v) |
|       ph_cr_qp_offset | se(v) |
|       if( sps_joint_cbcr_enabled_flag ) | |
|          ph_joint_cbcr_qp_offset | se(v) |
|    } | |
|    if( sps_joint_cbcr_enabled_flag ) | |
|       ph_joint_cbcr_sign_flag | u(1) | ph_cb_qp_offset specifies a difference to be added to the value of pps_cb_qp_offset when determining the value of the $Qp'_{Cb}$ quantization parameter. The value of ph_cb_qp_offset shall be in the range of −12 to +12, inclusive. When ph_cb_qp_offset is not present, it is inferred to be equal to ph_cb_qp_offset. The value of pps_cb_qp_offset+ph_cb_qp_offset shall be in the range of −12 to +12, inclusive.

ph_cr_qp_offset specifies a difference to be added to the value of pps_cr_qp offset when determining the value of the $Qp'_{Cr}$ quantization parameter. The value of ph_cr_qp_offset shall be in the range of −12 to +12, inclusive. When ph_cr_qp_offset is not present, it is inferred to be equal to 0. The value of pps_cr_qp_offset+ph_cr_qp_offset shall be in the range of −12 to +12, inclusive.

ph_joint_cbcr_qp_offset specifies a difference to be added to the value of pps_joint_cbcr_qp_offset_value when determining the value of the $Qp'_{CbCr}$. The value of ph_joint_cbcr_qp_offset shall be in the range of −12 to +12, inclusive. When ph_joint_cbcr_qp_offset is not present, it is inferred to be equal to 0. The value of pps_joint_cbcr_qp_offset_value+ph_joint_cbcr_qp_offset shall be in the range of −12 to +12, inclusive.

And the syntax structure slice_header ( ) is changed as follows:

| | Descriptor |
|---|---|
| slice_header( ) { | |
|    picture_header_in_slice_header_flag | u(1) |
|    ... | |
|    slice_qp_delta | se(v) |
|    if( pps_*pic*_slice_chroma_qp_offsets_present_flag && | |
|    !qp_offset_info_in_ph_flag ) { | |
|       slice_cb_qp_offset | se(v) |
|       slice_cr_qp_offset | se(v) |
|       if( sps_joint_cbcr_enabled_flag ) | |
|          slice_joint_cbcr_qp_offset | se(v) |
|    } | | slice_cb_qp_offset specifies a difference to be added to the value of pps_cb_qp_offset when determining the value of the $Qp'_{Cb}$ quantization parameter. The value of slice_cb_qp_offset shall be in the range of −12 to +12, inclusive. When slice_cb_qp_offset is not present, it is inferred to be equal to [[0]]ph_cb_qp_offset. The value of pps_cb_qp_offset+slice_cb_qp_offset shall be in the range of −12 to +12, inclusive.

slice_cr_qp_offset specifies a difference to be added to the value of pps_cr_qp_offset when determining the value of the $Qp'_{Cr}$ quantization parameter. The value of slice_cr_qp_offset shall be in the range of −12 to +12, inclusive. When slice_cr_qp_offset is not present, it is inferred to be equal to [[0]]ph_cr_qp_offset. The value

---

Before the slice_header table on the left:

| | Descriptor |
|---|---|
| slice_header( ) { | |
|    picture_header_in_slice_header_flag | u(1) |
|    ... | |
|    if( pps_pic_slice_luma_qp_delta_present_flag | |
|    && !qp_delta_info_in_ph_flag ) | |
|       slice_qp_delta | se(v) |
|    ... | | of pps_cr_qp_offset+slice_cr_qp_offset shall be in the range of −12 to +12, inclusive.

slice_joint_cbcr_qp_offset specifies a difference to be added to the value of pps_joint_cbcr_qp_offset_value when determining the value of the $Qp'_{CbCr}$. The value of slice_joint_cbcr_qp_offset shall be in the range of −12 to +12, inclusive. When slice_joint_cbcr_qp_offset is not present, it is inferred to be equal to [[0]]ph_joint_cbcr_qp_offset. The value of pps_joint_cbcr_qp_offset_value+slice_joint_cbcr_qp_offset shall be in the range of −12 to +12, inclusive.

6.3.3. Embodiment of Item 3.c

The changes, marked in boldface italicized text, are based on JVET-Q2001-vE.

| | Descriptor |
|---|---|
| picture_header_structure( ) { | |
| ...... | |
| if( qp_delta_info_in_ph_flag ) | |
| { | |
| ph_qp_delta | se(v) |
| *if( pps_pic_slice_chroma_qp_offsets_present_flag ) {* | |
| *ph_cb_qp_offset* | *se(v)* |
| *ph_cr_qp_offset* | *se(v)* |
| *if( sps_joint_cbcr_enabled_flag )* | |
| *ph_joint_cbcr_qp_offset* | se(v) |
| *}* | |
| } | |
| ...... | |
| slice_header( ) { | |
| ...... | |
| if( !qp_delta_info_in_ph_flag ) | |
| { | |
| slice_qp_delta | se(v) |
| if( pps_*pic*_slice_chroma_qp_offsets_present_flag ) { | |
| slice_cb_qp_offset | se(v) |
| slice_cr_qp_offset | se(v) |
| if( sps_joint_cbcr_enabled_flag ) | |
| slice_joint_cbcr_qp_offset | se(v) |
| } | |
| } | |
| ...... | | pps_pic_slice_chroma_qp_offsets_present_flag equal to 1 specifies that the ph_cb_qp_offset and ph_cr_qp_offset syntax elements are present in the associated picture headers, or, the slice_cb_qp_offset and slice_cr_qp_offset syntax elements are present in the associated slice headers. pps_slice_chroma_qp_offsets_present_flag equal to 0 specifies that the ph_cb_qp_offset and ph_cr_qp_offset syntax elements are not present in the associated picture headers, and, slice_cb_qp_offset and slice_cr_gp_offset syntax elements are not present in the associated slice headers. When not present, the value of pps_slice_chroma_qp_offsets_present_flag is inferred to be equal to 0.

qp_delta_info_in_ph_flag equal to 1 specifies that QP delta information and chroma QP offsets information when pps_slice_chroma_qp_offsets_present_flag is equal to 1 are [[is]] present in the PH syntax structure and not present in slice headers referring to the PPS that do not contain a PH syntax structure. qp_delta_info_in_ph_flag equal to 0 specifies that QP delta and chroma QP offsets information is not present in the PH syntax structure and may be present in slice headers referring to the PPS that do not contain a PH syntax structure.

ph_cb_qp_offset specifies a difference to be added to the value of pps_cb_qp_offset when determining the value of the $Qp'_{Cb}$ quantization parameter. The value of ph_cb_qp_offset shall be in the range of −12 to +12, inclusive. When ph_cb_qp_offset is not present, it is inferred to be equal to 0. The value of pps_cb_qp_offset+ph_cb_qp_offset shall be in the range of −12 to +12, inclusive.

ph_cr_qp_offset specifies a difference to be added to the value of pps_cr_qp_offset when determining the value of the $Qp'_{Cr}$ quantization parameter. The value of ph_cr_qp_offset shall be in the range of −12 to +12, inclusive. When ph_cr_qp_offset is not present, it is inferred to be equal to 0. The value of pps_cr_qp_offset+ph_cr_qp_offset shall be in the range of −12 to +12, inclusive.

ph_joint_cbcr_qp_offset specifies a difference to be added to the value of pps_joint_cbcr_qp_offset_value when determining the value of the $Qp'_{CbCr}$. The value of ph_joint_cbcr_qp_offset shall be in the range of −12 to +12, inclusive. When slice_joint_cbcr_qp_offset is not present, it is inferred to be equal to 0. The value of pps_joint_cbcr_qp_offset_value+ph_joint_cbcr_qp_offset shall be in the range of −12 to +12, inclusive.

slice_cb_qp_offset specifies a difference to be added to the value of pps_cb_qp_offset when determining the value of the $Qp'_{Cb}$ quantization parameter. The value of slice_cb_qp_offset shall be in the range of −12 to +12, inclusive. When slice_cb_qp_offset is not present, it is inferred to be equal to [[0]] ph_cb_qp_offset. The value of pps_cb_qp_offset+slice_cb_qp_offset shall be in the range of −12 to +12, inclusive.

slice_cr_qp_offset specifies a difference to be added to the value of pps_cr_qp_offset when determining the value of the $Qp'_{Cr}$ quantization parameter. The value of slice_cr_qp_offset shall be in the range of −12 to +12, inclusive. When slice_cr_qp_offset is not present, it is inferred to be equal to [[0]]ph_cr_qp_offset. The value of pps_cr_qp_offset+slice_cr_qp_offset shall be in the range of −12 to +12, inclusive.

slice_joint_cbcr_qp_offset specifies a difference to be added to the value of pps_joint_cbcr_qp_offset_value when determining the value of the $Qp'_{CbCr}$. The value of slice_joint_cbcr_qp_offset shall be in the range of −12 to +12, inclusive. When slice_joint_cbcr_qp_offset is not present, it is inferred to be equal to [[0]]ph_joint_cbcr_qp_offset. The value of pps_joint_cbcr_qp_offset_value+slice_joint_cbcr_qp_offset shall be in the range of −12 to +12, inclusive.

6.4. Fourth Set of Embodiments

This is a set of embodiments for items 4, 4.a, 4.b, 4.c and 4.d summarized above in Section 5.

ph_cu_qp_delta_subdiv_intra_slice specifies the maximum cbSubdiv value of coding units in intra slice that convey cu_qp_delta_abs and cu_qp_delta_sign_flag. The value of ph_cu_qp_delta_subdiv_intra_slice shall be in the range of 0 to 2*(Ctb Log 2SizeY−MinQt Log 2SizeIntraY [[+ph_max_mtt_hierarchy_depth_intra_slice_luma]])+2*(Ctb Log 2SizeY−MinCb Log 2SizeY), inclusive.

When not present, the value of ph_cu_qp_delta_subdiv_intra_slice is inferred to be equal to 0.

ph_cu_chroma_qp_offset_subdiv_intra_slice specifies the maximum cbSubdiv value of coding units in intra slice that convey cu_chroma_qp_offset_flag. The value of ph_cu_chroma_qp_offset_subdiv_intra_slice shall be in the range of 0 to 2*(Ctb Log 2SizeY−MinQt Log 2SizeIntraY [[+ph_max_mtt_hierarchy_depth_intra_slice_luma]])+2*(Ctb Log 2SizeY−MinCb Log 2SizeY), inclusive.

When not present, the value of ph_cu_chroma_qp_offset_subdiv_intra_slice is inferred to be equal to 0.

ph_cu_qp_delta_subdiv_inter_slice specifies the maximum cbSubdiv value of coding units that in inter slice convey cu_qp_delta_abs and cu_qp_delta_sign_flag. The value of ph_cu_qp_delta_subdiv_inter_slice shall be in the range of 0 to 2*(Ctb Log 2SizeY−MinQt Log 2SizeInterY [[+ph_max_mtt_hierarchy_depth_inter_slice]])+2*(Ctb Log 2SizeY−MinCb Log 2SizeY), inclusive.

When not present, the value of ph_cu_qp_delta_subdiv_inter_slice is inferred to be equal to 0.

ph_cu_chroma_qp_offset_subdiv_inter_slice specifies the maximum cbSubdiv value of coding units in inter slice that convey cu_chroma_qp_offset_flag. The value of ph_cu_chroma_qp_offset_subdiv_inter_slice shall be in the range of 0 to 2*(Ctb Log 2SizeY−MinQt Log 2SizeInterY [[+ph_max_mtt_hierarchy_depth_inter_slice]])+2*(Ctb Log 2SizeY−MinCb Log 2SizeY), inclusive.

When not present, the value of ph_cu_chroma_qp_offset_subdiv_inter_slice is inferred to be equal to 0.

FIG. 1 is a block diagram showing an example video processing system 1900 in which various techniques disclosed herein may be implemented. Various implementations may include some or all of the components of the system 1900. The system 1900 may include input 1902 for receiving video content. The video content may be received in a raw or uncompressed format, for example, 8 or 10 bit multi-component pixel values, or may be in a compressed or encoded format. The input 1902 may represent a network interface, a peripheral bus interface, or a storage interface. Examples of network interface include wired interfaces such as Ethernet, passive optical network (PON), etc. and wireless interfaces such as wireless fidelity (WI-FI) or cellular interfaces.

The system 1900 may include a coding component 1904 that may implement the various coding or encoding methods described in the present document. The coding component 1904 may reduce the average bitrate of video from the input 1902 to the output of the coding component 1904 to produce a coded representation of the video. The coding techniques are therefore sometimes called video compression or video transcoding techniques. The output of the coding component 1904 may be either stored, or transmitted via a communication connected, as represented by the component 1906. The stored or communicated bitstream (or coded) representation of the video received at the input 1902 may be used by the component 1908 for generating pixel values or displayable video that is sent to a display interface 1910. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include serial advanced technology attachment (SATA), peripheral component interconnect (PCI), integrated drive electronics (IDE) interface, and the like. The techniques described in the present document may be embodied in various electronic devices such as mobile phones, laptops, smartphones or other devices that are capable of performing digital data processing and/or video display.

Figure 2:
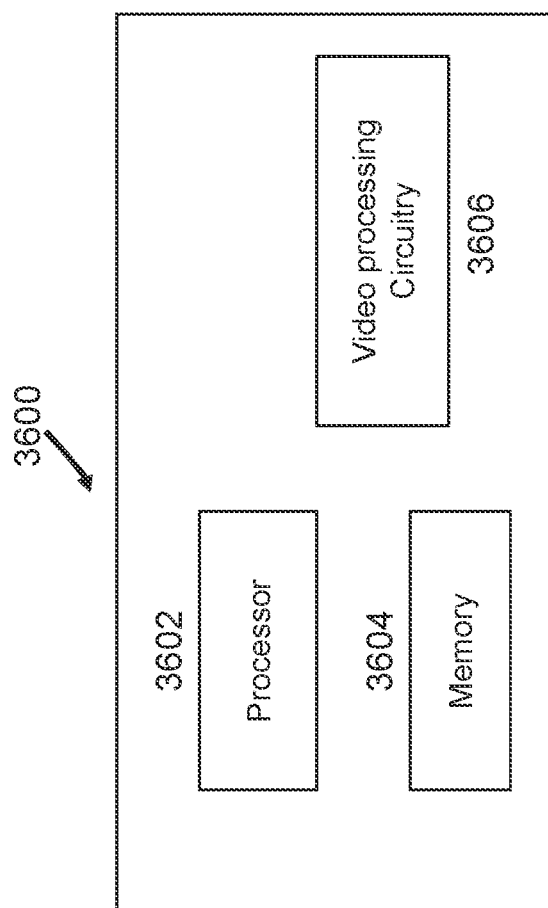
FIG. 2 is a block diagram of an example video processing apparatus.
Figure 3:
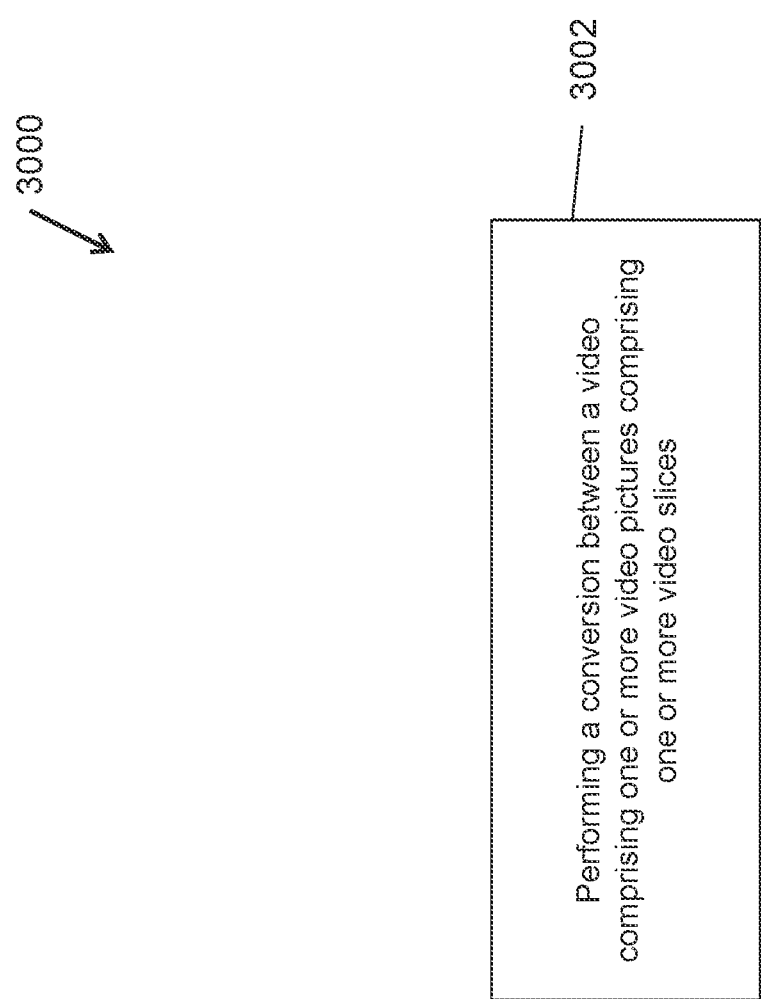
FIG. 3 is a flowchart for an example method of video processing.

FIG. 2 is a block diagram of a video processing apparatus 3600. The apparatus 3600 may be used to implement one or more of the methods described herein. The apparatus 3600 may be embodied in a smartphone, tablet, computer, Internet of Things (IoT) receiver, and so on. The apparatus 3600 may include one or more processors 3602, one or more memories 3604 and video processing hardware 3606. The processor(s) 3602 may be configured to implement one or more methods described in the present document. The memory (memories) 3604 may be used for storing data and code used for implementing the methods and techniques described herein. The video processing hardware 3606 may be used to implement, in hardware circuitry, some techniques described in the present document.

Figure 4:
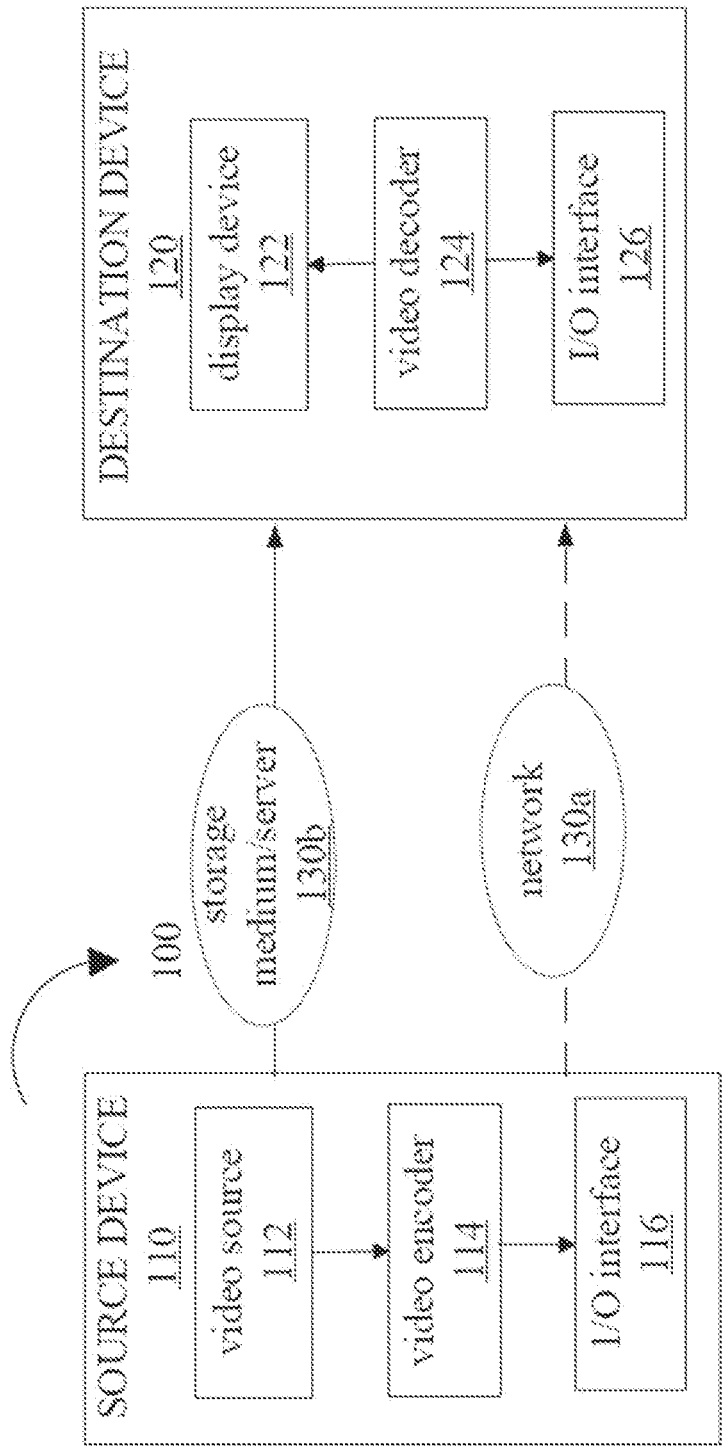
FIG. 4 is a block diagram that illustrates a video coding system, in accordance with various examples.

FIG. 4 is a block diagram that illustrates an example video coding system 100 that may utilize the techniques of this disclosure.

As shown in FIG. 4, video coding system 100 may include a source device 110 and a destination device 120. Source device 110 generates encoded video data which may be referred to as a video encoding device. Destination device 120 may decode the encoded video data generated by source device 110 which may be referred to as a video decoding device.

Source device 110 may include a video source 112, a video encoder 114, and an input/output (I/O) interface 116.

Video source 112 may include a source such as a video capture device, an interface to receive video data from a video content provider, and/or a computer graphics system for generating video data, or a combination of such sources. The video data may comprise one or more pictures. Video encoder 114 encodes the video data from video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 116 may include a modulator/demodulator (modem) and/or a transmitter. The encoded video data may be transmitted directly to destination device 120 via I/O interface 116 through network 130a. The encoded video data may also be stored onto a storage medium/server 130b for access by destination device 120.

Destination device 120 may include an I/O interface 126, a video decoder 124, and a display device 122.

I/O interface 126 may include a receiver and/or a modem. I/O interface 126 may acquire encoded video data from the source device 110 or the storage medium/server 130b. Video decoder 124 may decode the encoded video data. Display device 122 may display the decoded video data to a user. Display device 122 may be integrated with the destination device 120, or may be external to destination device 120 which be configured to interface with an external display device.

Video encoder 114 and video decoder 124 may operate according to a video compression standard, such as the High Efficiency Video Coding (HEVC) standard, Versatile Video Coding (VVC) standard and other current and/or further standards.

Figure 5:
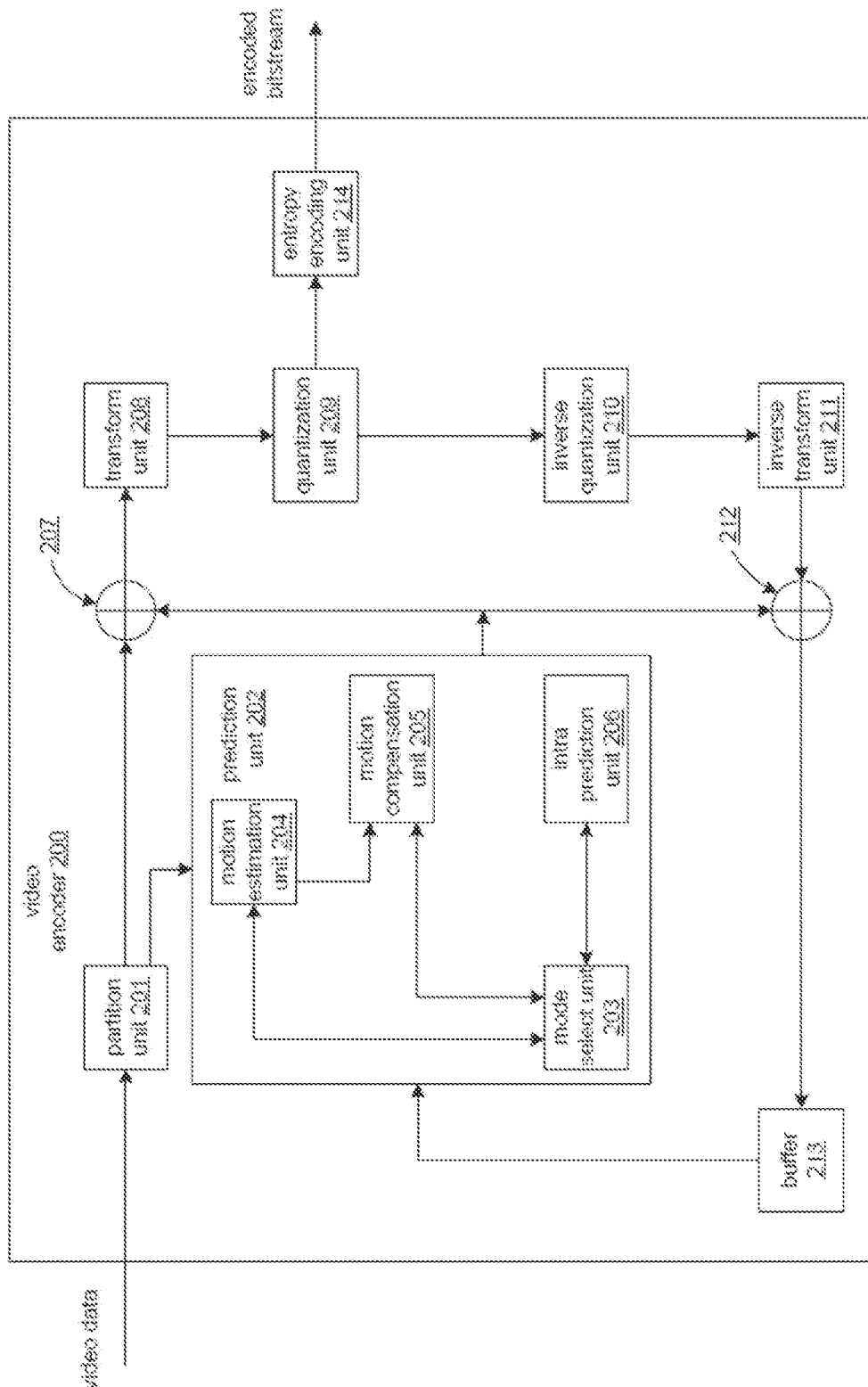
FIG. 5 is a block diagram that illustrates an encoder, in accordance with various examples.

FIG. 5 is a block diagram illustrating an example of video encoder 200, which may be video encoder 114 in the system 100 illustrated in FIG. 4.

Video encoder 200 may be configured to perform any or all of the techniques of this disclosure. In the example of FIG. 5, video encoder 200 includes a plurality of functional components. The techniques described in this disclosure may be shared among the various components of video encoder 200. In some examples, a processor may be configured to perform any or all of the techniques described in this disclosure.

The functional components of video encoder 200 may include a partition unit 201, a prediction unit 202 which may include a mode select unit 203, a motion estimation unit 204, a motion compensation unit 205 and an intra prediction unit 206, a residual generation unit 207, a transform processing unit 208, a quantization unit 209, an inverse quantization unit 210, an inverse transform unit 211, a reconstruction unit 212, a buffer 213, and an entropy encoding unit 214.

In other examples, video encoder 200 may include more, fewer, or different functional components. In an example, prediction unit 202 may include an intra block copy (IBC) unit. The IBC unit may perform prediction in an IBC mode in which at least one reference picture is a picture where the current video block is located.

Furthermore, some components, such as motion estimation unit 204 and motion compensation unit 205 may be highly integrated, but are represented in the example of FIG. 5 separately for purposes of explanation.

Partition unit 201 may partition a picture into one or more video blocks. Video encoder 200 and video decoder 300 may support various video block sizes.

Mode select unit 203 may select one of the coding modes, intra or inter (e.g., based on error results), and provide the resulting intra- or inter-coded block to a residual generation unit 207 to generate residual block data and to a reconstruction unit 212 to reconstruct the encoded block for use as a reference picture. In some examples, mode select unit 203 may select a combination of intra and inter prediction (CIIP) mode in which the prediction is based on an inter prediction signal and an intra prediction signal. Mode select unit 203 may also select a resolution for a motion vector (e.g., a sub-pixel or integer pixel precision) for the block in the case of inter-prediction.

To perform inter prediction on a current video block, motion estimation unit 204 may generate motion information for the current video block by comparing one or more reference frames from buffer 213 to the current video block. Motion compensation unit 205 may determine a predicted video block for the current video block based on the motion information and decoded samples of pictures from buffer 213 other than the picture associated with the current video block.

Motion estimation unit 204 and motion compensation unit 205 may perform different operations for a current video block, for example, depending on whether the current video block is in an I slice, a P slice, or a B slice.

In some examples, motion estimation unit 204 may perform uni-directional prediction for the current video block, and motion estimation unit 204 may search reference pictures of list 0 or list 1 for a reference video block for the current video block. Motion estimation unit 204 may then generate a reference index that indicates the reference picture in list 0 or list 1 that contains the reference video block and a motion vector that indicates a spatial displacement between the current video block and the reference video block. Motion estimation unit 204 may output the reference index, a prediction direction indicator, and the motion vector as the motion information of the current video block. Motion compensation unit 205 may generate the predicted video block of the current block based on the reference video block indicated by the motion information of the current video block.

In other examples, motion estimation unit 204 may perform bi-directional prediction for the current video block, motion estimation unit 204 may search the reference pictures in list 0 for a reference video block for the current video block and may also search the reference pictures in list 1 for another reference video block for the current video block. Motion estimation unit 204 may then generate reference indexes that indicate the reference pictures in list 0 and list 1 containing the reference video blocks and motion vectors that indicate spatial displacements between the reference video blocks and the current video block. Motion estimation unit 204 may output the reference indexes and the motion vectors of the current video block as the motion information of the current video block. Motion compensation unit 205 may generate the predicted video block of the current video block based on the reference video blocks indicated by the motion information of the current video block.

In some examples, motion estimation unit 204 may output a full set of motion information for decoding processing of a decoder.

In some examples, motion estimation unit 204 may do not output a full set of motion information for the current video. Rather, motion estimation unit 204 may signal the motion information of the current video block with reference to the motion information of another video block. For example, motion estimation unit 204 may determine that the motion information of the current video block is sufficiently similar to the motion information of a neighboring video block.

In one example, motion estimation unit 204 may indicate, in a syntax structure associated with the current video block, a value that indicates to the video decoder 300 that the current video block has the same motion information as the another video block.

In another example, motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector prediction (AMVP) and merge mode signaling.

Intra prediction unit 206 may perform intra prediction on the current video block. When intra prediction unit 206 performs intra prediction on the current video block, intra prediction unit 206 may generate prediction data for the current video block based on decoded samples of other video blocks in the same picture. The prediction data for the current video block may include a predicted video block and various syntax elements.

Residual generation unit 207 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 207 may not perform the subtracting operation.

Transform processing unit 208 may generate one or more transform coefficient video blocks for the current video block by applying one or more transforms to a residual video block associated with the current video block.

After transform processing unit 208 generates a transform coefficient video block associated with the current video block, quantization unit 209 may quantize the transform coefficient video block associated with the current video block based on one or more quantization parameter (QP) values associated with the current video block.

Inverse quantization unit 210 and inverse transform unit 211 may apply inverse quantization and inverse transforms to the transform coefficient video block, respectively, to reconstruct a residual video block from the transform coefficient video block. Reconstruction unit 212 may add the reconstructed residual video block to corresponding samples from one or more predicted video blocks generated by the prediction unit 202 to produce a reconstructed video block associated with the current block for storage in the buffer 213.

After reconstruction unit 212 reconstructs the video block, loop filtering operation may be performed reduce video blocking artifacts in the video block.

Entropy encoding unit 214 may receive data from other functional components of the video encoder 200. When entropy encoding unit 214 receives the data, entropy encoding unit 214 may perform one or more entropy encoding operations to generate entropy encoded data and output a bitstream that includes the entropy encoded data.

Some embodiments of the disclosed technology include making a decision or determination to enable a video processing tool or mode. In an example, when the video processing tool or mode is enabled, the encoder will use or implement the tool or mode in the processing of a block of video, but may not necessarily modify the resulting bitstream based on the usage of the tool or mode. That is, a conversion from the block of video to the bitstream (or the bitstream representation) of the video will use the video processing tool or mode when it is enabled based on the decision or determination. In another example, when the video processing tool or mode is enabled, the decoder will process the bitstream with the knowledge that the bitstream has been modified based on the video processing tool or mode. That is, a conversion from the bitstream of the video to the block of video will be performed using the video processing tool or mode that was enabled based on the decision or determination.

Figure 6:
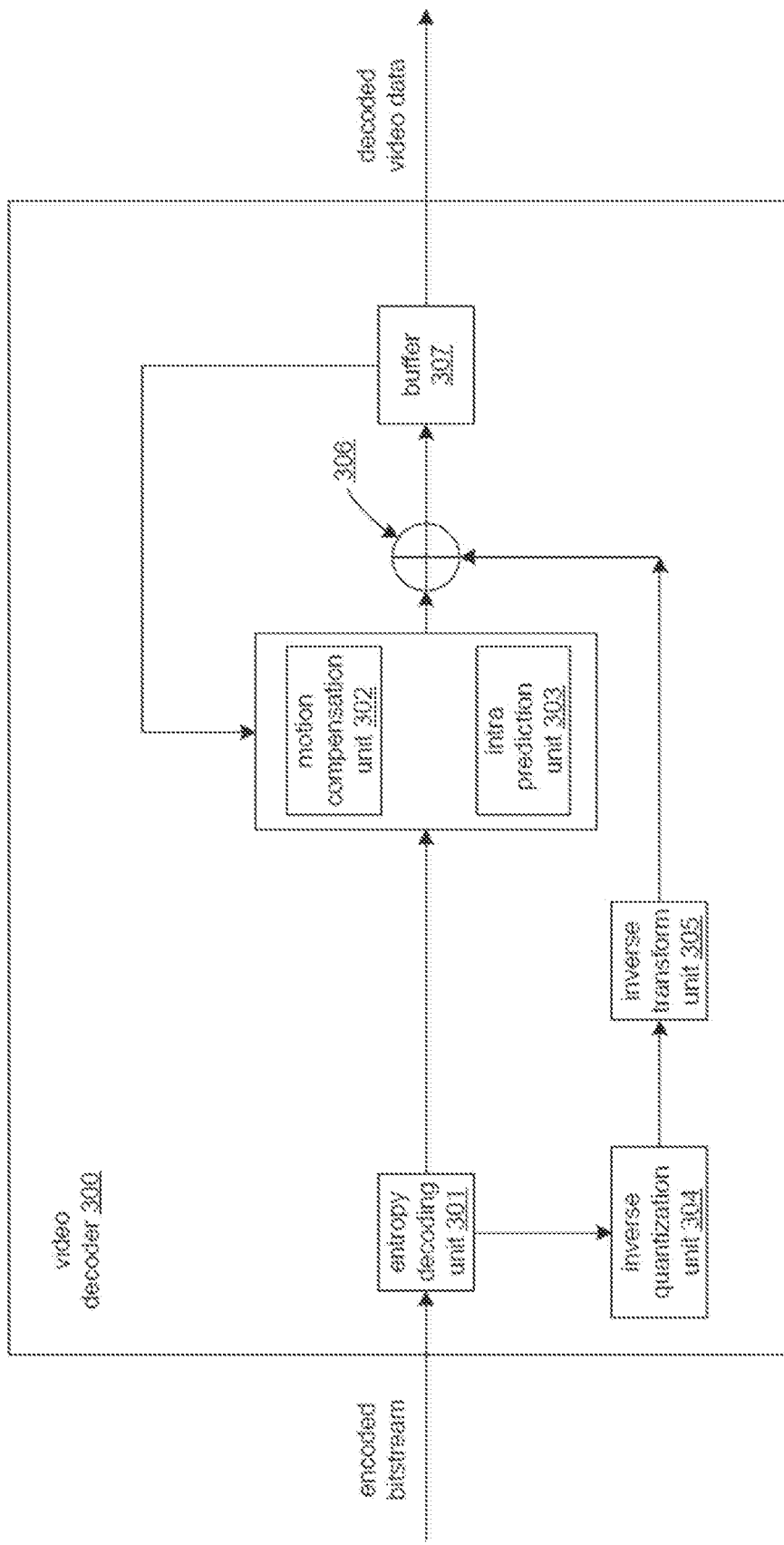
FIG. 6 is a block diagram that illustrates a decoder, in accordance with various examples.

FIG. 6 is a block diagram illustrating an example of video decoder 300 which may be video decoder 124 in the system 100 illustrated in FIG. 4.

The video decoder 300 may be configured to perform any or all of the techniques of this disclosure. In the example of FIG. 6, the video decoder 300 includes a plurality of functional components. The techniques described in this disclosure may be shared among the various components of the video decoder 300. In some examples, a processor may be configured to perform any or all of the techniques described in this disclosure.

In the example of FIG. 6, video decoder 300 includes an entropy decoding unit 301, a motion compensation unit 302, an intra prediction unit 303, an inverse quantization unit 304, an inverse transform unit 305, and a reconstruction unit 306 and a buffer 307. Video decoder 300 may, in some examples, perform a decoding pass generally reciprocal to the encoding pass described with respect to video encoder 200 (FIG. 5).

Entropy decoding unit 301 may retrieve an encoded bitstream. The encoded bitstream may include entropy coded video data (e.g., encoded blocks of video data). Entropy decoding unit 301 may decode the entropy coded video data, and from the entropy decoded video data, motion compensation unit 302 may determine motion information including motion vectors, motion vector precision, reference picture list indexes, and other motion information. Motion compensation unit 302 may, for example, determine such information by performing the AMVP and merge mode.

Motion compensation unit 302 may produce motion compensated blocks, possibly performing interpolation based on interpolation filters. Identifiers for interpolation filters to be used with sub-pixel precision may be included in the syntax elements.

Motion compensation unit 302 may use interpolation filters as used by video encoder 200 during encoding of the video block to calculate interpolated values for sub-integer pixels of a reference block. Motion compensation unit 302 may determine the interpolation filters used by video encoder 200 according to received syntax information and use the interpolation filters to produce predictive blocks.

Motion compensation unit 302 may use some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence.

Intra prediction unit 303 may use intra prediction modes for example received in the bitstream to form a prediction block from spatially adjacent blocks. Inverse quantization unit 304 inverse quantizes, i.e., de-quantizes, the quantized video block coefficients provided in the bitstream and decoded by entropy decoding unit 301. Inverse transform unit 305 applies an inverse transform.

Reconstruction unit 306 may sum the residual blocks with the corresponding prediction blocks generated by motion compensation unit 302 or intra-prediction unit 303 to form decoded blocks. If desired, a deblocking filter may also be applied to filter the decoded blocks in order to remove blockiness artifacts. The decoded video blocks are then stored in buffer 307, which provides reference blocks for subsequent motion compensation/intra prediction and also produces decoded video for presentation on a display device.

The following section describes an example PROF technique, an example affine merge technique, and an example affine AMVP technique:

PROF: prediction refinement with optical flow (PROF) is used to refine the subblock based affine motion compensated prediction. After the subblock based affine motion compensation is performed, luma prediction sample is refined by adding a difference derived by the optical flow equation.

Thus, for example, a PROF technique includes refining a sub-block based affine motion compensated prediction of the video block followed by refining a luma prediction sample of the video block by adding a difference derived by an optical flow equation.

Affine merge: In this mode the control point motion vectors (CPMVs) of the current CU is generated based on the motion information of the spatial neighboring CUs. Several control point motion vector predictor (CPMVP) candidates are constructed from the motion information of the spatial neighboring CUs. An index is signaled to indicate the one to be used for the current CU. Thus, for example, in an affine merge mode, control point motion vectors of a current coding unit of the video block are generated based on motion information of spatial neighboring coding units of the current coding unit and an index that indicates an affine merge candidate from a sub-block merge candidate list to be used for the current coding unit is included in the bitstream.

Affine AMVP: An affine flag in CU level is signaled in the bitstream to indicate whether affine AMVP mode is used and then another flag is signaled to indicate whether 4-parameter affine or 6-parameter affine. In this mode, the difference of the CPMVs of current CU and their predictors CPMVPs is signaled in the bitstream. Thus, for example, an affine AMVP mode comprises including in the bitstream: (1) an affine flag at a coding unit level of the video block to indicate whether the affine advanced motion vector prediction mode is used, (2) a second flag to indicate whether 4-parameter affine or 6-parameter affine is used, (3) a control point motion vector predictor index at a coding unit level, and (4) a difference of control point motion vectors of a current coding unit of the video block and predictors control point motion vectors corresponding to the control point motion vectors A listing of solutions preferred by some embodiments is provided next.

The following solutions show example embodiments of techniques discussed in the previous section (e.g., item 1.1 to 1.c).

1. A video processing method (e.g., method 3000 shown in FIG. 4), comprising: performing (3002) a conversion between a video comprising one or more video pictures comprising one or more video slices, wherein the conversion conforms to a first rule that specifies that a decision regarding applicability of a deblocking filter to the one or more video slices referring to a video picture parameter set is performed based on a deblocking syntax field that is included in a picture header of a corresponding video picture.

2. The method of solution 1, wherein the decision is based on whether the applicability is disabled in the video picture parameter set and the picture header and further based on a slice-level indication of disablement of the deblocking filter.

3. The method of any of solutions 1-2, wherein the conversion further conforms to a second rule that permits overriding a signaled applicability of the deblocking filter at a higher level in the coded representation based on a flag signaled or derived at a finer level than the higher level in the coded representation.

4. The method of solution 1, wherein whether the flag is signaled or whether the flag is derived depends on another field included in the coded representation.

The following solutions show example embodiments of techniques discussed in the previous section (e.g., item 1.d to 1.q).

5. A video processing method, comprising: performing a conversion between a video comprising one or more video pictures comprising one or more video slices, wherein the conversion conforms to a rule that specifies a constraint on applicability of deblocking filter to a video slice based on fields included at a slice header level and/or a picture header level and/or a picture parameter set level for the video slice.

6. The method of solution 5, wherein the rule specifies the constraint that in case that the deblocking filter is disabled according to a signal at the picture parameter set level, then the deblocking filter cannot be enabled by a signal at the slice header level or at the picture header level.

7. The method of solution 5, wherein the rule specifies the constraint that in case that the deblocking filter is enabled according to a signal at the picture parameter set level, then a signal at the slice header level or at the picture header level is permitted to disable the deblocking filter for the video slice.

8. The method of solution 5, wherein the rule specifies that a value of a first field at the picture parameter set level controlling enablement of the deblocking filter is independent of a value of a second field that indicates whether the deblocking filter is overridden.

9. The method of solution 5, wherein the rule specifies that a signaling of a syntax element "dbf_info_in_ph_flag" that specifies whether the deblocking filter on/off controlling parameters and/or the deblocking filter parameters are present in a picture header or a sequence header, includes in a picture parameter set are independent of other syntax elements including deblocking_filter_override_enabled_flag.

10. The method of solution 5, wherein the rule specifies that an override flag at the picture parameter set level or the picture level or the slice level does not control overriding of a deblocking on/off control parameter.

11. The method of solution 5, wherein the rule specifies that an override flag at the picture parameter set level or the picture level or the slice level is for overriding an on/off control parameter or a filter parameter for the deblocking filter, but not both.

12. The method of solution 5, wherein the rule specifies that the deblocking filter is permitted to be enabled at the picture level or the slice level even in case that the deblocking filter is disabled at the picture parameter set level.

13. The method of solution 5, wherein the rule specifies that a field controlling on/off of the deblocking filter and a field indicative of parameters of the deblocking filter are included both at the picture level and at the slice level.

14. The method of solution 5, wherein the rule specifies that a field controlling on/off of the deblocking filter and a field indicative of parameters of the deblocking filter are included in a sequence parameter set.

15. The method of solution 5, wherein the applicability of the deblocking filter to the video slice is signaled in a syntax field that is signaled at a video unit level, wherein the syntax field is not a binary flag and wherein the video unit level comprises a picture parameter set or a sequence parameter set.

16. The method of solution 15, wherein the syntax field comprises N bits, where N is an integer greater than 1.

17. The method of solution 16, wherein N=2, and wherein the syntax field is indicative of four options including one or more of (a) the deblocking filter is not applied for all slices referring to the picture parameter set (PPS), (b) the deblocking filter is applied for all slices referring to the PPS, using a first offset parameter signaled in the PPS (c) the deblocking filter is applied for all slices referring to the PPS, using a second offset parameter signaled in the PPS, or (d) the deblocking filter is applied for a slice referring to the PPS is by parameters signaled other than in PPS.

18. The method of solution 5, wherein the rule specifies that the deblocking filter is enabled for video slice using zero values of deblocking filter parameters.

The following solutions show example embodiments of techniques discussed in the previous section (e.g., item 2).

19. A method of video processing, comprising: making a determination, about applicability of a prediction refinement based optical flow (PROF) coding with an affine advanced motion vector predictor coding based on a first rule or with an affine merge mode based on a second rule; and performing a conversion between a video block of a video and a coded representation of the video according to the determination.

20. The method of solution 1, wherein the second rule specifies that the PROF coding is applied for the video block such that a prediction block corresponding to an M*N portion is larger than M*N, wherein M and N are positive integers.

21. The method of any of solutions 19-20, wherein a flag in the coded representation is included to indicate a number of extended samples generated by a prediction block generated by the PROF coding.

22. The method of solution 21, wherein the number of extended samples is identical for the first rule and the second rule.

The following solutions show example embodiments of techniques discussed in the previous section (e.g., item 3).

23. A video processing method, comprising: performing a conversion between a video comprising one or more pictures comprising one or more slices and a coded representation of the video, wherein a first syntax element at a picture level or a slice level and/or a second syntax element at another level indicative of a quantization parameter delta or an offset signaling are conditionally included in the coded representation according to a rule.

24. The method of solution 23, wherein the rule specifies that another level is a sequence parameter set level or a picture parameter set level, and wherein the second syntax element is indicative of whether chroma or luma delta QP signaling is enabled.

25. The method of solution 23, wherein the rule specifies that another level is a sequence parameter set level or a picture parameter set level, and wherein the second syntax element is indicative of whether chroma QP offset signaling is enabled.

The following solutions show example embodiments of techniques discussed in the previous section (e.g., item 4).

26. A video processing method, comprising: performing a conversion between a video comprising one or more pictures comprising one or more slices and a coded representation of the video, wherein the coded representation includes a syntax element indicative of a coding block subdivision value (cbSubDiv) whose range is according to a rule.

27. The method of solution 26, wherein the rule specifies that the range is independent of a syntax field ph_max_mtt_hierarchy_depth_intra_slice_luma includes in the coded representation.

28. The method of any of solutions 26-27, wherein the rule specifies that the range is between of 0 to 2*(Ctb Log 2SizeY−MinQt Log 2SizeIntraY)+2*(Ctb Log 2SizeY− MinCb Log 2SizeY), inclusive.

29. The method of solution 26, wherein the rule specifies that the range is independent of a ph_max_mtt_hierarchy_depth_intra_slice_luma field.

30. The method of solution 26, wherein the rule specifies that the range is independent of a ph_max_mtt_hierarchy_depth_inter_slice field.

31. The method of any of solutions 1 to 30, wherein the conversion comprises encoding the video into the coded representation.

32. The method of any of solutions 1 to 30, wherein the conversion comprises decoding the coded representation to generate pixel values of the video.

33. A video decoding apparatus comprising a processor configured to implement a method recited in one or more of solutions 1 to 32.

34. A video encoding apparatus comprising a processor configured to implement a method recited in one or more of solutions 1 to 32.

35. A computer program product having computer code stored thereon, the code, when executed by a processor, causes the processor to implement a method recited in any of solutions 1 to 32.

36. A method, apparatus or system described in the present document.

Figure 7:
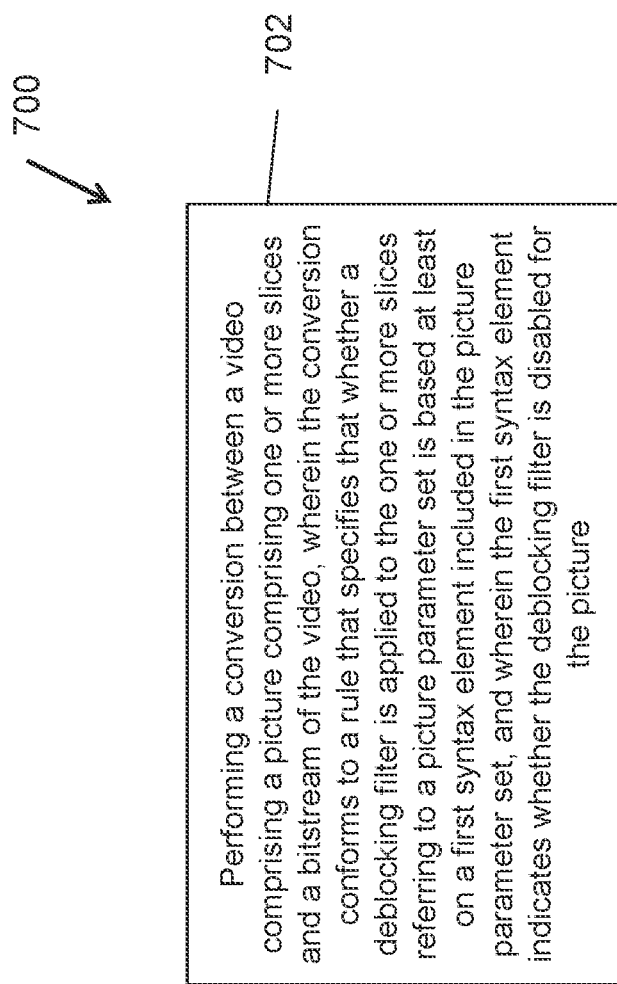

FIG. 7 is a flowchart for example method 700 of video processing. Operation 702 includes performing a conversion between a video comprising a picture comprising one or more slices and a bitstream of the video, wherein the conversion conforms to a rule that specifies that whether a deblocking filter is applied to the one or more slices referring to a picture parameter set is based at least on a first syntax element included in the picture parameter set, and wherein the first syntax element indicates whether the deblocking filter is disabled for the picture.

In some embodiments of method 700, the rule specifies that whether the deblocking filter is applied to the one or more slices referring to the picture parameter set is further based on at least one of (1) whether the deblocking filter is disabled for the picture by a second syntax element in the picture header, (2) whether the deblocking filter is indicated as being disabled by a third syntax element at a slice level, or (3) whether a fourth syntax element in the picture parameter set indicates whether an override of an applicability of the deblocking filter is disabled at a picture level and a slice level. In some embodiments of method 700, the rule specifies that whether the deblocking filter is applied to the one or more slices referring to the picture parameter set is further based on: (1) whether the deblocking filter is disabled for the picture by a second syntax element in the picture header, and (2) whether the deblocking filter is indicated as being disabled by a third syntax element at a slice level. In some embodiments of method 700, values of the first syntax element, the second syntax element, and the third syntax element equal to 1 indicate that the deblocking filter is disabled.

In some embodiments of method 700, the rule specifies that whether the deblocking filter is applied to the one or more slices referring to the picture parameter set is further based on: whether a fourth syntax element in the picture parameter set indicates whether an override of an applicability of the deblocking filter is disabled at a picture level and a slice level. In some embodiments of method 700, a first value of the first syntax element equal to 1 indicates that the deblocking filter is disabled for pictures referring to the picture parameter set, and a second value of the fourth syntax element equal to 0 indicates that the override of the applicability of the deblocking filter is disabled at the picture level and the slice level. In some embodiments of method 700, values of the first syntax element equal to 1 and the fourth syntax element equal to 0 indicate that the deblocking filter is disabled.

Figure 8:
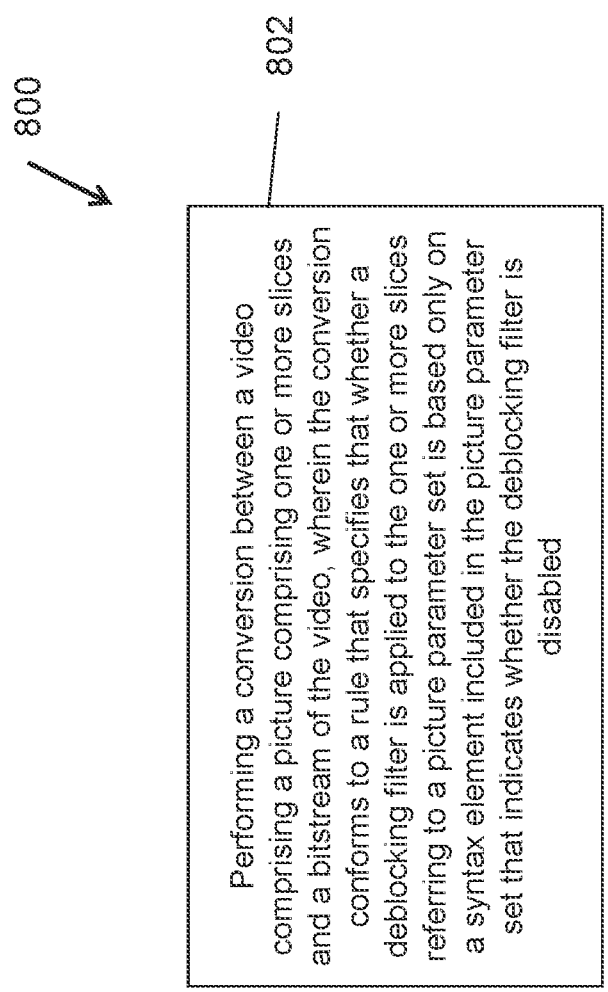

FIG. 8 is a flowchart for example method 800 of video processing. Operation 802 includes performing a conversion between a video comprising a picture comprising one or more slices and a bitstream of the video, wherein the conversion conforms to a rule that specifies that whether a deblocking filter is applied to the one or more slices referring to a picture parameter set is based only on a syntax element included in the picture parameter set that indicates whether the deblocking filter is disabled.

In some embodiments of method 800, a value of the syntax element equal to 1 indicates that the deblocking filter is disabled for the picture.

Figure 9:
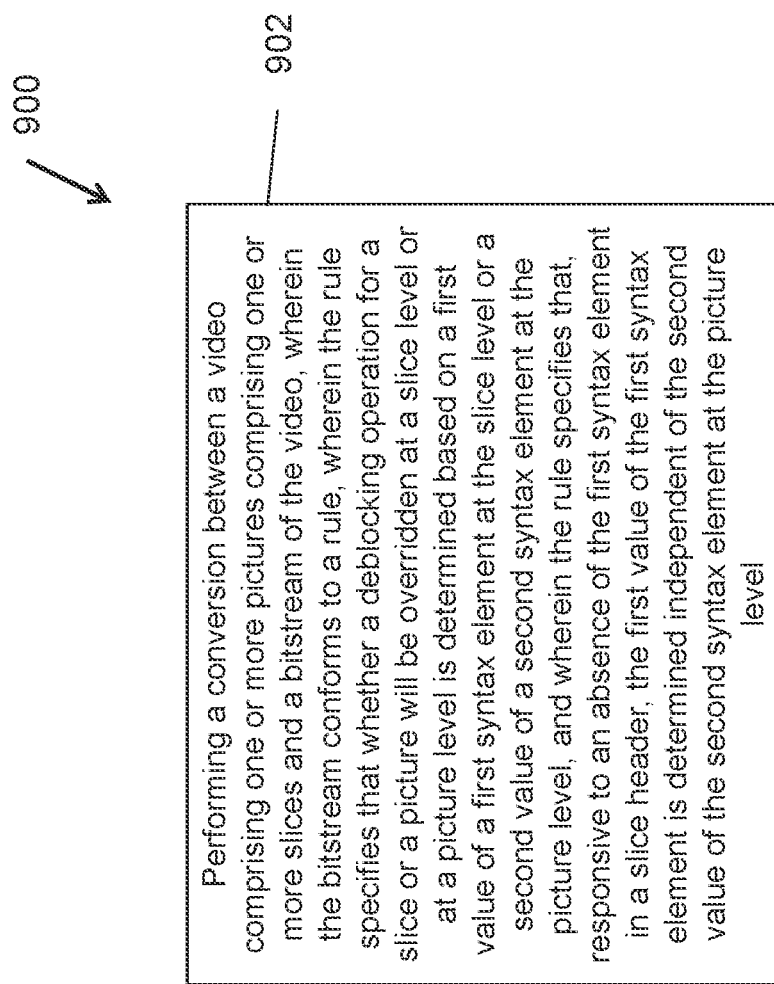

FIG. 9 is a flowchart for example method 900 of video processing. Operation 902 includes performing a conversion between a video comprising one or more pictures comprising one or more slices and a bitstream of the video, wherein the bitstream conforms to a rule, wherein the rule specifies that whether a deblocking operation for a slice or a picture will be overridden at a slice level or at a picture level is determined based on a first value of a first syntax element at the slice level or a second value of a second syntax element at the picture level, and wherein the rule specifies that, responsive to an absence of the first syntax element in a slice header, the first value of the first syntax element is determined independent of the second value of the second syntax element at the picture level.

In some embodiments of method 900, the first value of the first syntax element is determined to be 0 that indicates that the deblocking operation is not overridden at the slice level. In some embodiments of method 800, the second value of the second syntax element is determined to be 0 that indicates that the deblocking operation is not overridden at the picture level.

Figure 10:
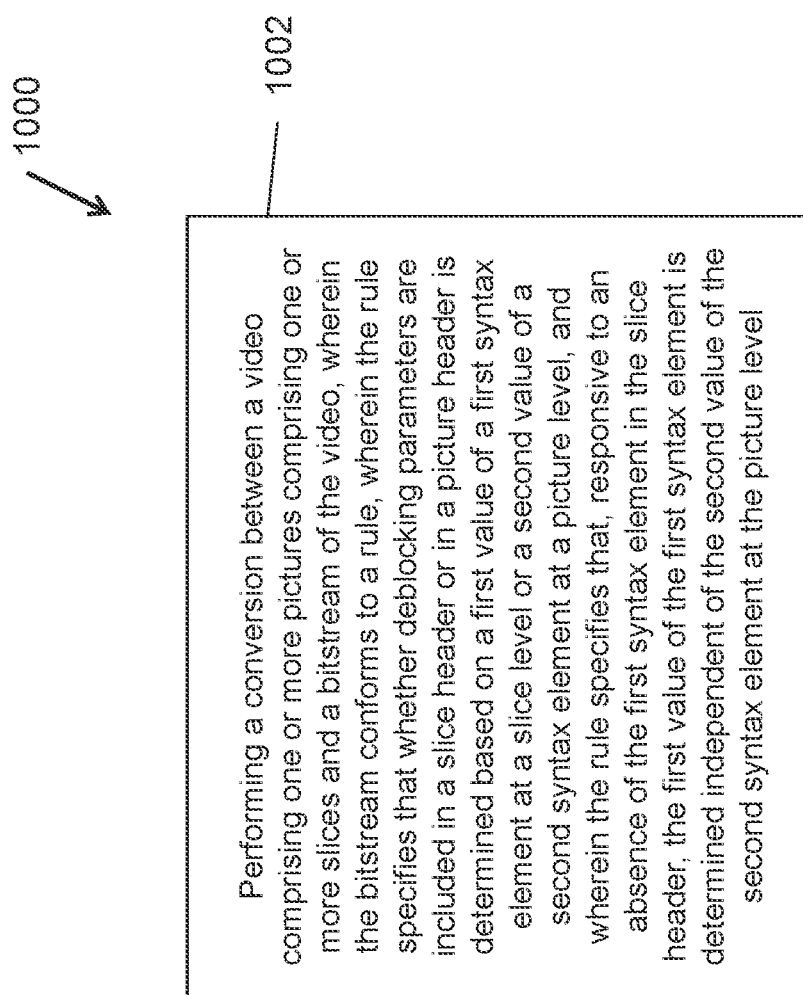

FIG. 10 is a flowchart for example method 1000 of video processing. Operation 1002 includes performing a conversion between a video comprising one or more pictures comprising one or more slices and a bitstream of the video, wherein the bitstream conforms to a rule, wherein the rule specifies that whether deblocking parameters are included in a slice header or in a picture header is determined based on a first value of a first syntax element at a slice level or a second value of a second syntax element at a picture level, and wherein the rule specifies that, responsive to an absence of the first syntax element in the slice header, the first value of the first syntax element is determined independent of the second value of the second syntax element at the picture level.

In some embodiments of method 1000, the first value of the first syntax element is determined to be 0 that indicates that the deblocking parameters are not included at the slice level. In some embodiments of method 1000, the second value of the second syntax element is determined to be 0 that indicates that the deblocking parameters are not included at the picture level.

FIG. 11 is a flowchart for example method 1100 of video processing. Operation 1102 includes performing a conversion between a video comprising one or more pictures comprising one or more slices and a bitstream of the video, wherein the bitstream conforms to a format rule that specifies whether a first syntax element and a second syntax element are respectively included in a picture header and a slice header, or are inferred are based on a value of a third syntax element in a picture parameter set, wherein the first syntax element indicates whether a deblocking filter is disabled at a picture level of the video, wherein the second syntax element indicates whether the deblocking filter is disabled at a slice level of the video, and wherein the third syntax element indicates whether the deblocking filter is enabled for the one or more pictures that refer to the picture parameter set.

Figure 12:
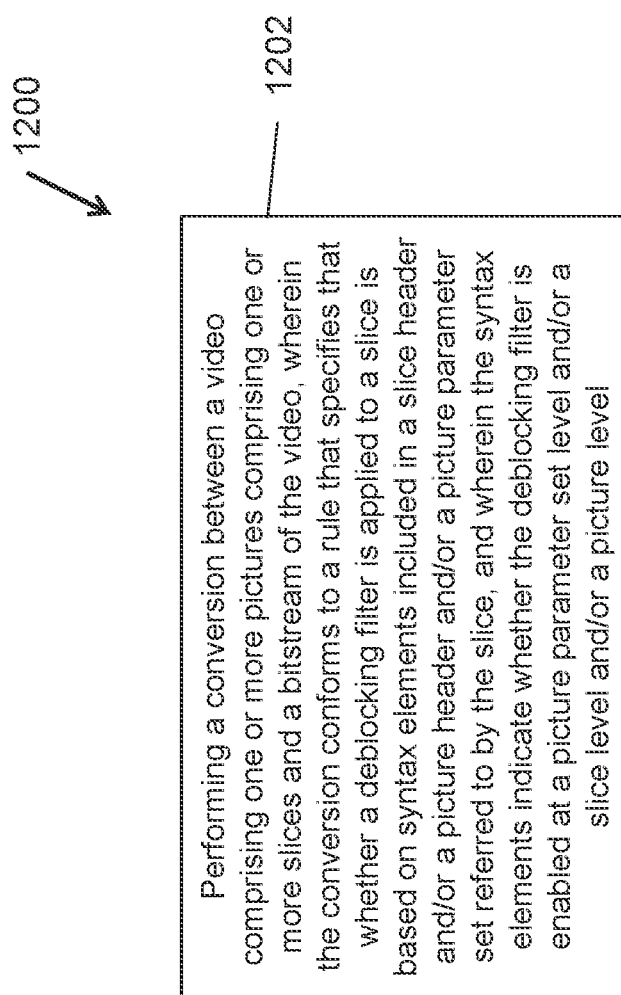

FIG. 12 is a flowchart for example method 1200 of video processing. Operation 1202 includes performing a conversion between a video comprising one or more pictures comprising one or more slices and a bitstream of the video, wherein the conversion conforms to a rule that specifies that whether a deblocking filter is applied to a slice is based on syntax elements included in a slice header and/or a picture header and/or a picture parameter set referred to by the slice, and wherein the syntax elements indicate whether the deblocking filter is enabled at a picture parameter set level and/or a slice level and/or a picture level.

In some embodiments of method 1200, the rule specifies that in case that the deblocking filter is disabled according to a first syntax element in the picture parameter set, then the deblocking filter is disallowed from being enabled by a second syntax element in the slice header or by a third syntax element in the picture header. In some embodiments of method 1200, the rule further specifies that a presence of the second syntax element in the slice header and/or the third syntax element in the picture header is based on a first value of the first syntax element and is independent of a second value of a flag that that indicates whether an override of an applicability of the deblocking filter is enabled at the picture level or the slice level. In some embodiments of method 1200, the rule specifies that the second syntax element and/or the third syntax element are excluded from the slice header and/or the picture header, respectively, in response to the first syntax element indicating that the deblocking filter is disabled for the slice referring to the picture parameter set. In some embodiments of method 1200, the rule further specifies that a flag in the picture parameter set indicates: (1) whether the first syntax element is indicated in the picture parameter set, whether the second syntax element is indicated in the slice header, and/or whether the third syntax element is indicated in the picture, and (2) whether parameters for the deblocking filter are indicated in the picture parameter set, the picture header, and the slice header. In some embodiments of method 1200, the flag indicates that: (1) the first syntax element is excluded from the picture parameter set, the second syntax element is excluded from the slice header, and/or the third syntax element is excluded from the picture, and (2) the parameters for the deblocking filter are excluded from the picture parameter set, the picture header, and the slice header.

In some embodiments of method 1200, the rule specifies that in case that the deblocking filter is disabled according to a first syntax element absent from the picture parameter set, then the deblocking filter is disallowed from being enabled by a second syntax element in the slice header or by a third syntax element in the picture header, and the first syntax element is inferred to equal a certain value. In some embodiments of method 1200, the rule specifies that in case that the deblocking filter is disabled according to a first syntax element in the picture parameter set, then the deblocking filter is disallowed from being enabled by a second syntax element in the slice header or by a third syntax element absent from the picture header, and the third syntax element is inferred to have a same value as the first syntax element. In some embodiments of method 1200, the rule specifies that in case that the deblocking filter is disabled according to a first syntax element in the picture parameter set, then the deblocking filter is disallowed from being enabled by a second syntax element absent from the slice header or by a third syntax element in the picture header, and the second syntax element is inferred to have a same value as the first syntax element or the third syntax element. In some embodiments of method 1200, the rule specifies that in case that the deblocking filter is enabled at a first video unit level of the video, then the deblocking filter is permitted to be disabled at a second video unit level of the video, wherein the second video unit level is lower than the first video unit level.

In some embodiments of method 1200, the first video unit level includes the picture header, and wherein the second video unit level includes the slice header. In some embodiments of method 1200, the one or more pictures comprises a plurality of slices that comprise a first set of one or more slices and a second set of one or more slices, the rule specifies that the deblocking filter is enabled for the first set of one or more slices, and the rule specifies that the deblocking filter is disabled for the second set of one or more slices. In some embodiments of method 1200, a first syntax element included in the slice header indicates whether the deblocking filter is enabled for the second video unit level, a second syntax element in the picture header that indicates whether the deblocking filter is enabled for the first video unit level, and the rule specifies that the first syntax element is based on the second syntax element. In some embodiments of method 1200, the rule specifies that in case that the first syntax element indicates that the deblocking filter is enabled for a current picture, then the second syntax element indicates whether the deblocking filter is enabled for a current slice of the current picture. In some embodiments of method 1200, the rule further specifies that whether the picture parameter set includes a first flag that indicates whether the syntax elements and/or parameters for the deblocking filter are included in the slice header or the picture header is independent of one or more other syntax elements. In some embodiments of method 1200, the one or more other syntax elements include a second flag that indicates whether an override of an applicability of the deblocking filter is enabled at the picture level and the slice level.

In some embodiments of method 1200, the rule specifies that whether a second syntax element is included in the slice header or whether a third syntax element is included in the picture header is based on the first flag and/or a first syntax element in the picture parameter set and is independent of the second flag, the first syntax elements indicates whether the deblocking filter is enabled for the slice referring to the picture parameter set, the second syntax element indicates whether the deblocking filter is enabled for the slice level, and the third syntax element indicates whether the deblocking filter is enabled for the picture level. In some embodiments of method 1200, a first flag in the picture parameter set or a second flag in the slice header or a third flag the picture header indicates whether an override of an applicability of the deblocking filter is enabled at the picture parameter set level or the picture level or the slice level, respectively, and the rule further specifies that the first flag or the second flag or the third flag are only configured to override parameters of the deblocking filter except: (1) a first syntax element in the picture parameter set that indicates whether the deblocking filter is enabled at the picture parameter set level, or (2) a second syntax element in the slice header that indicates whether the deblocking filter is enabled at the slice level or (3) a third syntax element in the picture header that indicates whether the deblocking filter is enabled at the picture level. In some embodiments of method 1200, the first syntax element is selectively included in the picture parameter set before the first flag according to the rule, or the second syntax element is selectively included in the slice header before the second flag according to the rule, or the third syntax element is selectively included in the picture header before the third flag according to the rule, and the rule specifies that whether the first flag, the second flag, or the third flag are respectively included in the picture parameter set, the slice header, or the picture header is based on the first syntax element, the second syntax element, or the third syntax element, respectively.

In some embodiments of method 1200, the syntax elements include a first syntax element, and the rule further specifies that the picture parameter set includes the first syntax element that indicates whether the deblocking filter is enabled for one or more slices referring to the picture parameter set. In some embodiments of method 1200, the rule further specifies that whether the picture parameter set includes a first syntax element that indicates whether the deblocking filter is enabled for one or more slices referring to the picture parameter set is independent of one or more other syntax elements in the picture parameter set. In some embodiments of method 1200, the rule further specifies that in a case that the deblocking filter is disabled at a first video unit level of the video, then one or more syntax elements in a second video unit level of the video are absent and inferred to equal to a value of a first syntax element at the first video unit level that indicates that the deblocking filter is disabled, and the first video unit level is higher than the second video unit level. In some embodiments of method 1200, the rule further specifies that a syntax element in the picture parameter set that indicates whether a global control for the deblocking filter is present, the syntax element only configured to control presence of (1) one or more flags in the picture parameter set or the picture header or the slice header that indicate whether an override of an applicability of the deblocking filter is enabled at the picture parameter set level or the picture level or the slice level, and (2) parameters of the deblocking filter at the picture parameter set, the picture header, or the slice header.

In some embodiments of method 1200, the rule further specifies that a flag indicates whether an override is enabled for either an applicability of the deblocking filter or a first set of parameters of the deblocking filter. In some embodiments of method 1200, the flag is included in the picture parameter set or the picture header or the slice header. In some embodiments of method 1200, the rule further specifies that in case that the flag indicates whether the override is enabled for the applicability of the deblocking filter, then: (1) the first set of parameters of the deblocking filter are included only at a first video unit level of the video, and (2) a second set of parameters of the deblocking filter for a second video unit level of the video are inferred from the first set of parameters of the deblocking filter of the first video unit level in response to the deblocking filter being enabled for the second video unit level, and wherein the first video unit level is higher than the second video unit level. In some embodiments of method 1200, wherein the rule further specifies that in case that the flag indicates whether the override is enabled for the first set of parameters of the deblocking filter included in a first video unit level of the video, then: (1) the applicability of the deblocking filter is included only at the first video unit level, and (2) a second set of parameters of the deblocking filter for a second video unit level of the video are inferred from the first set of parameters of the deblocking filter of the first video unit level in response to the deblocking filter being enabled for the second video unit level, and wherein the first video unit level is higher than the second video unit level.

In some embodiments of method 1200, the first video unit level includes the picture parameter set, and wherein the second video unit level includes the picture header or the slice header. In some embodiments of method 1200, the syntax elements includes a first syntax element for a first video unit level of the video and a second syntax element for a second video unit level of the video, wherein the first syntax element and the second syntax element indicate whether the deblocking filter is enabled at the first video unit level and the second video unit level, respectively, wherein the first video unit level is higher than the second video unit level, wherein the rule further specifies that an override of the second syntax element is disallowed in response to the first syntax element indicating that deblocking filter is disabled at the first video unit level. In some embodiments of method 1200, the first video unit level includes the picture parameter set, and wherein the second video unit level includes the picture header or the slice header. In some embodiments of method 1200, the rule specifies that whether the second syntax is included in the second video unit level is based on whether the first syntax element indicates that the deblocking filter is allowed to be controlled in the first video unit level.

In some embodiments of method 1200, the syntax elements includes a first syntax element for a first video unit level of the video and a second syntax element for a second video unit level of the video, the first syntax element and the second syntax element indicate whether the deblocking filter is enabled at the first video unit level and the second video unit level, respectively, and the rule specifies that the deblocking filter is inferred to have a certain status for the second video unit level in response to the second syntax element being absent from the second video unit level. In some embodiments of method 1200, the certain status includes disabled, or enabled, or being same as a status of the deblocking filter indicated by the first syntax element. In some embodiments of method 1200, the rule specifies that the picture parameter set excludes a syntax element that indicates whether a global control for the deblocking filter is present, the rule specifies that the picture parameter set includes a first syntax element that indicates whether the deblocking filter is enabled, and the first syntax element is independent of the syntax element. In some embodiments of method 1200, a second syntax element indicates whether an override of an applicability of the deblocking filter is allowed, wherein the rule specifies that whether the picture parameter set includes the second syntax element is based on the first syntax element indicating that the deblocking filter is enabled. In some embodiments of method 1200, the rule specifies that whether parameters for the deblocking filter are included in the picture parameter set is based on the second syntax element indicating that the override of the applicability of the deblocking filter is allowed.

In some embodiments of method 1200, the rule specifies that the picture parameter set excludes a syntax element that indicates whether a global control for the deblocking filter is present, the rule specifies that the picture parameter set includes a first syntax element that indicates whether an override of an applicability of the deblocking filter is allowed, and the first syntax element is independent of the syntax element. In some embodiments of method 1200, a second syntax element indicates whether the deblocking filter is enabled, the rule specifies that whether the picture parameter set includes the second syntax element is based on the first syntax element indicating that the override of the applicability of the deblocking filter is allowed. In some embodiments of method 1200, the rule specifies that whether parameters for the deblocking filter are included in the picture parameter set is based on the second syntax element indicating that the deblocking filter is enabled. In some embodiments of method 1200, the rule specifies that the picture header includes a syntax element that indicates whether the picture header or the slice header includes one or more syntax elements that indicates whether the deblocking filter is enabled and/or parameters for the deblocking filter.

In some embodiments of method 1200, the rule specifies that the syntax element is excluded from the picture parameter set. In some embodiments of method 1200, the rule specifies that each of the picture header and the slice header include one or more syntax elements that indicate whether the deblocking filter is enabled and/or parameters of the deblocking filter.

Figure 13:
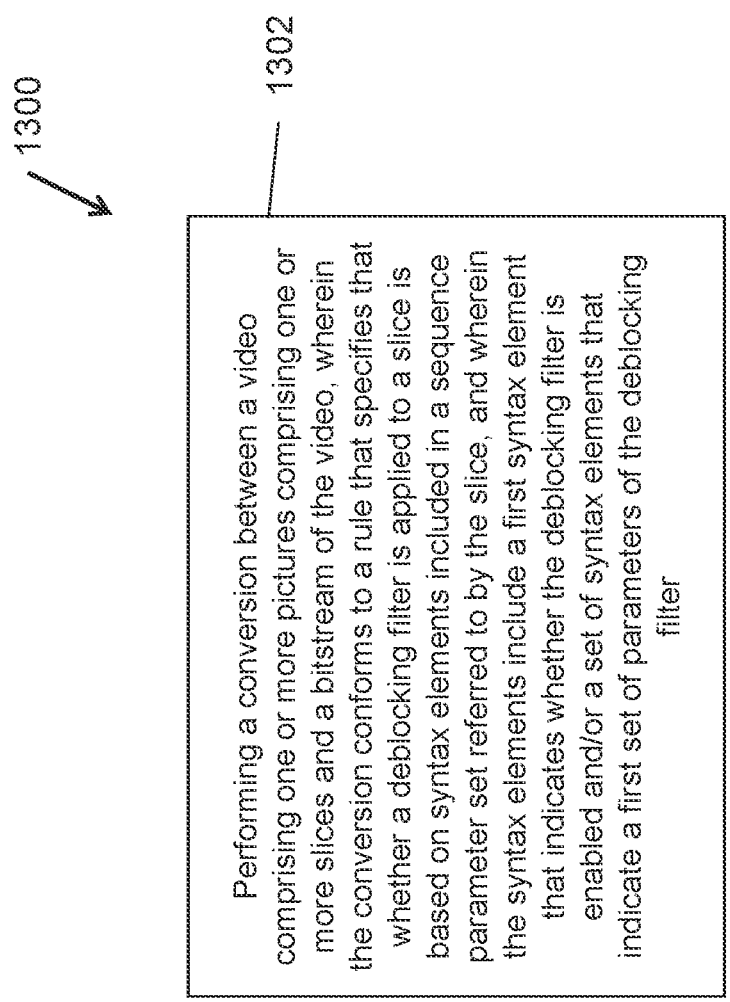

FIG. 13 is a flowchart for example method 1300 of video processing. Operation 1302 includes performing a conversion between a video comprising one or more pictures comprising one or more slices and a bitstream of the video, wherein the conversion conforms to a rule that specifies that whether a deblocking filter is applied to a slice is based on syntax elements included in a sequence parameter set referred to by the slice, and wherein the syntax elements include a first syntax element that indicates whether the deblocking filter is enabled and/or a set of syntax elements that indicate a first set of parameters of the deblocking filter.

In some embodiments of method 1300, the rule further specifies that the first syntax element in the sequence parameter set at a first video unit level of the video is overridden by a second syntax element that indicates whether the deblocking filter is enabled at a second video unit level of the video, and the first video unit level is higher than the second video unit level.

In some embodiments of method 1300, the rule further specifies that the first set of parameters of deblocking filter indicated in the sequence parameter set at a first video unit level of the video is overridden by a second set of parameters of the deblocking filter indicated at a second video unit level of the video, and the first video unit level is higher than the second video unit level. In some embodiments of method 1300, the second video unit level includes a picture parameter set, a picture header, or a slice header.

Figure 14:
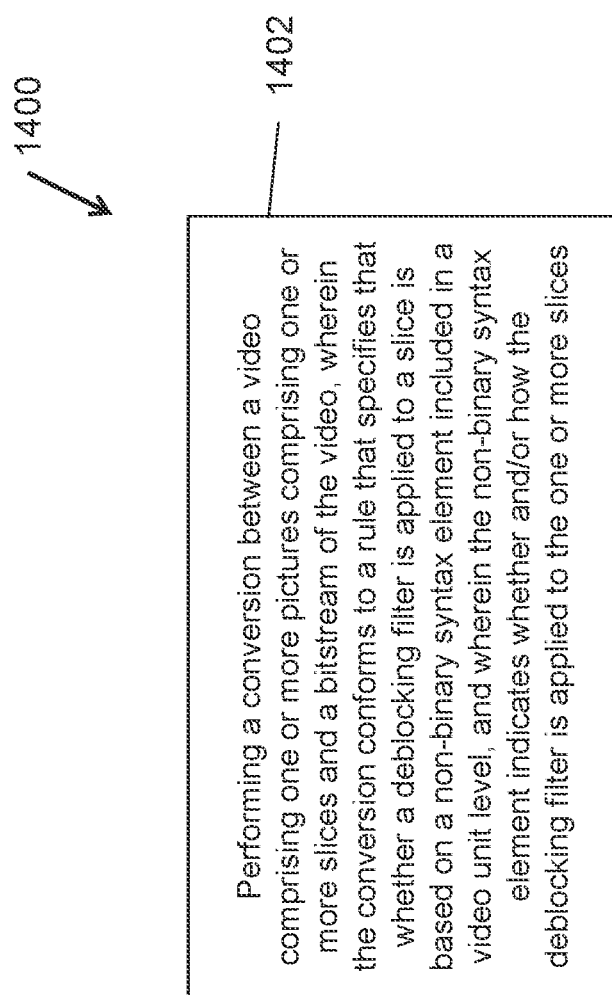

FIG. 14 is a flowchart for example method 1400 of video processing. Operation 1402 includes performing a conversion between a video comprising one or more pictures comprising one or more slices and a bitstream of the video, wherein the conversion conforms to a rule that specifies that whether a deblocking filter is applied to a slice is based on a non-binary syntax element included in a video unit level, and wherein the non-binary syntax element indicates whether and/or how the deblocking filter is applied to the one or more slices.

In some embodiments of method 1400, the video unit level includes a picture parameter set or a sequence parameter set. In some embodiments of method 1400, the rule specifies that the non-binary syntax element indicates a deblocking mode, and wherein the non-binary syntax element includes N-bits. In some embodiments of method 1400, N=2. In some embodiments of method 1400, the rule specifies that a first value of the non-binary syntax element indicates that the deblocking filter is not applied for all slices referring to the picture parameter set, the rule specifies that a second value of the non-binary syntax element indicates that the deblocking filter is applied for all slices referring to the picture parameter set using 0-valued deblocking parameter offsets for beta and tC, the rule specifies that a third value of the non-binary syntax element indicates that the deblocking filter is applied for all slices referring to the picture parameter set, using deblocking parameter offsets for beta and tC explicitly included in the picture parameter set, and the rule specifies that a fourth value of the non-binary syntax element indicates that whether the deblocking filter is applied to the slice referring to the picture parameter set is controlled by parameters present either in a picture header or a slice header of the slice. In some embodiments of method 1400, the rule specifies that whether parameters for the deblocking filter are included in the picture parameter set is based on a value of the non-binary syntax element.

In some embodiments of method 1400, the rule specifies that the parameters for the deblocking filter are included in the picture parameter set in response to the value meeting a certain condition, and the parameters for the deblocking filter are inferred to be 0 in response to the value not meeting the certain condition. In some embodiments of method 1400, the certain condition includes whether the value is greater than an integer. In some embodiments of method 1400, the rule specifies that a value of the non-binary syntax element controls whether a syntax element is included in the picture parameter set, and the syntax element specifies whether a picture header or a slice header includes syntax elements that indicate whether the deblocking filter is enabled and/or parameters of the deblocking filter. In some embodiments of method 1400, the rule specifies that the syntax element is included in the picture parameter set in response to the value of the non-binary syntax element meeting a certain condition. In some embodiments of method 1400, the certain condition includes whether the value is equal to an integer. In some embodiments of method 1400, the rule specifies that the syntax element is inferred to have a certain value in response to the syntax element being excluded from the picture parameter set. In some embodiments of method 1400, the rule specifies that a value of the non-binary syntax element controls whether syntax elements are included in a picture header or a slice header, and the syntax elements indicate whether the deblocking filter is enabled and/or parameters of the deblocking filter.

In some embodiments of method 1400, the rule specifies that a syntax element that indicates whether the deblocking filter is enabled at a picture level of the video is indicated in the picture header in response to the value of the non-binary syntax element meeting a certain condition. In some embodiments of method 1400, the rule specifies that a syntax element that indicates whether the deblocking filter is enabled at a slice level of the video is indicated in the slice header in response to the value of the non-binary syntax element meeting a certain condition. In some embodiments of method 1400, the certain condition includes whether the value is equal to an integer.

Figure 15:
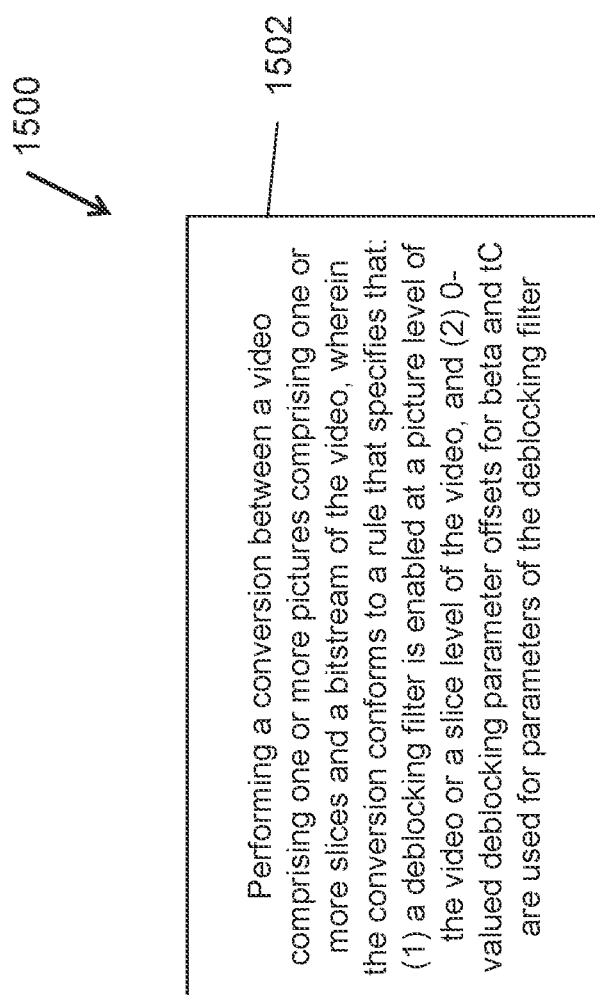

FIG. 15 is a flowchart for example method 1500 of video processing. Operation 1502 includes performing a conversion between a video comprising one or more pictures comprising one or more slices and a bitstream of the video, wherein the conversion conforms to a rule that specifies that: (1) a deblocking filter is enabled at a picture level of the video or a slice level of the video, and (2) 0-valued deblocking parameter offsets for beta and tC are used for parameters of the deblocking filter.

In some embodiments of method 1500, the rule specifies that a picture parameter set includes one or more syntax elements that indicate whether default parameters for the deblocking filter are associated with either 0-valued deblocking parameter offsets for beta and tC or a user-defined beta and tC offsets. In some embodiments of method 1500, the picture parameter set includes the user-defined beta and tC offsets in response to the one or more syntax element indicating that the default parameters for the deblocking filter are associated with the user-defined beta and tC offsets. In some embodiments of method 1500, the parameters of the deblocking filter and the default parameters of the deblocking filter are selectively overridden at a picture level of the video or at a slice level of the video. In some embodiments of method 1500, the rule specifies that a video unit level of the video includes one or more syntax elements that indicate whether 0-valued deblocking parameter offsets for beta and tC are used or a user-defined beta and tC offsets are used. In some embodiments of method 1500, the video unit level includes the user-defined beta and tC offsets in response to the one or more syntax element indicating that the user-defined beta and tC offsets are used. In some embodiments of method 1500, the video unit level includes a sequence parameter set, a picture parameter set, a picture header, or a slice header.

Figure 16:
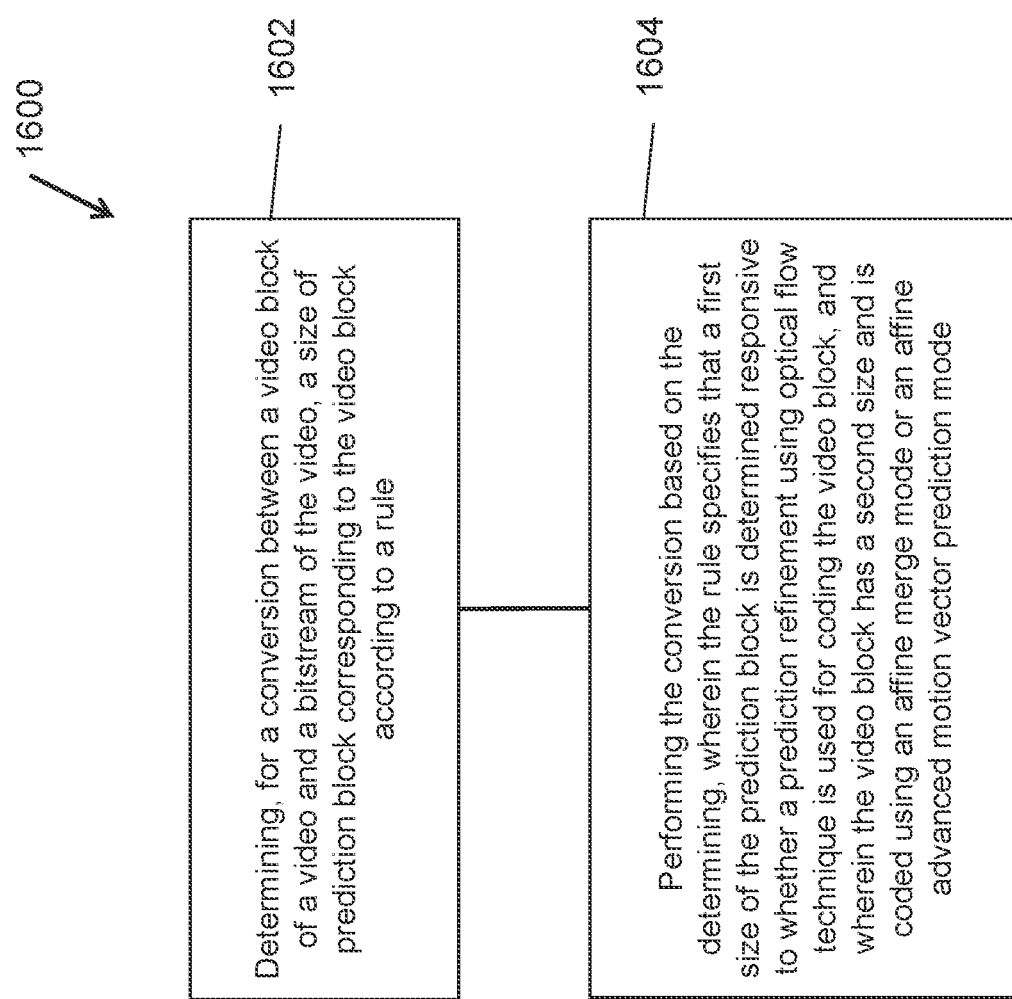

FIG. 16 is a flowchart for example method 1600 of video processing. Operation 1602 includes determining, for a conversion between a video block of a video and a bitstream of the video, a size of prediction block corresponding to the video block according to a rule. Operation 1604 includes performing the conversion based on the determining, wherein the rule specifies that a first size of the prediction block is determined responsive to whether a prediction refinement using optical flow technique is used for coding the video block, and wherein the video block has a second size and is coded using an affine merge mode or an affine advanced motion vector prediction mode.

In some embodiments of method 1600, a first width and a first height of the first size of the prediction block is indicated by (M+M0) and (N+N0), respectively, a second width and a second height of the second size of the video block is indicated by M and N, respectively, and M0 is greater than or equal to 0 and N0 is greater than or equal to 0. In some embodiments of method 1600, M0 and N0 are not both equal to 0. In some embodiments of method 1600, M0 and N0 are equal to 2. In some embodiments of method 1600, a flag that indicates whether the prediction refinement using an optical flow technique is utilized controls whether and/or how many extended samples are included in the first size of the prediction block. In some embodiments of method 1600, the first size of the prediction block is based on a number of the extended samples, and the number of the extended samples is independent of whether the first video block is coded using the affine merge mode or from the affine advanced motion vector prediction mode. In some embodiments of method 1600, a first width and a first height of the first size of the prediction block is indicated by (M+X) and (N+Y), respectively, a second width and a second height of the second size of the video block is indicated by M and N, respectively, and X is the number of extended samples for a width. Y is the number of extended samples for a height. In some embodiments of method 1600, X and Y are equal to 0. In some embodiments of method 1600, X and Y are equal to 2.

In some embodiments of method 1600, in response to a value of the flag indicating that the prediction refinement using an optical flow technique is utilized, X and Y are equal to 2. In some embodiments of method 1600, the value of the flag is equal to 1. In some embodiments of method 1600, the first size of the prediction block is based on a border extension size that is based on a value of a flag that indicates whether the prediction refinement using an optical flow technique is utilized, and the border extension size indicates a number of extended samples by which the second size of the video block is increased to obtain the first size of the prediction block. In some embodiments of method 1600, the number of extended samples is 0. In some embodiments of method 1600, the number of extended samples is 2. In some embodiments of method 1600, the prediction refinement using optical flow technique includes refining a sub-block based affine motion compensated prediction of the video block followed by refining a luma prediction sample of the video block by adding a difference derived by an optical flow equation. In some embodiments of method 1600, the affine merge mode includes generating control point motion vectors of a current coding unit of the video block based on motion information of spatial neighboring coding units of the current coding unit and including in the bitstream an index that indicates an affine merge candidate from a sub-block merge candidate list to be used for the current coding unit. In some embodiments of method 1600, wherein the affine advanced motion vector prediction mode comprises including in the bitstream: (1) an affine flag at a coding unit level of the video block to indicate whether the affine advanced motion vector prediction mode is used, (2) a second flag to indicate whether 4-parameter affine or 6-parameter affine is used, (3) a control point motion vector predictor index at a coding unit level, and (4) a difference of control point motion vectors of a current coding unit of the video block and predictors control point motion vectors corresponding to the control point motion vectors.

Figure 17:
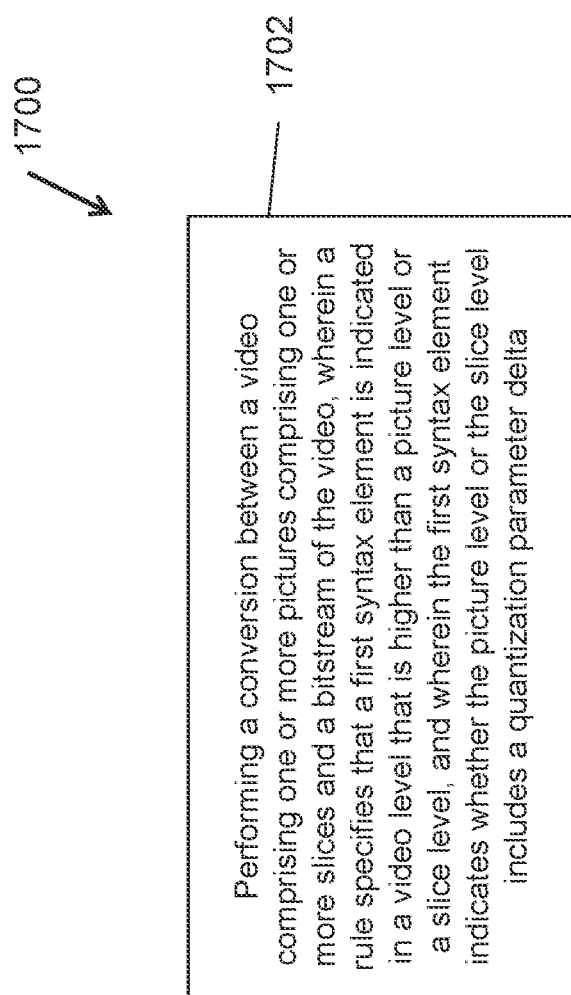

FIG. 17 is a flowchart for example method 1700 of video processing. Operation 1702 includes performing a conversion between a video comprising one or more pictures comprising one or more slices and a bitstream of the video, wherein a rule specifies that a first syntax element is indicated in a video level that is higher than a picture level or a slice level, and wherein the first syntax element indicates whether the picture level or the slice level includes a quantization parameter delta.

In some embodiments of method 1700, the video level is a sequence parameter set level or a picture parameter set level, and the first syntax element indicates whether to enable the picture level or the slice level to include a luma quantization parameter delta or a chroma quantization parameter delta. In some embodiments of method 1700, the rule specifies that whether the luma quantization parameter delta is included in a picture header and/or a slice header is based on the first syntax element that indicates whether the luma quantization parameter delta is present. In some embodiments of method 1700, the rule specifies that the luma quantization parameter delta is disallowed from being included in a picture header and a slice header in response to the first syntax element indicating that the luma quantization parameter delta is absent from the picture level or the slice level. In some embodiments of method 1700, the rule specifies that the luma quantization parameter delta is disallowed from being included in a picture header or a slice header in response to the first syntax element indicating that the luma quantization parameter delta is absent from the picture level or the slice level. In some embodiments of method 1700, the rule specifies that the luma quantization parameter delta is inferred to have a certain value in response to the luma quantization parameter delta being absent from the picture header. In some embodiments of method 1700, the rule specifies that the luma quantization parameter delta is inferred to be a certain value in response to the luma quantization parameter delta being absent from the slice header. In some embodiments of method 1700, the rule specifies that the first syntax element controls whether the picture parameter set includes a flag that specifies whether the luma quantization parameter delta is included in the picture header or a slice header. In some embodiments of method 1700, the rule specifies that the flag is excluded from the picture parameter set in response to the first syntax element indicating that the luma quantization parameter delta is absent from the picture level or the slice level. In some embodiments of method 1700, the rule specifies that the flag is inferred to have a certain value in response to the flag being absent from the picture parameter set.

Figure 18:
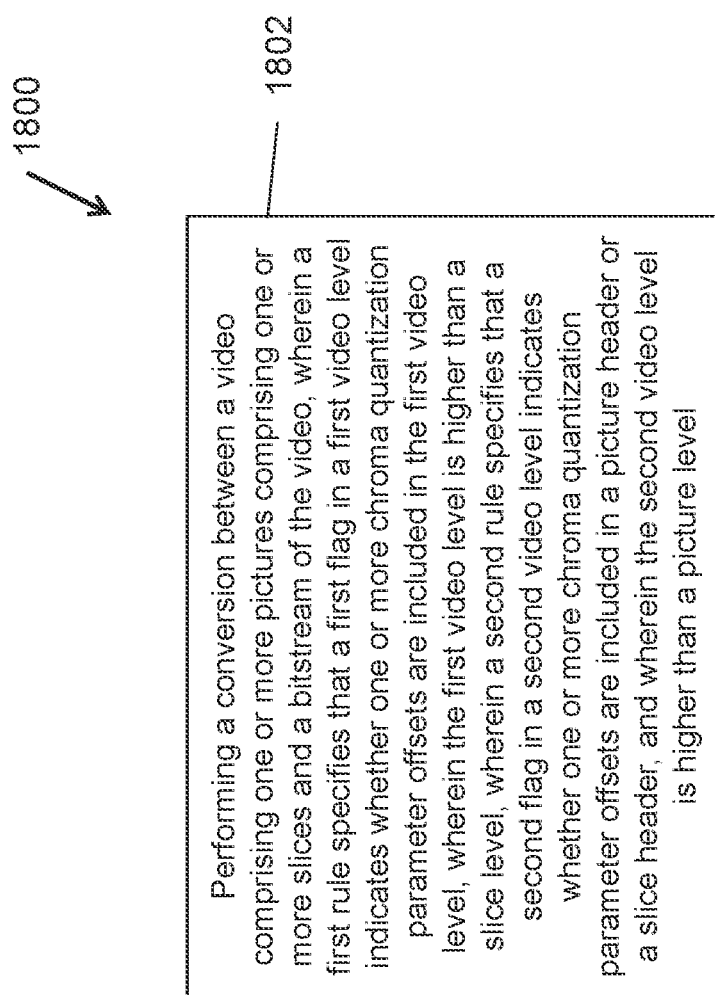

FIG. 18 is a flowchart for example method 1800 of video processing. Operation 1802 includes performing a conversion between a video comprising one or more pictures comprising one or more slices and a bitstream of the video, wherein a first rule specifies that a first flag in a first video level indicates whether one or more chroma quantization parameter offsets are included in the first video level, wherein the first video level is higher than a slice level, wherein a second rule specifies that a second flag in a second video level indicates whether one or more chroma quantization parameter offsets are included in a picture header or a slice header, and wherein the second video level is higher than a picture level.

In some embodiments of method 1800, the second rule specifies that the second flag in a picture parameter set indicates whether the one or more chroma quantization parameter offsets are included in the picture header or the slice header. In some embodiments of method 1800, the second rule specifies that the one or more chroma quantization parameter offsets are excluded from the slice header in response to the second flag indicating that the one or more chroma quantization parameter offsets are included in the picture header. In some embodiments of method 1800, the second rule specifies that the one or more chroma quantization parameter offsets are selectively included in the slice header in response to the second flag indicating that the one or more chroma quantization parameter offsets are excluded from the picture header. In some embodiments of method 1800, the one or more chroma quantization parameter offsets for the picture header is inferred to be a certain value in response to the one or more chroma quantization parameter offsets being excluded from the picture header. In some embodiments of method 1800, the one or more chroma quantization parameter offsets for the slice header is inferred to be a certain value in response to the one or more chroma quantization parameter offsets being excluded from the slice header. In some embodiments of method 1800, the second rule specifies that the second flag further indicates whether a luma quantization parameter delta is included in the picture header or the slice header.

In some embodiments of method 1800, the second rule specifies that the second flag in sequence parameter set and/or a picture parameter set indicates whether the one or more chroma quantization parameter offsets are included in the picture header and/or the slice header. In some embodiments of method 1800, the second rule specifies that the one or more chroma quantization parameter offsets are disallowed from being included in the picture header and the slice header in response to the second flag indicating that the one or more chroma quantization parameter offsets are absent from the picture level and the slice level. In some embodiments of method 1800, the second rule specifies that the second flag controls whether another flag is included in the picture parameter set, wherein the another flag indicates whether the one or more chroma quantization parameter offsets are included in the picture level or the slice level. In some embodiments of method 1800, the second rule specifies that the picture parameter set excludes another flag in response to the second flag indicating that the one or more chroma quantization parameter offsets are excluded from the picture header or the slice header. In some embodiments of method 1800, the second rule specifies that another flag is inferred to have a certain value in response to another flag being absent from the picture parameter set. In some embodiments of method 1800, the second rule specifies that a quantization parameter delta and the chroma quantization parameter offset is included in a same header. In some embodiments of method 1800, the second rule specifies that the one or more chroma quantization parameter offsets are disallowed from being included in the slice header in response to the quantization parameter delta being included in the picture header. In some embodiments of method 1800, the second rule specifies that the one or more chroma quantization parameter offsets are disallowed from being included in the picture header in response to the quantization parameter delta being included in the slice header.

Figure 19:
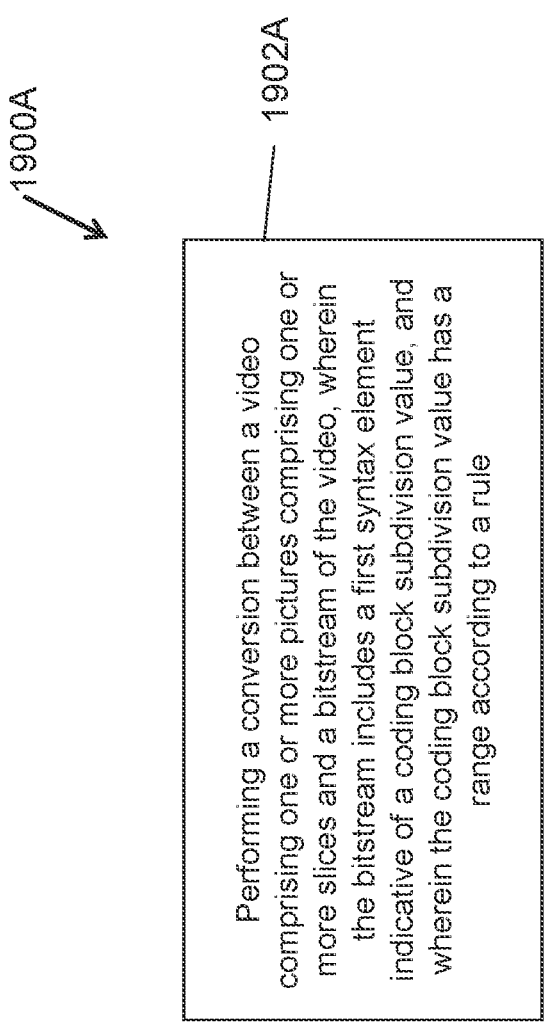

FIG. 19 is a flowchart for example method 1900A of video processing. Operation 1902A includes performing a conversion between a video comprising one or more pictures comprising one or more slices and a bitstream of the video, wherein the bitstream includes a first syntax element indicative of a coding block subdivision value, and wherein the coding block subdivision value has a range according to a rule.

In some embodiments of method 1900A, the rule specifies that the range of the coding block subdivision value of coding units in intra slice that convey cu_qp_delta_abs and cu_qp_delta_sign_flag is independent of a second syntax element in the bitstream that specifies a maximum hierarchy depth for the coding units resulting from multi-type tree splitting of a quadtree leaf in slices. In some embodiments of method 1900A, the rule specifies that the range is between of 0 and 2*(Ctb Log 2SizeY−MinQt Log 2SizeIntraY)+2*(Ctb Log 2SizeY−MinCb Log 2SizeY), inclusive. In some embodiments of method 1900A, the rule specifies that the range is between 0 to 2*(Ctb Log 2SizeY−MinQt Log 2SizeIntraY)+2*min(ph_max_mtt_hierarchy_depth_intra_slice_luma, Ctb Log 2SizeY−MinCb Log 2SizeY), inclusive, and the ph_max_mtt_hierarchy_depth_intra_slice_luma is the second syntax element.

In some embodiments of method 1900A, the rule specifies that the range of the coding block subdivision value of coding units in intra slice that convey cu_chroma_qp_offset_flag is independent of a second syntax element in the bitstream that specifies a maximum hierarchy depth for the coding units resulting from multi-type tree splitting of a quadtree leaf in slices. In some embodiments of method 1900A, the rule specifies that the range is between 0 and 2*(Ctb Log 2SizeY−MinQt Log 2SizeIntraY)+2*(Ctb Log 2SizeY−MinCb Log 2SizeY), inclusive. In some embodiments of method 1900A, the rule specifies that the range is between 0 and 2*(Ctb Log 2SizeY−MinQt Log 2SizeIntraY)+2*min(ph_max_mtt_hierarchy_depth_intra_slice_luma, Ctb Log 2SizeY−MinCb Log 2SizeY), inclusive, and the ph_max_mtt_hierarchy_depth_intra_slice_luma is the second syntax element. In some embodiments of method 1900A, the rule specifies that the range of the coding block subdivision value of coding units that in intra slice convey cu_qp_delta_abs and cu_qp_delta_sign_flag is independent of a second syntax element in the bitstream that specifies a maximum hierarchy depth for the coding units resulting from multi-type tree splitting of a quadtree leaf in slices. In some embodiments of method 1900A, the rule specifies that the range is between 0 and 2*(Ctb Log 2SizeY−MinQt 2SizeInterY)+2*(Ctb Log 2SizeY−MinCb Log 2SizeY), inclusive. In some embodiments of method 1900A, the rule specifies that the range is between 0 and 2*(Ctb Log 2SizeY−MinQt Log 2SizeIntraY)+2*min(ph_max_mtt_hierarchy_depth_inter_slice, Ctb Log 2SizeY−MinCb Log 2SizeY), inclusive, and the ph_max_mtt_hierarchy_depth_inter_slice is the second syntax element.

In some embodiments of method 1900A, the rule specifies that the range of the coding block subdivision value of coding units that in inter slice that convey cu_chroma_qp_offset_flag is independent of a second syntax element in the bitstream that specifies a maximum hierarchy depth for the coding units resulting from multi-type tree splitting of a quadtree leaf in slices. In some embodiments of method 1900A, the rule specifies that the range is between 0 and 2*(Ctb Log 2SizeY−MinQt Log 2SizeInterY)+2*(Ctb Log 2SizeY−MinCb Log 2SizeY), inclusive. In some embodiments of method 1900A, the rule specifies that the range is between 0 and 2*(Ctb Log 2SizeY−MinQt Log 2SizeIntraY)+2*min(ph_max_mtt_hierarchy_depth_inter_slice, Ctb Log 2SizeY−MinCb Log 2SizeY), inclusive, and the ph_max_mtt_hierarchy_depth_inter_slice is the second syntax element.

In some embodiments of method(s) 700-1900A, the performing the conversion comprising encoding the video into the bitstream. In some embodiments of method(s) 700-1900A, the performing the conversion comprises generating the bitstream from the video, and the method further comprises storing the bitstream in a non-transitory computer-readable recording medium. In some embodiments of method(s) 700-1900A, the performing the conversion comprises decoding the video from the bitstream. In some embodiments, a video decoding apparatus comprising a processor configured to implement operations for method(s) 700-1900A. In some embodiments, a video encoding apparatus comprising a processor configured to implement operations for method(s) 700-1900A. In some embodiments, a computer program product having computer instructions stored thereon, the instructions, when executed by a processor, causes the processor to implement operations for method(s) 700-1900A. In some embodiments, a non-transitory computer-readable storage medium that stores a bitstream generated according to operations for method(s) 700-1900A. In some embodiments, a non-transitory computer-readable storage medium storing instructions that cause a processor to implement operations for method(s) 700-1900A. In some embodiments, a method of bitstream generation, comprising: generating a bitstream of a video according to operations for method(s) 700-1900A, and storing the bitstream on a computer-readable program medium. In some embodiments, a method, an apparatus, a bitstream generated according to a disclosed method or a system described in the present document.

In the present document, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream. Furthermore, during conversion, a decoder may parse a bitstream with the knowledge that some fields may be present, or absent, based on the determination, as is described in the above solutions. Similarly, an encoder may determine that certain syntax fields are or are not to be included and generate the coded representation accordingly by including or excluding the syntax fields from the coded representation.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, for example, code that constitutes processor firmware, a protocol stack, a database management system, an operating system, or a combination of one or more of them. A propagated signal is an artificially generated signal, for example, a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, for example, a field programmable gate array (FPGA) or an application specific integrated circuit (ASIC).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, for example, magnetic, magneto optical disks, or optical disks. However, a computer need not have such devices. Computer readable media suitable for storing computer program instructions and data include all forms of non-volatile memory, media and memory devices, including by way of example semiconductor memory devices, for example, erasable programmable read-only memory (EPROM), electrically erasable programmable read-only memory (EEPROM), and flash memory devices; magnetic disks, for example, internal hard disks or removable disks; magneto optical disks; and compact disc, read-only memory (CD ROM) and digital versatile disc read-only memory (DVD-ROM) disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of processing video data, comprising:
    determining, for a conversion between a current video block of a video and a bitstream of the video, a size of a prediction block corresponding to the current video block according to a rule; and
    performing the conversion based on the determining,
    wherein an affine merge mode is enabled for the current video block, and
    wherein the rule specifies that a first size of the prediction block is determined responsive to whether a prediction refinement using optical flow technique is enabled for the current video block, and wherein the current video block has a second size;
    wherein a second width and a second height of the second size of the current video block are indicated by M and N, respectively, and M and N are integers greater than or equal to 0;
    wherein a prediction sample of the prediction block is present as predSamplesLX[xL][yL], wherein xL is between 0 and M+1 inclusively, and yL is between 0 and N+1 inclusively, wherein the prediction sample predSamplesLX[xL][yL] is derived by invoking a luma integer sample fetching process for one or more of conditions are true: xL is equal to 0, xL is equal to M+1, yL is equal to 0 and yL is equal to N+1, and the prediction sample predSamplesLX[xL][yL] is derived by invoking a luma sample 8-tap interpolation filtering process for all conditions are false.

2. The method of claim 1, wherein a first width and a first height of the first size of the prediction block are indicated by (M+M0) and (N+N0), respectively, and wherein M0 and N0 are integers greater than or equal to 0.

3. The method of claim 2, wherein in a case that the prediction refinement using optical flow technique is enabled for the current video block, at least one of M0 and N0 is not equal to 0.

4. The method of claim 3, wherein M0 and N0 are both equal to 2.

5. The method of claim 2, wherein a prediction refinement utility flag controls values of M0 and N0, and wherein the prediction refinement utility flag indicates whether the prediction refinement using optical flow technique is utilized.

6. The method of claim 5, wherein the values of M0 and N0 are determined independently from an affine flag.

7. The method of claim 6, wherein the affine flag is inter_affine_flag which is used to indicate whether to apply an affine motion vector prediction mode.

8. The method of claim 7, wherein for a video block applied with the affine motion vector prediction mode, a size of a prediction block of the video block is equal to the first size.

9. The method of claim 1, wherein the affine merge mode includes generating control point motion vectors by using a merge index to select an affine merge candidate from a sub-block merge candidate list which is constructed based on motion information of spatial neighboring coding units.

10. The method of claim 1, wherein performing the conversion comprises encoding the video into the bitstream.

11. The method of claim 1, wherein performing the conversion comprises decoding the video from the bitstream.

12. An apparatus for processing video data comprising a processor and a non-transitory memory with instructions thereon, wherein the instructions upon execution by the processor, cause the processor to:

determine, for a conversion between a current video block of a video and a bitstream of the video, a size of a prediction block corresponding to the current video block according to a rule; and perform the conversion based on the determining, wherein an affine merge mode is enabled for the current video block, wherein the rule specifies that a first size of the prediction block is determined responsive to whether a prediction refinement using optical flow technique is enabled for the current video block, and wherein the current video block has a second size;

wherein a second width and a second height of the second size of the current video block are indicated by M and N, respectively, and M and N are integers greater than or equal to 0, wherein a prediction sample of the prediction block is present as predSamplesLX[xL][yL], wherein xL is between 0 and M+1 inclusively, and yL is between 0 and N+1 inclusively, and wherein the prediction sample predSamplesLX[xL][yL] is derived by invoking a luma integer sample fetching process for one or more of conditions are true: xL is equal to 0, xL is equal to M+1, yL is equal to 0 and yL is equal to N+1, and the prediction sample predSamplesLX[xL][yL] is derived by invoking a luma sample 8-tap interpolation filtering process for all conditions are false.

13. The apparatus of claim 12, wherein a first width and a first height of the first size of the prediction block are indicated by (M+M0) and (N+N0), respectively, wherein M0 and N0 are integers greater than or equal to 0, wherein in a case that the prediction refinement using optical flow technique is enabled for the current video block, at least one of M0 and N0 is not equal to 0, and wherein M0 and N0 are both equal to 2.

14. The apparatus of claim 13, wherein a prediction refinement utility flag controls values of M0 and N0, wherein the prediction refinement utility flag indicates whether the prediction refinement using optical flow technique is utilized, wherein the values of M0 and N0 are determined independently from an affine flag, wherein the affine flag is inter_affine_flag which is used to indicate whether to apply an affine motion vector prediction mode, wherein for a video block applied with the affine motion vector prediction mode, a size of a prediction block of the video block is equal to the first size, and wherein the affine merge mode includes generating control point motion vectors by using a merge index to select an affine merge candidate from a sub-block merge candidate list which is constructed based on motion information of spatial neighboring coding units.

15. A non-transitory computer-readable storage medium storing instructions that cause a processor to:

determine, for a conversion between a current video block of a video and a bitstream of the video, a size of a prediction block corresponding to the current video block according to a rule; and perform the conversion based on the determining, wherein an affine merge mode is enabled for the current video block, and wherein the rule specifies that a first size of the prediction block is determined responsive to whether a prediction refinement using optical flow technique is enabled for the current video block, and wherein the current video block has a second size;

wherein a second width and a second height of the second size of the current video block are indicated by M and N, respectively, and M and N are integers greater than or equal to 0, wherein a prediction sample of the prediction block is present as predSamplesLX[xL][yL], wherein xL is between 0 and M+1 inclusively, and yL is between 0 and N+1 inclusively, wherein the prediction sample predSamplesLX[xL][yL] is derived by invoking a luma integer sample fetching process for one or more of conditions are true: xL is equal to 0, xL is equal to M+1, yL is equal to 0 and yL is equal to N+1, and the prediction sample predSamplesLX[xL][yL] is derived by invoking a luma sample 8-tap interpolation filtering process for all conditions are false.

16. The non-transitory computer-readable storage medium of claim 15, wherein a first width and a first height of the first size of the prediction block are indicated by (M+M0) and (N+N0), respectively,
wherein M0 and N0 are integers greater than or equal to 0,
wherein in a case that the prediction refinement using optical flow technique is enabled for the current video block, at least one of M0 and N0 is not equal to 0, and
wherein M0 and N0 are both equal to 2.

17. The non-transitory computer-readable storage medium of claim 16, wherein a prediction refinement utility flag controls values of M0 and N0,
wherein the prediction refinement utility flag indicates whether the prediction refinement using optical flow technique is utilized,
wherein the values of M0 and N0 are determined independently from an affine flag,
wherein the affine flag is inter_affine_flag which is used to indicate whether to apply an affine motion vector prediction mode,
wherein for a video block applied with the affine motion vector prediction mode, a size of a prediction block of the video block is equal to the first size, and
wherein the affine merge mode includes generating control point motion vectors by using a merge index to select an affine merge candidate from a sub-block merge candidate list which is constructed based on motion information of spatial neighboring coding units.

18. A non-transitory computer-readable recording medium storing a bitstream of a video which is generated by a method performed by a video processing apparatus, wherein the method comprises:
determining, for a current video block of the video, a size of a prediction block corresponding to the current video block according to a rule; and
generating the bitstream based on the determining,
wherein an affine merge mode is enabled for the current video block, and
wherein the rule specifies that a first size of the prediction block is determined responsive to whether a prediction refinement using optical flow technique is enabled for the current video block, and
wherein the current video block has a second size;
wherein a second width and a second height of the second size of the current video block are indicated by M and N, respectively, and M and N are integers greater than or equal to 0,
wherein a prediction sample of the prediction block is present as predSamplesLX[xL][yL],
wherein xL is between 0 and M+1 inclusively, and yL is between 0 and N+1 inclusively, and
wherein the prediction sample predSamplesLX[xL][yL] is derived by invoking a luma integer sample fetching process for one or more of conditions are true: xL is equal to 0, xL is equal to M+1, yL is equal to 0 and yL is equal to N+1, and the prediction sample predSamplesLX[xL][yL] is derived by invoking a luma sample 8-tap interpolation filtering process for all conditions are false.

19. The non-transitory computer-readable recording medium of claim 18, wherein a first width and a first height of the first size of the prediction block are indicated by (M+M0) and (N+N0), respectively,
wherein M0 and N0 are integers greater than or equal to 0,
wherein in a case that the prediction refinement using optical flow technique is enabled for the current video block, at least one of M0 and N0 is not equal to 0,
wherein M0 and N0 are both equal to 2,
wherein a prediction refinement utility flag controls values of M0 and N0,
wherein the prediction refinement utility flag indicates whether the prediction refinement using optical flow technique is utilized,
wherein the values of M0 and N0 are determined independently from an affine flag,
wherein the affine flag is inter_affine_flag which is used to indicate whether to apply an affine motion vector prediction mode,
wherein for a video block applied with the affine motion vector prediction mode, a size of a prediction block of the video block is equal to the first size, and
wherein the affine merge mode includes generating control point motion vectors by using a merge index to select an affine merge candidate from a sub-block merge candidate list which is constructed based on motion information of spatial neighboring coding units.

* * * * *